(12) United States Patent
Matsuura et al.

(10) Patent No.: US 7,489,050 B2
(45) Date of Patent: Feb. 10, 2009

(54) REMOTE START-UP CONTROL APPARATUS, AND START-UP CONTROL APPARATUS

(75) Inventors: Akira Matsuura, Hyogo (JP); Minoru Yoshimura, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 190 days.

(21) Appl. No.: 10/752,186

(22) Filed: Jan. 7, 2004

(65) Prior Publication Data
US 2004/0168663 A1   Sep. 2, 2004

(30) Foreign Application Priority Data
Jan. 8, 2003   (JP)   ............................. 2003-001907

(51) Int. Cl.
    *B60R 25/04*   (2006.01)
(52) U.S. Cl. ..................................... 307/10.5
(58) Field of Classification Search ................. 307/10.5
    See application file for complete search history.

(56) References Cited

U.S. PATENT DOCUMENTS

| | | | | |
|---|---|---|---|---|
| 5,608,272 A * | 3/1997 | Tanguay | ..................... | 307/10.2 |
| 6,389,859 B1 * | 5/2002 | Paolini et al. | ................. | 70/340 |
| 6,525,643 B1 * | 2/2003 | Okada et al. | ............... | 340/5.24 |
| 2002/0163418 A1 * | 11/2002 | Nemoto | ....................... | 340/5.2 |
| 2003/0222500 A1 * | 12/2003 | Bayeur et al. | .............. | 307/10.2 |
| 2004/0207510 A1 * | 10/2004 | Buchner | .................... | 340/5.61 |

FOREIGN PATENT DOCUMENTS

| | | |
|---|---|---|
| JP | A-8-150902 | 6/1996 |
| JP | A-10-81201 | 3/1998 |
| JP | A-10-148170 | 6/1998 |
| JP | A 10-176642 | 6/1998 |
| JP | A 2000-025573 | 1/2000 |
| JP | A 2001-71868 | 3/2001 |
| JP | A-2002-257013 | 9/2002 |
| JP | A-2002-266732 | 9/2002 |
| JP | A-2002-322972 | 11/2002 |

* cited by examiner

*Primary Examiner*—Michael J Sherry
*Assistant Examiner*—Dru M Parries
(74) *Attorney, Agent, or Firm*—Oliff & Berridge, PLC

(57) ABSTRACT

A remote start-up control apparatus which takes in a key code outputted on the basis of insertion of a key cylinder of an ignition key, and which is mounted on a vehicle which was equipped with an immobilizer unit for enabling a start-up of an engine, in case that it was judged that the taken-in key code is in conformity with a predetermined key code, and which carries out start-up control of an engine in response to an instruction of a portable transmitter, has a unit for supplying a key code which has been stored in an EEPROM to the immobilizer, when it received a start-up instruction of the engine according to a remote operation, and a unit for prohibiting supply of the key code, in case that there occurred vehicle theft.

14 Claims, 36 Drawing Sheets

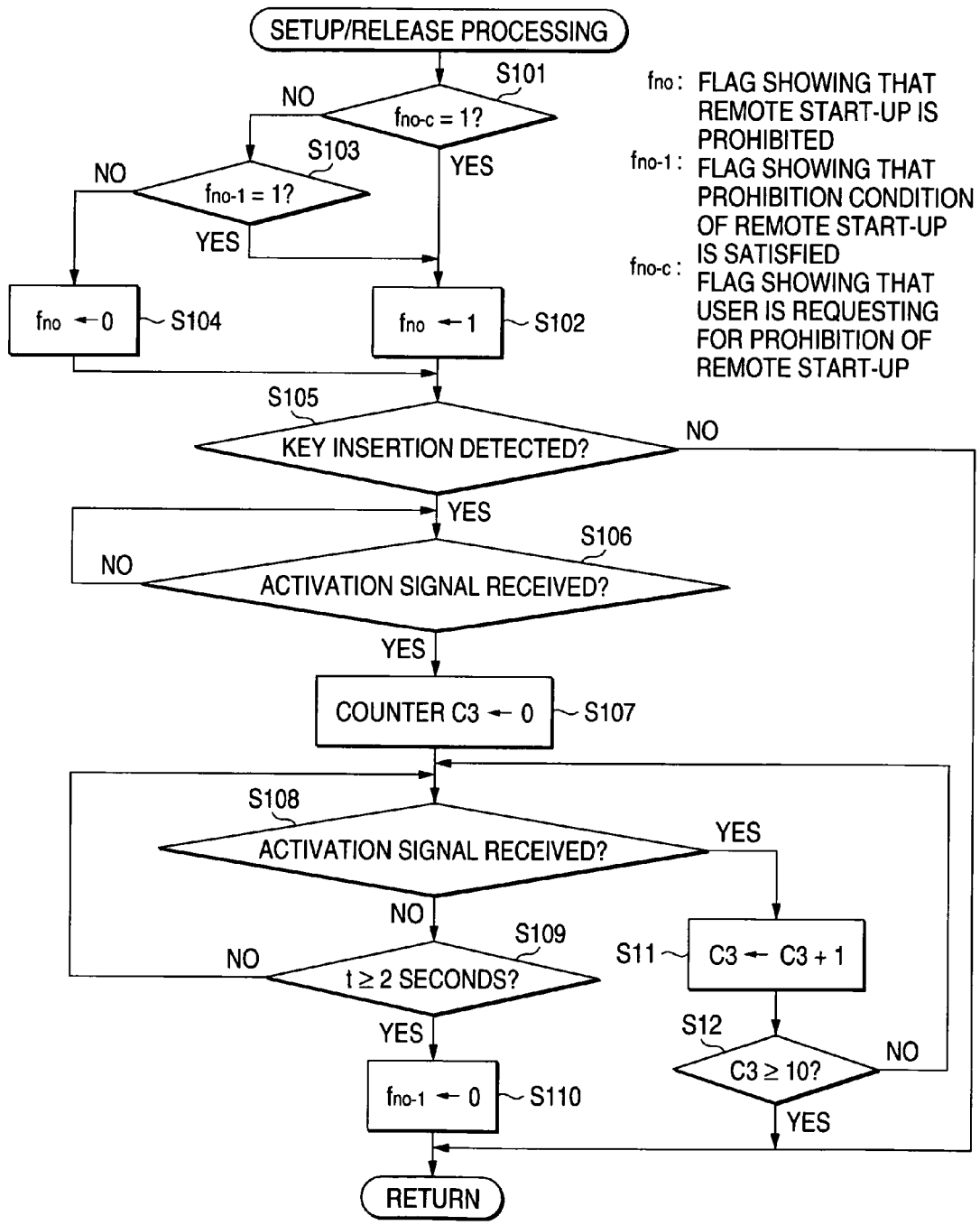

FIG. 8

| ID CODE | fcd |
|---------|-----|
| cd1 | 0 |
| cd2 | 0 |
| cd3 | 0 |
| cd4 | 1 |
|  | 0 |

36A

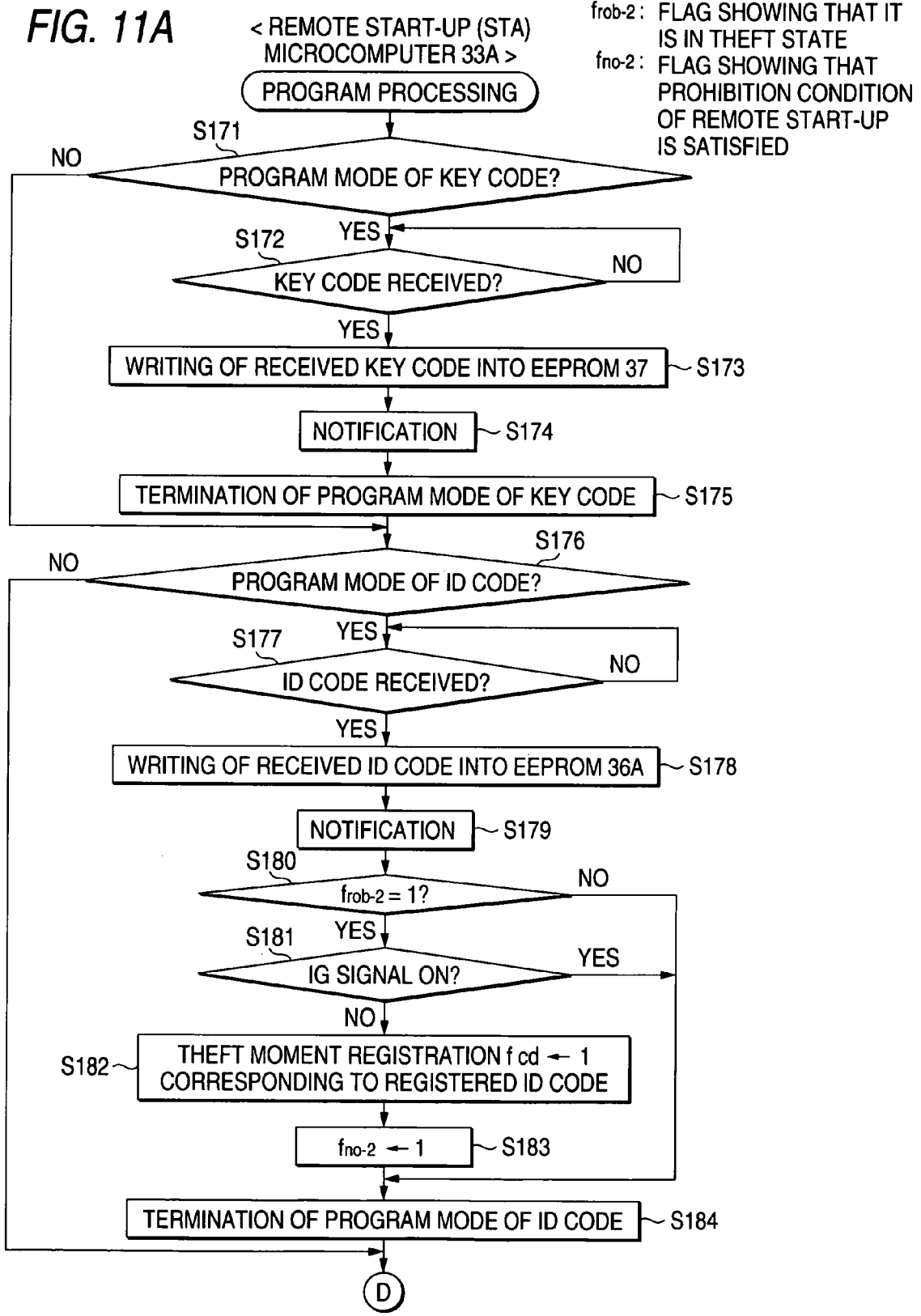

FIG. 20

| ID CODE | fcd |
|---------|-----|
| cd1 | 0 |
| cd2 | 0 |
| cd3 | 0 |
| cd4 | 1 |
|  | 0 |

| KEY CODE | |
|---|---|
| (FOR MASTER KEY) | Ma1 |
| (FOR SPARE KEY) | Ma2 |
| (FOR SPARE KEY) | Ma3 |
| (FOR SPARE KEY) | Ma4 |
| (FOR REMOTE OPERATION) | Ma5 |

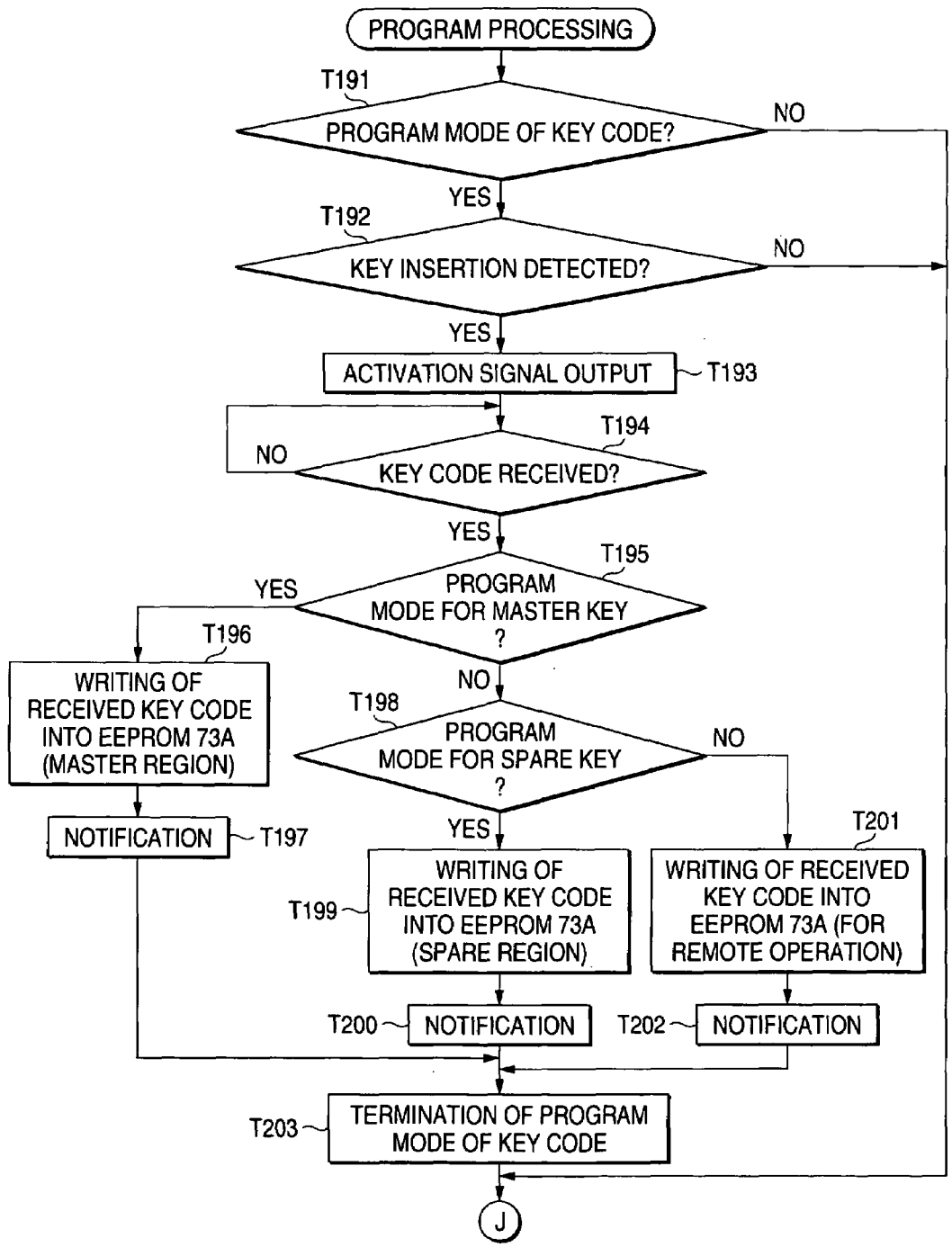

REMOTE START-UP CONTROL APPARATUS, AND START-UP CONTROL APPARATUS

BACKGROUND OF THE INVENTION

1. Field of the Invention

This invention relates to a remote start-up control apparatus, and a start-up control apparatus, and more specifically, relates to a remote start-up control apparatus for being equipped in a vehicle having a immobilizer function, and a start-up control apparatus having the immobilizer function.

2. Description of the Related Art

In recent years, vehicles which are equipped with an anti-theft function called as an immobilizer have been increasing. In order to realize the immobilizer function (for use in an engine), as shown in FIG. 28, required are an ignition key 1 in which a certain specific key code is stored and which incorporates in a grip part 2, a transponder 3 having a transmission function, a key cylinder 4, an immobilizer amplifier 5 attached to the key cylinder 4 for extracting a key code from the ignition key 1, an immobilizer unit 6 for storing a certain specific key code and having a function as anti-theft, and an engine control unit 7 for carrying out control of an engine start-up and so on.

It is designed such that, when the ignition key 1 is inserted into the key cylinder 4 by a driver, a key insertion signal is turned in a High state, and the immobilizer unit 6 which received this transmits a pulse-shaped activation signal through a signal line L1 to the immobilizer amplifier 5. FIG. 29 shows a timing chart from time when the ignition key 1 is inserted into the key cylinder 4 until time when an enabling signal is outputted to the engine control unit 7.

In addition, as to the immobilizer unit 6, there is also a case of transmitting the activation signal, not in case of having received the key insertion signal (High state), but in case of having received an ACC signal which is turned in a High state when the ignition key 1 was turned to an ACC output position, or in case of having received an IG signal which is turned in a High state when the ignition key 1 was turned to an IG output position.

The immobilizer amplifier 5 is designed to, when it receives the activation signal, supply electric power by electromagnetic induction, and to have the transponder 3 of the ignition key 1 which has been inserted into the key cylinder 4 activated, and thereby, to extract a key code (which is specific to the ignition key 1) which is stored in the transponder 3, and to output the extracted key code, together with a clock signal, through a signal line L2 to the immobilizer unit 6.

The immobilizer unit 6 judges whether or not the key code (which is specific to the ignition key 1) which was transmitted from the immobilizer amplifier 5 is in conformity with a key code which has been stored in the immobilizer unit 6 (verification of a key code), and when it judges that these key codes are in conformity with each other, it gives an enabling signal for enabling the engine start-up, to the engine control unit 7, counting a driver who inserted the ignition key 1 into the key cylinder 4 as a qualified driver. In passing, in case that the key code which was sent from the immobilizer amplifier 5 is not in conformity with the key code which has been stored in the immobilizer unit 6, the activation signal is designed to be sent again from the immobilizer unit 6 to the immobilizer amplifier 5 (which is repeated approximately 100 times at most, with respect to approximately each 100 millisecond).

Also, the engine control unit 7 is designed to carry out start-up control of a starter motor 8, when it receives a starter signal which is outputted from the key cylinder 4, after it received the enabling signal, and adversely, is designed not to carry out the start-up control-of the starter motor 8, in case that it received the starter signal, under such a state that it does not receive the enabling signal.

In this manner, if the key code which has been stored in the transponder 3 of the ignition key 1 is not in conformity with the key code which has been stored in the immobilizer unit 6, it is not possible to realize the engine start-up. On that account, it is not possible to have the engine started, by a illegal direct connection of the ignition key and the ignition switch, so that it is possible to prevent vehicle theft.

On the other hand, a remote start-up control apparatus for starting an engine and so on is in practical use. As shown in FIG. 30, a remote start-up control apparatus 18 is designed to, when it receives a signal (to which an ID code proper for a portable transmitter 19) for instructing the engine start-up from the portable transmitter 19 which a driver takes along, carry out judgment of whether or not the received signal is one from a qualified portable transmitter 19, and after that, to supply a pseudo signal which corresponds to the ACC signal, the IG signal, and the starter signal which are outputted in case that the qualified ignition key 11 was turned to a starter output position, to a signal line L3, and to transmit these pseudo signals to an engine control unit 17.

By this, even if there occurs no such a situation that the ignition key 11 is inserted into the key cylinder 14 and turned, if a signal for instructing the engine start-up is simply sent from the portable transmitter 19, it is possible to start the engine. In passing, as to judgment of whether or not the received signal is one from the qualified portable transmitter 19, it is possible to realize it by registering the ID code which is specific to the qualified portable transmitter 19.

In the meantime, in case that the above-described remote start-up control apparatus 18 is additionally equipped in a vehicle having the immobilizer function, as shown in FIG. 28, since there is a necessity of realizing conformity of the key code which has been stored in the immobilizer unit 6, i.e., necessity of inserting the qualified ignition key 1 into the key cylinder 4, there was such a problem that, even if the pseudo signal (pseudo signals of the ACC signal, the IG signal and the starter signal) is given to the engine control unit 7, it is not possible to start the engine.

AS one for solving the suchlike problem, as shown in FIG. 31, there is such an invention that a key code, which is in conformity with the key code which has been stored in the immobilizer unit 6, is registered in a remote start-up control apparatus 28, and when it receives an instruction of the engine start-up by an remote operation, the key code is made to be sent from the remote start-up control apparatus 28 to the immobilizer unit 6, and the enabling signal is given from the immobilizer unit 6 to the engine control unit 7 (e.g., see, JP-A-10-176642).

However, in an invention which was described in Patent Document 1, there is such a risk that a burglar knows a key code (i.e., a key code which is in conformity with the key code which has been stored in the immobilizer unit 6) which can permit the engine start up, when a vehicle is invaded by a burglar, and data, which has been stored in the remote start-up control apparatus 28, is analyzed.

When the key code was known, there is such a problem that it is possible to make a duplicate of the ignition key in which the key code was stored (i.e., qualified ignition key), and vehicle theft is easily realized.

In this manner, when the remote start-up control apparatus 28 in which the key code was stored is mounted on a vehicle, an analysis of the key code becomes relatively easy, but in contrast to this, if the remote start-up control apparatus 28 in which the key code was stored is not mounted on a vehicle, the analysis of the key code never be so easy. This is because the key code is also registered in the immobilizer unit 6, but the immobilizer unit 6 is not configured so as to output the key code to outside, like the remote start-up control apparatus 28 (the remote start-up control apparatus 28 is configured so as to output the key code to the immobilizer unit 6).

Also, the ignition key in which the key code was stored is, like the remote start-up control apparatus 28, configured so as to output the key code to outside, but the ignition key 1 is not one which is mounted on a vehicle, like the remote start-up control apparatus 28, but one which a driver takes along, and therefore, even if a vehicle is invaded by a burglar, there is no case that the key code is not analyzed from the ignition key.

In the meantime, among remote start-up control apparatus, there is one in which a plurality of ID codes can be registered. On that account, to the remote start-up control apparatus, it is possible to set a plurality of portable transmitters which can instruct the engine start-up. In passing, in many cases, registration of ID codes is carried out, when a mode is switched from a normal operation mode to a program mode for registering the ID code and the program mode is set.

Thus, if there is a vacant area for registering the ID code, or rewriting of the ID code (so-called, overwriting) is possible, it is possible to newly register another ID code in the remote start-up control apparatus, and it is possible to instruct the engine start-up by a portable transmitter which corresponds to the ID code which was newly registered.

In this manner, if it is possible to register the ID code additionally (i.e., it is possible to increase the number of portable transmitters which enables a remote operation of the engine start-up), it becomes very convenient, when the same vehicle is utilized by a plurality of persons such as family members, coworkers at the office and so on.

However, on the other side, such a fact that it is possible to register the ID code additionally has such a risk that it becomes possible to carry out a remote operation of the engine start-up and so on, by use of a portable transmitter which a person other than a qualified user has. For example, when an additional registration of the ID code is carried out, it becomes possible to carry out a remote operation of the engine start-up and so on, by a portable transmitter which a burglar has.

SUMMARY OF THE INVENTION

This invention is one which was made in view of the above-described problem, and aims to provide a remote start-up control apparatus, and a start-up control apparatus, which can suppress theft damage to the minimum, in such a manner that it is designed so as for a burglar not to be able to know a key code which is required for giving a start-up permission of an engine and so on, or, even if a portable transmitter which a burglar has is turned in such a state that an remote operation of the engine becomes possible, a vehicle itself is not thieved.

In order to accomplish the above-described object, a remote start-up control apparatus (1) which relates to this invention is a remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, the remote start-up control apparatus including a first storage unit for storing a key code, a first supply unit for supplying the key code which is stored in the first storage unit to the start-up control apparatus, when it received a start-up instruction of the engine according to the remote operation, and a first execution prohibition control unit for carrying out prohibition control for prohibiting execution of all or a part of a series of processes which become necessary for enabling the start-up control apparatus to start up the engine, if it is judged that vehicle theft occurred, on the basis of a signal which is obtained from a theft detection unit for detecting theft of the vehicle, or another signal which corresponds to the signal.

According to the remote start-up control apparatus (1), when a start-up instruction of the engine according to a remote operation is received, the key code which has been stored in the first supply unit is designed to be supplied to the start-up control apparatus (immobilizer unit). On that account, if a key code, which is in conformity with the predetermined key code, has been stored in the first storage unit, even in case that there was the start-up instruction of the engine according to the remote operation, in the same manner as in such a case that a qualified ignition key was inserted into a key cylinder, a key code, which is in conformity with the predetermined key code, is supplied to the start-up control apparatus, and permission of start-up of the engine is given from the start-up control apparatus.

By this, even if there occurs no such a situation that a qualified ignition key is inserted into a key cylinder and turned, it is possible to start the engine by a remote operation. In passing, as the engine, cited is a motive energy generation device such as an engine of an internal combustion engine automobile, a motor of an electric automobile, and so on.

Further, according to the above-described remote start-up control apparatus (1), if it is judged that there occurred the vehicle theft, on the basis of the signal which is obtained from the theft detection signal for detecting a theft of the vehicle, or another signal which corresponds to the signal (e.g., a signal which is obtained indirectly through another device etc., but not directly from the theft detection unit), prohibited is all or a part of execution of a series of processes which become necessary for enabling the start-up control apparatus to start up the engine.

Also, the series of processes means processes from time when a start-up instruction of the engine according to the remote operation was received until time when the key code which has been stored in the first storage unit (i.e., a key code which becomes necessary for enabling the start-up of the engine) is supplied to the start-up control apparatus. On that account, when execution of all or a part of the series of processes is prohibited, the key code is ceased to be supplied to the start-up control apparatus.

Thus, in case that there occurred the vehicle theft, since the key code which has been stored in the first storage unit is ceased to be outputted to outside, it is possible to make difficult, an analysis of the key code which has been stored in the first storage unit (i.e., a key code which becomes necessary for enabling the start-up of the engine).

Also, even if realized by any chance is such a state that an operation of the remote start-up control apparatus (1) becomes possible by a transmitter which a burglar has, in case that there occurred the vehicle theft, the key code is not supplied to the start-up control apparatus, and therefore, it is possible to prevent the engine from being started up by use of the transmitter.

Also, a remote start-up control apparatus (2) which relates to this invention, in addition to the structure of the remote start-up control apparatus (1), is of such a structure that the first execution prohibition unit prohibits supply of the key code to the start-up control apparatus by the first supply unit.

According to the remote start-up control apparatus (2), if it is judged that there occurred the vehicle theft, the supply itself of the key code to the start-up control apparatus by the first supply unit is prohibited. Thus, it is possible to surely realize prohibition of an output of the key code to outside.

Also, a remote start-up control apparatus (3) which relates to this invention, in addition to the structure of the remote start-up control apparatus (1) or (2), further has an operator qualification judgment unit for judging whether an operation to a vehicle was carried out by a qualified operator or not, after the occurrence of the vehicle theft, and is of such a structure that, if it is judged that the operation to the vehicle was carried out by a qualified operator, by the operator qualification judgment unit, the first execution prohibition control unit does not carry out the prohibition control.

In the meantime, in the remote start-up control apparatus (1) or (2), if it is judged that there occurred the vehicle theft, expansion of theft damage is prevented by prohibiting execution of all or a part of a series of processes which become necessary for enabling the start-up control apparatus to start up the engine, but there is such a fear that it becomes one which is very difficult to be used by a qualified user, if the prohibition control is carried out even when a qualified user of the vehicle uses the vehicle, after a burglar went away from the vehicle.

According to the remote start-up control apparatus (3), after occurrence of the vehicle theft, if it is judged that an operation to the vehicle (e.g., engine start-up operation by use of an ignition key) is carried out by a qualified operator, the prohibition control by the first execution prohibition control unit is ceased to be carried out. Thus, since it is possible to easily realize re-commencement of the start-up of the engine according to a remote operation, it is possible to make a user-friendly one.

In passing, with regard to judgment of whether or not an operation to the vehicle is carried out by a qualified operator, it may be realized by detecting whether an engine was started up or not, by an operation of an ignition key. This is because, as described in the item of "Related Art", in case of a vehicle in which the start-up control apparatus (immobilizer unit) was equipped, if it is not an operation of a qualified ignition key which a qualified operator (user) should have, an engine does not start up. Also, by detecting whether an arming mode for watching out vehicle theft was unlocked, it is possible to judge whether the operation to the vehicle is carried out or not by a qualified operator.

Also, a remote start-up control apparatus (4) which relates to this invention is a remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, and enabling an additional registration of a transmitter to instruct the start-up of the engine by an remote operation, including a first storage unit for storing a key code, a first supply unit for supplying the key code which is stored in the first storage unit to the start-up control apparatus, when it received a start-up instruction of the engine according to the remote operation, an instruction source judgment unit for judging whether the start-up instruction of the engine is one which is based upon the remote operation from the transmitter which was additionally registered after a predetermined time point, and a second execution prohibition control unit for carrying out prohibition control for prohibiting execution of all or a part of a series of processes which become necessary for enabling the start-up control apparatus to start up the engine, in case that it is judged that the start-up instruction of the engine is one which is based upon the remote operation from the transmitter which was additionally registered after the predetermined time point, by the instruction source judgment unit.

According to the remote start-up control apparatus (4), in case of a start-up instruction from a transmitter which was newly registered, execution of all or a part of a series of processes which become necessary for enabling the start-up control apparatus to start up the engine is prohibited.

Also, the series of processes means processes from time when a start-up instruction of the engine according to the remote operation was received until time when the key code which has been stored in the first storage unit (i.e., a key code which becomes necessary for enabling the start-up of the engine) is supplied to the start-up control apparatus. On that account, when execution of all or a part of the series of processes is prohibited, the key code is ceased to be supplied to the start-up control apparatus.

Thus, even if realized is such a state that a transmitter which a burglar has is additionally registered by any chance as a transmitter for instructing the start-up of the engine according to a remote operation, and an operation of the remote start-up control apparatus (4) becomes possible, the key code is not supplied to the start-up control apparatus by the start-up instruction from the transmitter which was newly, additionally registered, and therefore, it is possible to prevent the engine from being started up by use of the transmitter.

Also, a remote start-up control apparatus (5) which relates to this invention is, in addition to the structure of the remote start-up control apparatus (4), of such a structure that the second execution prohibition control unit is one which prohibits supply of the key code to the start-up control apparatus by the second supply unit.

According to the remote start-up control apparatus (5), by the start-up instruction from the transmitter which was newly, additionally registered, supply itself of the key code which has been stored in the first storage unit (i.e., a key code which becomes necessary for enabling the start-up of the engine) to the start-up control apparatus is prohibited. Thus, it is possible to surely realize prohibition of supply of the key code to the start-up control apparatus, by the start-up instruction from the additionally registered transmitter.

Also, a remote start-up control apparatus (6) which relates to this invention is, in addition to the structure of the remote start-up control apparatus (4) or (5), of such a structure that the predetermined time point is such a time point that theft of the vehicle occurred, and the instruction source judgment unit is one which judges whether the start-up instruction of the engine is based upon the remote operation from the transmitter which was additionally registered after the time point when theft of the vehicle occurred, on the basis of a signal which is obtained from a theft detection unit for detecting theft of the vehicle, or another signal which corresponds to the signal.

In the meantime, in the remote start-up control apparatus (4) or (5), so as not for damage of theft to be expanded, even if a transmitter which a burglar has is additionally registered as a transmitter for instructing the start-up of the engine according to a remote operation, it is designed such that the key code which becomes necessary for enabling the start-up of the engine is not supplied to the start-up control apparatus, by the start-up instruction from the newly and additionally registered transmitter.

However, there is such a problem in this that, even if a qualified user uses the additionally registered transmitter, it is not possible to realize the start-up of the engine according to a remote operation.

According to the remote control apparatus (6), in case of the start-up instruction from the transmitter which was additionally registered after the time point that there occurred theft of the vehicle, supply of the key code which becomes necessary for enabling the start-up of the engine to the start-up control apparatus is prohibited.

Thus, even in case of the additionally registered transmitter, in case of the start-up instruction from the transmitter which was additionally registered before occurrence of the vehicle theft (i.e., a transmitter with such a high possibility that it was registered by a qualified user), the key code is supplied to the start-up control apparatus, so that it is possible to solve the above-described problem.

Also, a remote start-up control apparatus (7) which relates to this invention is, in addition to the structure of any one of the remote start-up control apparatuses (4) to (6), equipped with a user qualification judgment unit for judging whether the transmitter which was additionally registered after the predetermined time point was used by a qualified user or not, and is of such a structure that, if it is judged that the transmitter which was additionally registered was used by a qualified user, by the user qualification judgment unit, the second execution prohibition control unit does not carry out the prohibition control.

In the meantime, in case that the transmitter which was additionally registered after the predetermined time point (e.g., time point that there occurred theft of the vehicle) is used by a qualified user, there is no necessity of prohibiting supply of the key code to the start-up control apparatus, by the start-up instruction from the transmitter.

According to the remote start-up control apparatus (7), if it is judged that the transmitter which was additionally registered after the predetermined time point was used by a qualified user, even in case of the start-up instruction from the transmitter which was newly, additionally registered, the key code which becomes necessary for enabling the start-up of the engine is supplied to the start-up control apparatus. By this, it is possible to realize more improvement of user-friendliness, as well as a high anti-theft effect.

In passing, with regard to judgment of whether the additionally registered transmitter was used by a qualified user or not, it may be realized by detecting whether the transmitter was used or not, during such a period that a qualified ignition key which a qualified user should have is inserted into a key cylinder.

This is because, as described in the item of "Related Art", since a key code which is in conformity with the key code which has been registered in a qualified ignition key is stored in a remote start-up control apparatus or an immobilizer unit, it is possible to judge whether the qualified ignition key is inserted into the key cylinder or not in the remote start-up control apparatus (i.e., whether a qualified operation is carried out or not), and if the transmitter is used during such a period that the qualified operation is carried out, there is extremely high possibility that the transmitter was used by a qualified user.

Also, a remote start-up control apparatus (8) which relates to this invention is, in addition to the structure of any one of the remote start-up control apparatuses (4) to (6), equipped with an additional registration qualification judgment unit for judging whether an additional registration of a transmitter which was carried out after the predetermined time point was carried out by a qualified registrant or not, and is of such a structure that, if it is judged that the additional registration was carried out by a qualified registrant, by the additional registration qualification judgment unit, the second execution prohibition control unit does not carry out the prohibition control.

In the meantime, in case that additional registration of a transmitter which was carried out after the predetermined time point (e.g., time point that theft of the vehicle occurred) is carried out by a qualified registrant (user), there is no necessity of prohibiting supply of the key code to the start-up control apparatus, by the start-up instruction from the transmitter.

According to the remote start-up control apparatus (8), if it is judged that additional registration of a transmitter which was carried out after the predetermined time point was carried out by a qualified registrant, even in case of the start-up instruction from the transmitter which was newly, additionally registered, the key code which becomes necessary for enabling the start-up of the engine is supplied to the start-up control apparatus. By this, it is possible to realize more improvement of user-friendliness, as well as a high anti-theft effect.

In passing, with regard to judgment of whether additional registration of a transmitter which was carried out by a qualified registrant or not, it may be realized by detecting whether registration of the transmitter was carried out or not, during such a period that a qualified ignition key which a qualified user should have is inserted into a key cylinder.

This is because, as described above, since a key code which is in conformity with the key code which has been registered in a qualified ignition key is stored in a remote start-up control apparatus or an immobilizer unit, it is possible to judge whether the qualified ignition key is inserted into the key cylinder or not in the remote start-up control apparatus (i.e., whether a qualified operation is carried out or not), and if registration of the transmitter is carried out during such a period that the qualified operation is carried out, there is extremely high possibility that the transmitter was registered by a qualified registrant.

Also, a remote start-up control apparatus (9) which relates to this invention is a remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, including a first storage unit for storing a key code, a first supply unit for supplying the key code which is stored in the first storage unit to the start-up control apparatus, when it received a start-up instruction of the engine according to the remote operation, and a second supply unit for supplying a first request signal for requesting for prohibition or restriction of the start-up of the engine to the start-up control apparatus, if it is judged that vehicle theft occurred, on the basis of a signal which is obtained from a theft detection unit for detecting theft of the vehicle, or another signal which corresponds to the signal.

According to the remote start-up control apparatus (9), if it is judged that there occurred the vehicle theft, on the basis of the signal which is obtained from the theft detection unit for detecting theft of the vehicle, or another signal which corresponds to the signal (e.g., a signal which is obtained indirectly through another device and so on, but not directly from the theft detection unit), the first request signal is supplied to the start-up control apparatus.

Thus, even if the start-up control apparatus takes in a key code which is in conformity with the predetermined key code, in case that it received the first request signal, if it is configured so as not to enable the start-up of the engine, in case that there occurred the vehicle theft, it is possible to realize such a state that the start-up of the engine is not enabled.

By this, even if realized by any chance is such a state that an operation of the remote start-up control apparatus (9) becomes possible by a transmitter which a burglar has, in case that there occurred the vehicle theft, the start-up of the engine is not enabled, and therefore it is possible to prevent the engine from being started up by use of the transmitter.

In passing, as described above, if the start-up control apparatus is configured, in case that it received the first request signal, so as not to enable the start-up of the engine uniformly, regardless of a supply source of a key code (i.e., regardless of a case that the supply source of the key code is an ignition key, or a remote start-up control apparatus), it becomes impossible to start up the engine, in not only a remote operation, but also a normal operation (operation by use of the ignition key).

On that account, it maybe designed such that the start-up control apparatus is configured so as to be able to distinguish the supply source of the key code, and it does not give permission to the start-up of the engine uniformly but it does not give permission to the start-up of the engine, for example, only in case that the supply source of the key code is the remote start-up control apparatus. In this case, it is possible to start up the engine, by a normal operation.

Also, a remote start-up control apparatus (10) which relates to this invention is a remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, and enabling an additional registration of a transmitter to instruct the start-up of the engine by an remote operation, including a first storage unit for storing a key code, a first supply unit for supplying the key code which is stored in the first storage unit to the start-up control apparatus, when it received a start-up instruction of the engine according to the remote operation, an additional registration existence judgment unit for judging whether there exists a transmitter which was additionally registered after a predetermined time point, and a third supply unit for supplying a second request signal for requesting for prohibition or restriction of the start-up of the engine, in case that it was judged that there exists the transmitter which was additionally registered after the predetermined time point, by the additional registration existence judgment unit.

According to the remote start-up control apparatus (10), if it is judged that there exists a transmitter which was additionally registered after the predetermined time point, the second request signal is supplied to the start-up control apparatus. Thus, is the start-up control apparatus is configured so as no to give permission to the start-up of the engine, in case that it received the second request signal, even if it takes in a key code which is in conformity with the predetermined key code, it is possible to realize such a state that the start-up of the engine is not enabled, in case that there was newly an additional registration of a transmitter.

By this, even if a transmitter which a burglar has is additionally registered as a transmitter for instructing the start-up of the engine according to a remote operation, and realized by any chance is such a state that an operation of the remote start-up control apparatus (10) becomes possible, in case that there was newly an additional registration of a transmitter, the start-up of the engine is not enabled, and therefore, it is possible to prevent the engine from being started up by use of the transmitter.

In passing, as described above, if the start-up control apparatus is configured, in case that it received the first request signal, so as not to enable the start-up of the engine uniformly, regardless of a supply source of a key code (i.e., regardless of a case that the supply source of the key code is an ignition key, or a remote start-up control apparatus), it becomes impossible to start up the engine, in not only a remote operation, but also a normal operation (operation by use of the ignition key).

On that account, it maybe designed such that the start-up control apparatus is configured so as to be able to distinguish the supply source of the key code, and it does not give permission to the start-up of the engine uniformly but it does not give permission to the start-up of the engine, for example, only in case that the supply source of the key code is the remote start-up control apparatus. In this case, it is possible to start up the engine, by a normal operation.

Also, a remote start-up control apparatus (11) which relates to this invention is of such a structure that the predetermined time point is such a time point that theft of the vehicle occurred, and the additional registration existence judgment unit is one which judges whether there exists the transmitter which was additionally registered after the time point when the theft of the vehicle occurred, on the basis of a signal which is obtained from a theft detection unit for detecting theft of the vehicle, or another signal which corresponds to the signal.

In the meantime, in the remote start-up control apparatus (10), so as not for damage of theft to be expanded, even if a transmitter which a burglar has is additionally registered as a transmitter for instructing the start-up of the engine according to a remote operation, it is designed such that the second request signal is not supplied to the start-up control apparatus, and at least the start-up of the engine according to a remote operation is not realized.

However, there is such a problem in this that, even in case that a qualified user additionally registers a transmitter; it is not possible to realize the start-up of the engine according to a remote operation.

According to the remote start-up control apparatus (11), only in case that there exists the transmitter which was additionally registered after the time point that theft of the vehicle occurred, the second request signal is supplied to the start-up control apparatus. Thus, even if there exists a transmitter which was additionally registered, in case that the additional registration is carried out before occurrence of the vehicle theft (i.e., in case that there is extremely high possibility that it was registered by a qualified registrant), the second request signal is not supplied to the start-up control apparatus, and therefore, it is possible to solve the above-described problem.

Also, a remote start-up control apparatus (12) which relates to this invention is, in addition to the structure of the remote start-up control apparatus (10) or (11), equipped with a user qualification judgment unit for judging whether the transmitter which was additionally registered after the predetermined time point was used by a qualified user or not, and is of such a structure that, if it is judged that the transmitter which was additionally registered was used by a qualified user, by the user qualification judgment unit, the third supply unit does not supply the second request signal to the start-up control apparatus.

In the meantime, in case that a transmitter which was additionally registered after the predetermined time point (e.g., time point that theft of the vehicle occurred) is used by a qualified user, there is no necessity of supplying the second request signal to the start-up control apparatus to prohibit the start-up of the engine.

According to the remote start-up control apparatus (12), if it is judged that the transmitter which was additionally registered after the predetermined time point was used by a qualified user, the second request signal is not supplied to the start-up control apparatus. By this, it is possible to realize more improvement of user-friendliness, as well as a high anti-theft effect.

In passing, with regard to judgment of whether or not the transmitter which was additionally registered was used by a qualified user, it may be realized by detecting whether the transmitter was used or not, during such a period that a qualified ignition key is inserted into a key cylinder.

Also, a remote start-up control apparatus (13) which relates to this invention is, in addition to the structure of the remote start-up control apparatus (10) or (11), equipped with an additional registration qualification judgment unit for judging whether the additional registration of the transmitter which was additionally registered after the predetermined time point was carried out by a qualified registrant or not, and is of such a structure that if it is judged that the additional registration was carried out by a qualified registrant, by the additional registration qualification judgment unit, the third supply unit does not supply the request signal to the start-up control apparatus.

In the meantime, in case that additional registration of a transmitter which was carried out after the predetermined time point (e.g., time point that theft of the vehicle occurred) was registered by a qualified registrant (user), there is not necessity of supplying the second request signal to the start-up control apparatus to prohibit the start-up of the engine.

According to the remote start-up control apparatus (13), if it is judged that additional registration of a transmitter which was carried out after the predetermined time point is carried out by a qualified registrant, the second request signal is not supplied to the start-up control apparatus. By this, it is possible to realize more improvement of user-friendliness, as well as a high anti-theft effect.

In passing, with regard to judgment of whether or not the additional registration of a transmitter was carried out by a qualified registrant, it may be realized by detecting whether the registration of a transmitter was carried or not, during such a period that a qualified ignition key is inserted into a key cylinder.

Also, a remote start-up control apparatus (14) which relates to this invention is a remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, including a first storage unit for storing a key code, a first supply unit for supplying the key code which is stored in the first storage unit to the start-up control apparatus, when it received a start-up instruction of the engine according to the remote operation, a first setup unit for setting a state for prohibiting, on the basis of a second predetermined operation, supply of the key code to the start-up control apparatus by the first supply unit, and a third execution prohibition control unit for carrying out prohibition control for prohibiting execution of all or a part of a series of processes which become necessary for enabling the start-up control apparatus to start up the engine, when the state was set up by the first setup unit.

According to the remote start-up control apparatus (14), when a state for prohibiting supply of the key code to the start-up control apparatus according to the first supply unit is set up, on the basis of the second predetermined operation, execution of all or a part of a series of processes which become necessary for enabling the start-up control apparatus to start up the engine is prohibited.

Also, the series of processes means processes from time when a start-up instruction of the engine according to the remote operation was received until time when the key code which has been stored in the first storage unit (i.e., a key code which becomes necessary for enabling the start-up of the engine) is supplied to the start-up control apparatus. On that account, when execution of all or a part of the series of processes is prohibited, the key code is ceased to be supplied to the start-up control apparatus.

Thus, it is possible for a user to compulsorily prohibit the start-up of the engine according to a remote operation, by carrying out the second predetermined operation. The suchlike control is especially useful for such a case that the vehicle is not used for a long period on a business trip, on a trip and so on.

Also, a start-up control apparatus (1) which relates to this invention is a start-up control apparatus equipped in a vehicle, which has a second storage unit for storing a key code, and requests a key code output device which can output a key code for an output of a key code on the basis of a first predetermined operation, and takes in the key code which is outputted in response to the request, and judges whether the taken-in key code is in conformity with a predetermined key code which is stored in the second storage unit, and has a function for enabling start-up of an engine, in case that it was judged that these key codes are in conformity with each other, including a fourth execution prohibition control unit for carrying out prohibition control for prohibiting execution of all or a part of a series of processes which become necessary for enabling the start-up control apparatus to start up the engine, when it receives a first prohibition request signal for requesting for prohibition of the start-up of the engine, or another signal which corresponds to the first prohibition request signal.

According to the start-up control apparatus (1), when it receives the first prohibition request signal for requesting for prohibition of the start-up of the engine, or another signal which corresponds to the first prohibition request signal, execution of all or a part of a series of processes which become necessary for enabling the start-up of the engine is prohibited.

Also, the series of processes means processes from time when an output of a key code is requested to the key code output device, on the basis of the first predetermined operation (e.g., insertion of an ignition key into a key cylinder) until time when the start-up of the engine is enabled. On that account, when execution of all or a part of the series of processes is prohibited, the start-up of the engine is not enabled.

Thus, in case that there occurred the vehicle theft, if it is configured such that any device supplies the first prohibition request signal to the start-up control apparatus, in case that there occurred the vehicle theft, it is possible to not enable the start-up of the engine.

By this, as described in the item of "Related Art", even if a remote start-up control apparatus is mounted in a vehicle in which a start-up control apparatus (immobilizer unit) was equipped, and realized by any chance is such a state that an operation of the remote start-up control apparatus becomes possible by a transmitter which a burglar has, in case that there occurred the vehicle theft, the start-up of the engine is not enabled, and therefore, it is possible to prevent the engine from being started up by use of the transmitter.

Also, a start-up control apparatus (2) which relates to this invention is a start-up control apparatus equipped in a vehicle, which has a third storage unit for storing a plurality of key codes, and requests a key code output device which can output a key code for an output of a key code on the basis of a first predetermined operation, and takes in the key code which is outputted in response to the request, and judges whether the taken-in key code is in conformity with a predetermined key code which is stored in the third storage unit, and has a function for enabling start-up of an engine, in case that it was judged that these key codes are in conformity with each other, wherein the third storage unit is configured so as to distinguish a key code which is in conformity with a key code which is supplied from a remote start-up control apparatus for carrying out start-up control of the engine on the basis of a remote operation from another key code and for storing them, and further including, a fifth execution prohibition control unit for giving no permission of the start-up of the engine, by a key code which was supplied from the remote start-up control apparatus, when it receives a second prohibition request signal for requesting for prohibition of the start-up of the engine, or another signal which corresponds to the second prohibition request signal.

According to the start-up control apparatus (2), since it is configured such that the third storage unit can distinguish and store a key code which is in conformity with the key code which is supplied from a remote start-up control apparatus for carrying out start-up control of the engine on the basis of a remote operation, from another key code, it is possible to distinguish a supply source of a key code. For example, it is possible to distinguish which a supply source of a key code is an ignition key or a remote start-up control apparatus.

Also, according to the start-up control apparatus (2), when it receives the second prohibition request signal for prohibiting permission of the start-up of the engine, or another signal which corresponds to the second prohibition request signal, a key code which was supplied from the remote start-up control apparatus cannot give permission of the start-up of the engine.

Thus, in case that there occurred the vehicle theft, if it is configured such that any device supplies the second prohibition request signal to the start-up control apparatus, in case that there occurred the vehicle theft, it is possible to not enable the start-up of the engine.

By this, as described in the item of "Related Art", even if a remote start-up control apparatus is mounted in a vehicle in which a start-up control apparatus (immobilizer unit) was equipped, and realized by any chance is such a state that an operation of the remote start-up control apparatus becomes possible by a transmitter which a burglar has, in case that there occurred the vehicle theft, the start-up of the engine is not enabled, and therefore, it is possible to prevent the engine from being started up by use of the transmitter.

Also, according to the start-up control apparatus (2), when it receives the second prohibition request signal, the start-up of the engine according to a remote operation is not enabled, but the start-up of the engine according to a normal operation (e.g., insertion of an ignition key in to a key cylinder) is enabled, so that it is possible to make a very easy-to-use one for a user.

Also, a start-up control apparatus (3) which relates to this invention is a start-up control apparatus equipped in a vehicle, which has a second storage unit for storing a plurality of key codes, and requests a key code output device which can output a key code for an output of a key code on the basis of a first predetermined operation, and takes in the key code which is outputted in response to the request, and judges whether the taken-in key code is in conformity with a predetermined key code which is stored in the second storage unit, and has a function for enabling start-up of an engine, in case that it was judged that these key codes are in conformity with each other, further including a second setup unit for setting a state for giving no permission of the start-up of the engine, on the basis of a third predetermined operation, and a sixth execution prohibition control unit for carrying out prohibition control for prohibiting execution of all or a part of a series of processes which become necessary for enabling the start-up control apparatus to start up the engine, when the state is set up by the second setup unit.

According to the start-up control apparatus (3), when a state for giving no permission of the start-up of the engine, on the basis of the third predetermined operation, execution of all or a part of a series of processes which become necessary for enabling the start-up of the engine is prohibited.

Also, the series of processes means processes from time when an output of a key code is requested to the key code output device, on the basis of the first predetermined operation (e.g., insertion of an ignition key into a key cylinder) until time when the start-up of the engine is enabled. On that account, when execution of all or a part of the series of processes is prohibited, the start-up of the engine is not enabled.

Thus, it is possible for a user to compulsorily prohibit the start-up of the engine according to a remote operation, by carrying out the third predetermined operation. The suchlike control is especially useful for such a case that the vehicle is not used for a long period on a business trip, on a trip and so on.

BRIEF DESCRIPTION OF THE DRAWINGS

These and other objects and advantages of this invention will become more fully apparent from the following detailed description taken with the accompanying drawings in which:

FIG. 7 is a flow chart which showed a process operation (setup/release processing) which the remote start-up microcomputer in the remote start-up control apparatus which relates to the first embodiment carries out;

FIG. 8 is a view which showed one example of a storage format of an EEPROM for storing a remote ID code in a remote start-up control apparatus which relates to a second embodiment;

FIG. 11A is a flow chart which showed a process operation (program processing) which the remote start-up microcomputer in the remote start-up control apparatus which relates to the second embodiment carries out;

FIG. 20 is a view which showed one example of a storage format of an EEPROM for storing a remote ID code in a remote start-up control apparatus which relates to a fourth embodiment;

FIG. 21 is a view which showed one example of a storage format of an EEPROM for storing a key code in a start-up control apparatus which relates to the fourth embodiment;

FIG. 27A is a flow chart which showed a process operation (program processing) which the microcomputer in the start-up control apparatus which relates to the fourth embodiment carries out;

DETAILED DESCRIPTION OF THE PREFERRED EMBODIMENTS

Figure 1:
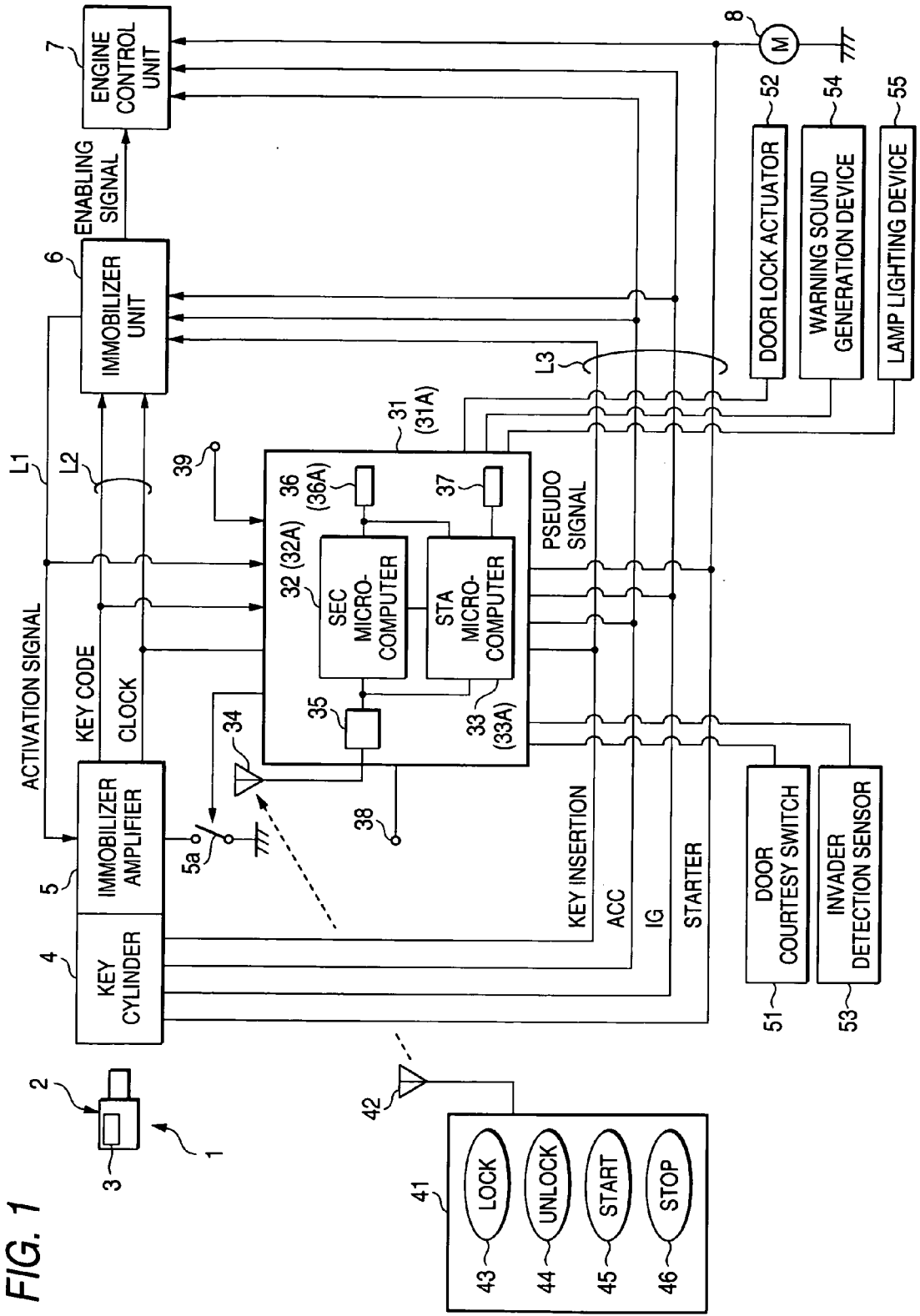
FIG. 1 is a block diagram which schematically showed a relevant part of an engine start-up system in which a remote start-up control apparatus which relates to a first embodiment of this invention, i.e., a mode (1) for carrying out this invention.
Figure 28:
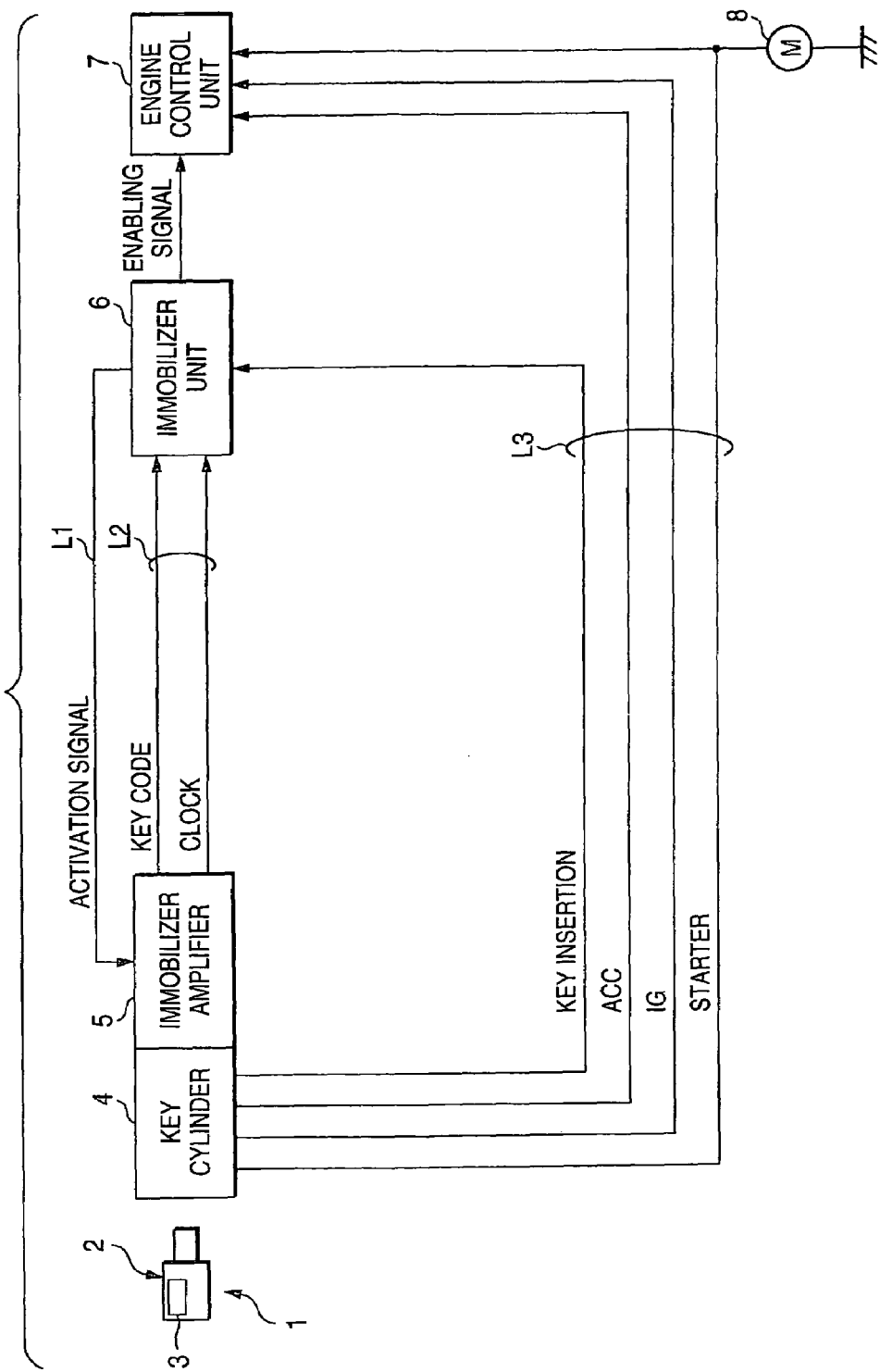
FIG. 28 is a block diagram which schematically showed a relevant part of a conventional engine start-up system.
Figure 29:
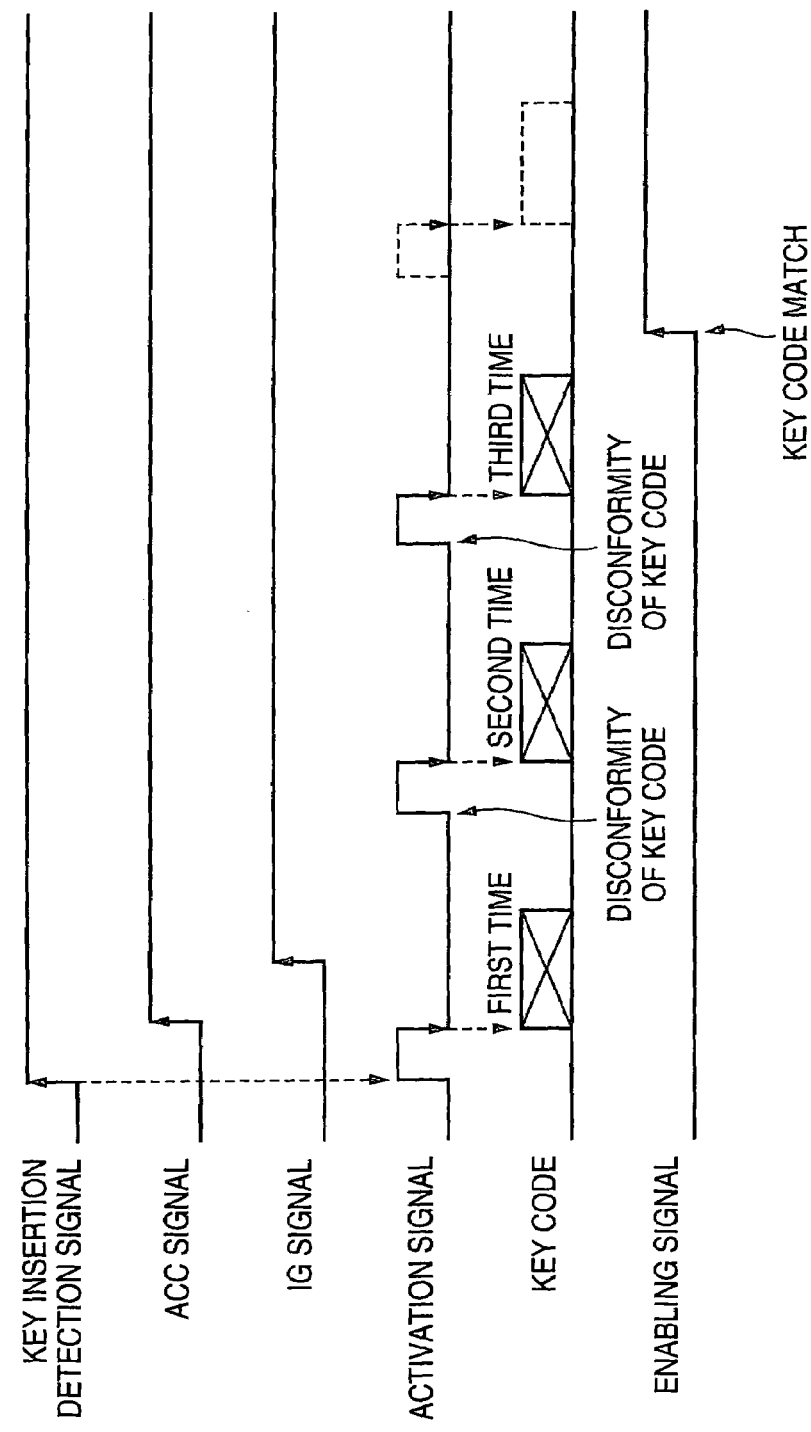
FIG. 29 is a timing chart which showed a flow from such time point that an ignition key was inserted into a key cylinder to such time point that an enabling signal is outputted to an engine control unit.
Figure 30:
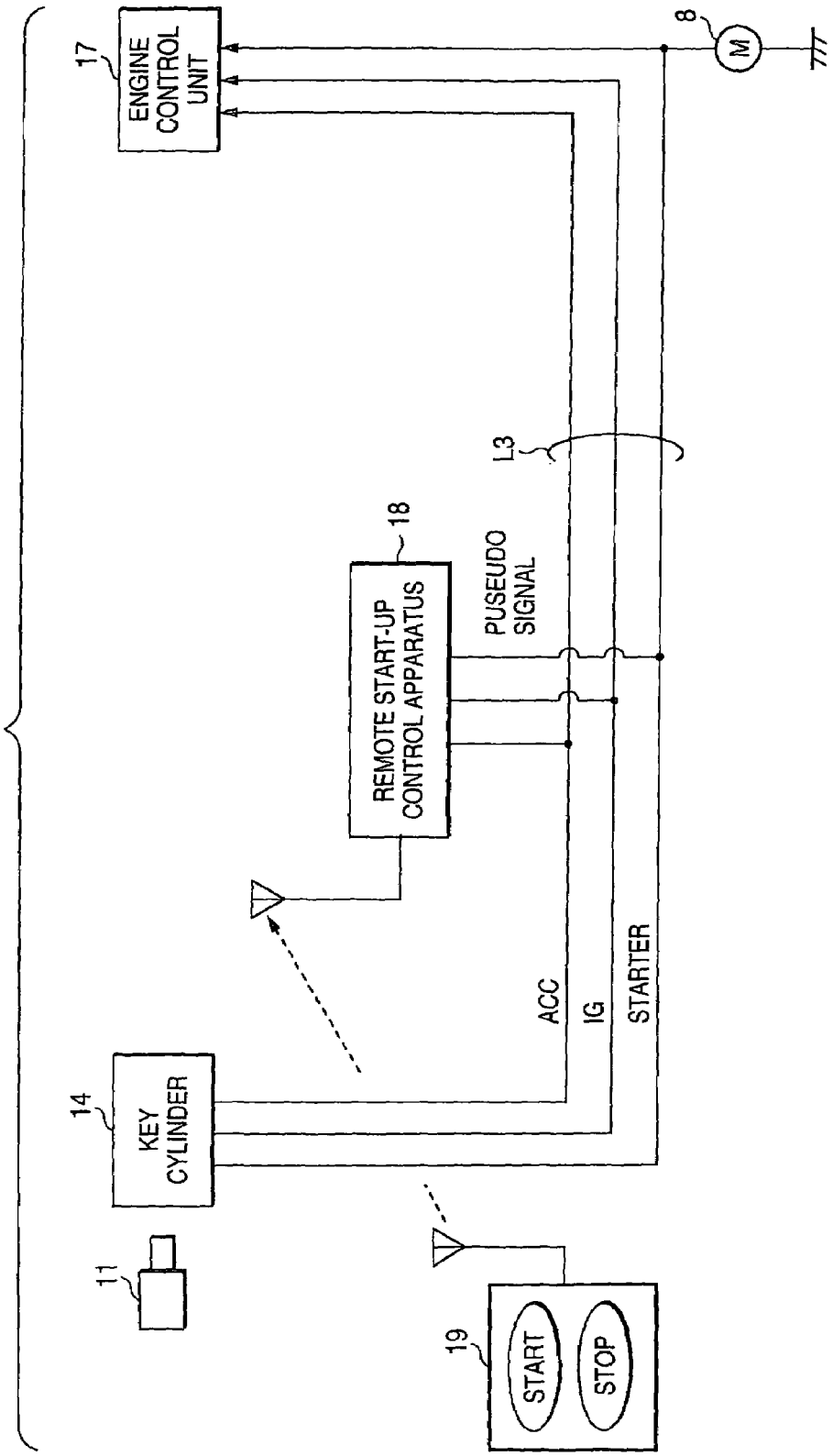
FIG. 30 is a block diagram which schematically showed a relevant part of an engine start-up system in which another conventional remote start-up control apparatus was adopted.
Figure 31:
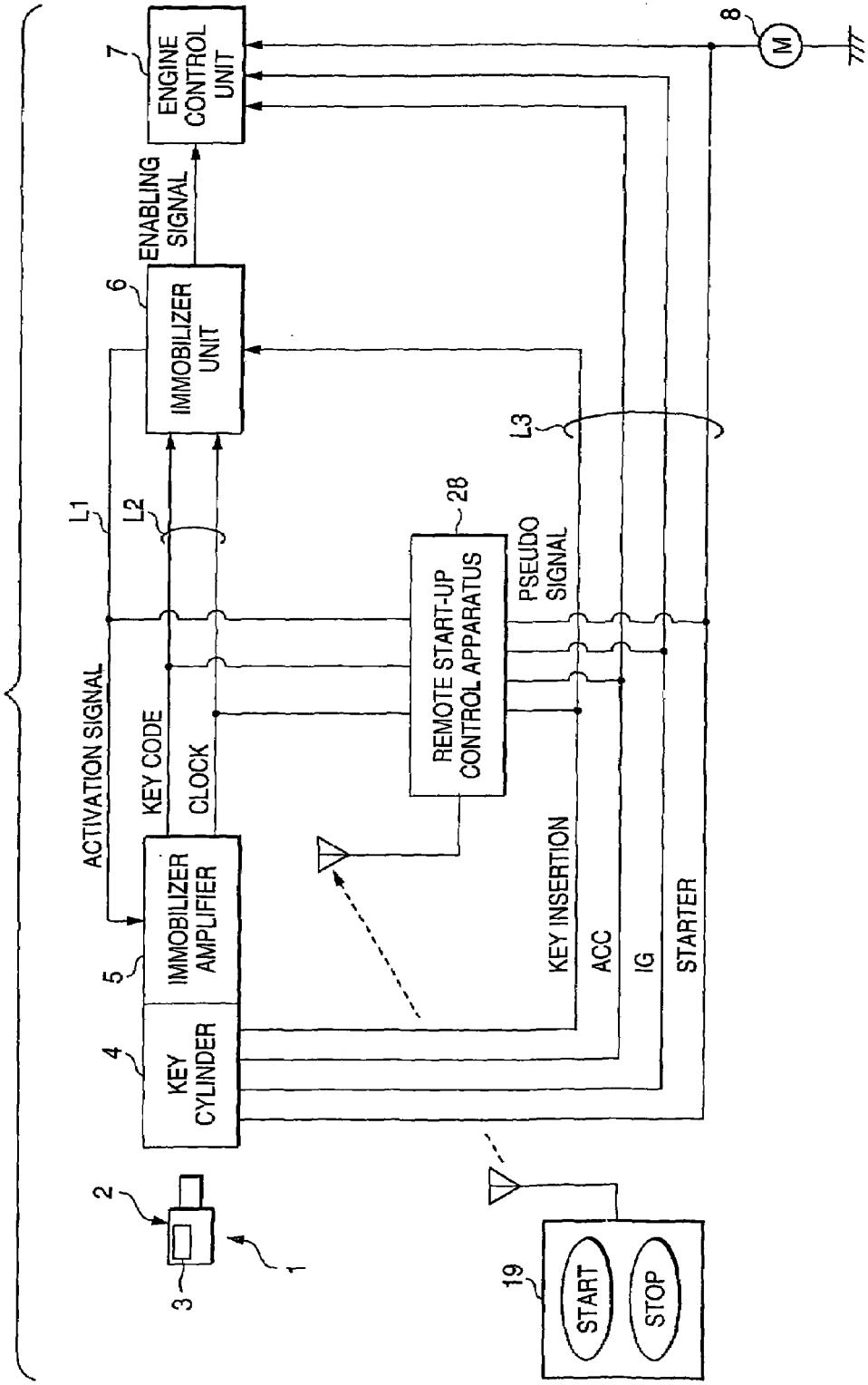
FIG. 31 is a block diagram which schematically shows a relevant part of an engine startup system in which a remote startup control apparatus is adopted.

Hereinafter, an embodiment, as a mode for carrying out this invention, of a remote start-up control apparatus, and a start-up control apparatus which relate to this invention will be described on the basis of the drawings. FIG. 1 is a block diagram which schematically showed a relevant part of an engine start-up system in which a remote start-up control apparatus which relates to a first embodiment was adopted. In passing, here, the same numerals and signs are given to the same structural portions as in the engine start-up system shown in FIG. 28.

The engine start-up system in which the remote start-up control apparatus which relates to the first embodiment was adopted is configured by including an ignition key 1 in which a certain specific key code is stored and which incorporates in a grip part 2, a transponder 3 having a transmission function, a key cylinder 4, an immobilizer amplifier 5 attached to the key cylinder 4 for extracting a key code from the ignition key 1, an immobilizer unit 6 for storing a certain specific key code and having a function as anti-theft, an engine control unit 7 for carrying out control of engine start-up and so on, a remote start-up control apparatus 31, and a portable transmitter 41.

The remote start-up control apparatus 31 has a function for controlling start-up of an engine, on the basis of an instruction from the portable transmitter 41, and a function for blowing a warning whistle and so on, when it detects a theft state, and is configured by including a security (SEC) microcomputer 32, a remote start-up (STA) microcomputer 33, an antenna 33 for receiving a signal which is being sent from the portable transmitter 41, and a receiving unit 35, an EEPROM 36 in which a remote ID code was stored, an EEPROM 37 for storing a key code which is in conformity with the key code which has been stored in the immobilizer unit 6 (i.e., a key code which is stored in the qualified ignition key 1), and a program switch 38 which is utilized for a setup of a program mode (program mode for writing a key code into the EEPROM 37, and so on).

The portable transmitter 41 is configured by including an antenna 42 for transmitting a predetermined signal to the remote start-up control apparatus 31, an EEPROM (not shown) in which the remote ID code was stored, a button switch 43 for instructing a lock of a door by a remote operation, a button switch 44 for instructing a unlock of the door, a button switch 45 for instructing the start-up of the engine, and a button switch for instructing a stop of the engine.

A microcomputer of the portable transmitter 41 is designed to transmit a signal which is configured by including the remote ID code and an instruction code of a door lock from the antenna 42 to outside, when the button switch 43 is pushed down, and on the other hand, to transmit a signal which is configured by including the remote ID code and an instruction code of the unlock of the door from the antenna 42 to outside, when the button switch 44 is pushed down.

Also, the microcomputer of the portable transmitter 41 is designed to transmit a signal which is configured by including the remote ID code and an instruction code of an engine start-up from the antenna 42 to outside, when the button switch 45 is pushed down, and on the other hand, to transmit a signal which is configured by including the remote ID code and an instruction code of an engine stop from the antenna 42 to outside, when the button switch 46 is pushed down.

It is designed such that the security microcomputer 32, and the remote start-up microcomputer 33 can take in a signal which is being sent from the portable transmitter 41, through the antenna 34 and the receiving unit 35, and also, the security microcomputer 32 can carry out judgment of whether or not the taken-in signal is one which was sent from the qualified portable transmitter 41, on the basis of the remote ID code which has been stored in the EEPROM 36. In passing, with regard to the judgment of whether or not the taken-in signal is one which was sent from the qualified portable transmitter 41, it maybe be carried out in the remote start-up microcomputer.

Also, to the security microcomputer 32, a door courtesy switch 51 for detecting a state of opening and closing of a door, a door lock actuator 52, an invader detection sensor 53 for detecting an invader into a vehicle, a warning sound generation device 54 for blow a warning whistle, and a lamp lighting device 55 for lighting a hazard lamp and so on are connected.

The remote start-up microcomputer 33 which is capable of communicating with the security microcomputer 32 is designed to cut power supply to the immobilizer amplifier 5, by controlling opening and closing of a switch 5a which is connected to the immobilizer amplifier 5, or to blow a warning whistle, by controlling the warning sound generation device 54, and to light a hazard lamp and so on, by controlling the lamp lighting device 55.

Also, to the remote start-up microcomputer 22, an alternator L terminal 39 for outputting a Low signal when the engine is stopped and for outputting a High signal when the engine is started up is connected, so that it is possible to carry out judgment of whether or not the engine is started up by the remote start-up microcomputer 33.

Figure 2:
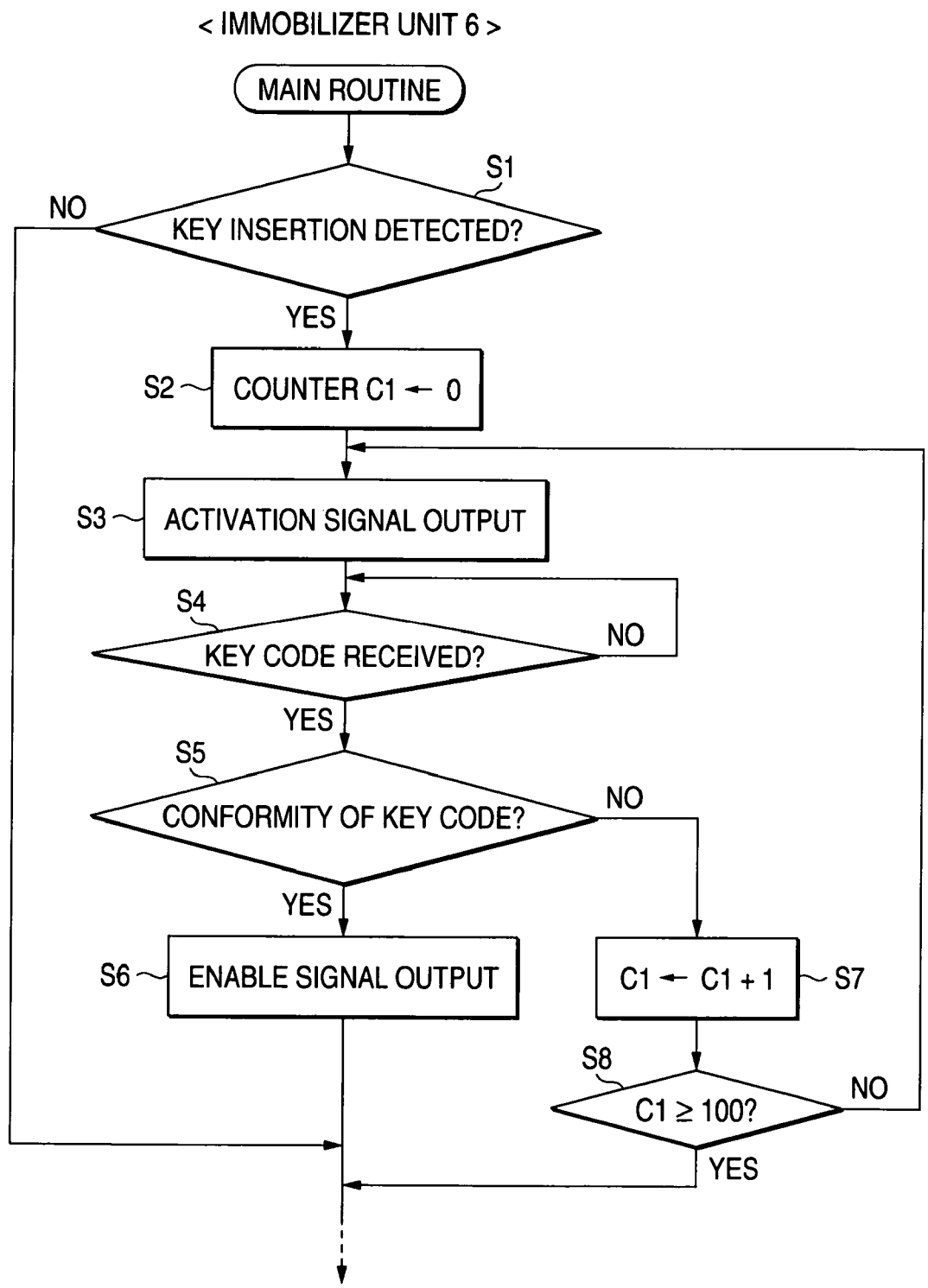
FIG. 2 is a flow chart which showed a process operation which a microcomputer in an immobilizer unit carries out.

When the ignition key 1 is inserted into the key cylinder 4 by a driver, a key insertion signal is turned in a High state, and the immobilizer unit 6 which received this transmits a pulse shaped activation signal to the immobilizer amplifier 5 through the signal line L1, so as to request an output of a key code. In passing, a timing chart from time when the ignition key 1 is inserted into the key cylinder 4 until time when an enabling signal is outputted to the engine control part 7 is as shown in FIG. 2.

The immobilizer amplifier 5 is designed to, when it receives the activation signal, supply electric power by electromagnetic induction, and to have the transponder 3 of the ignition key 1 which has been inserted into the key cylinder 4 activated; and thereby 7 to extract a key code (which is specific to the ignition key 1) which is stored in the transponder 3, and to output the extracted key code, together with a clock signal, through the signal line L2 to the immobilizer unit 6.

The immobilizer unit 6 judges whether or not the key code (which is specific to the ignition key 1) which was transmitted from the immobilizer amplifier 5 is in conformity with a key code which has been stored in the immobilizer unit 6 (verification of a key code), and when it judges that these key codes are in conformity with each other, which means that the qualified ignition key 1 is inserted into the key cylinder 4, it gives an enabling signal for enabling the engine start-up, to the engine control unit 7, counting a driver who inserted the ignition key 1 into the key cylinder 4 as a qualified driver. In passing, a key code which is stored in the immobilizer unit 6 is not limited to one.

On one hand, if it is judged that the key code which was sent from the immobilizer amplifier 5 is not in conformity with the key code which has been stored in the immobilizer unit 6 (disconformity of key codes), the activation signal is designed to be sent again to the immobilizer amplifier 5. In passing, this operation is repeatedly continued until time when both codes are in conformity with each other (which is repeated approximately 100 times at most, with respect to approximately each 100 millisecond).

Also, the engine control unit 7 is designed to carry out start-up control of the starter motor 8, when it receives a starter signal which is outputted from the key cylinder 4, after it received the enabling signal, and adversely, is designed not to carry out the start-up control of the starter motor 8, in case that it received the starter signal, under such a state that it does not receive the enabling signal.

In this manner, if the key code which has been stored in the transponder 3 of the ignition key 1 is not in conformity with the key code which has been stored in the immobilizer unit 6, it is not possible to start up the engine. On that account, it is not possible to have the engine started, by a illegal direct connection of the ignition key and the ignition switch, so that it is possible to prevent vehicle theft. In passing, the remote start-up control apparatus 31 is connected to the signal lines L1 to L3, and it is designed such that various signals are transmitted and received by use of these signal lines L1 to L3.

Next, a process operation [1] (main routine) which the immobilizer unit 6 carries out will be described on the basis of a flow chart shown in FIG. 2. Firstly, judged is whether the key insertion signal (Low→High) was received or not (step S1). In order for the key insertion signal to change from a Low state to a High state, there are such a case that the ignition key 1 was inserted into the key cylinder 4 (Case I) and such a case that an engine start-up instruction according to a remote operation was carried out (Case II).

In the step S1, if it is judged that the key insertion signal was received, then, a counter C1 is set to 0 (step S2), and the pulse shaped activation signal is supplied to the signal line L1, and the activation signal is sent to the immobilizer amplifier 5 and the remote start-up control apparatus 31 (step S3), and after that, such a state that the key code is being sent is waited for (step S4). On one hand, if it is judged that the key insertion signal is not received, the routine goes to another process as it is.

In the meantime, the immobilizer amplifier 5 is designed to, when it receives the activation signal, extract the key code (which is specific to the ignition key 1) which has been stored in the transponder 3, by activating the transponder 3 of the ignition key 1 which has been inserted into the key cylinder 4, and to output the extracted key code, together with the clock signal, to the immobilizer unit 6 through the signal line L2 (in case of Case I).

Also, the remote start-up control apparatus 31 is designed to, when it receives the activation signal, to output the key code (which is specific to the ignition key 1) which has been stored in the EEPROM 3, together with the clock signal, to the immobilizer unit 6 through the signal line L2 (in case of Case II).

In the step S4, if it is judged that the key code was received, then, judged is whether or not the received key code is in conformity with the predetermined key code which has been stored in the immobilizer unit 6 (step S5), and if it is judged that these key code are in conformity with each other, then, the enabling signal for enabling the engine start-up is sent to the engine control unit 7 (step S6).

On the other hand, in the step S5, in case that it is judged that these key codes are not in conformity with each other, 1 is added to the counter C1 (step S7), and the counter C1 to which 1 was added judges whether or not it shows a predetermined value (e.g., 100 times) and above (step S8), and if the counter C1 judges that it does not show 100 times and above, then, the routine returns to the step S3, and the activation signal is sent, and such a state that the key code is being sent is waited for again. On the other hand, if the counter C1 judges that it shows 100 times and above, the routine goes to another process as it is.

Next, a process operation [2] (main routine) which the security microcomputer 32 in the remote start-up control apparatus 31 which relates to the first embodiment carries out will be described on the basis of a flow chart shown in FIG. 3. Firstly, taking-in a signal from the door courtesy switch 51, and processing such as A/D conversion of a sensor signal which is obtained from the invader detection sensor 53 are carried out (step S11), and then, thorough the antenna 34 and the receiving unit 35, judged is whether there was reception of the signal or not (step S12).

If it is judged that there was reception of the signal, judged is whether or not an ID code which is contained in the received signal is in conformity with the remote ID code which has been stored in the EEPROM 36 (step S13). If it is judged that the ID code which is contained in the received signal is in conformity with the remote ID code (i.e., received was a signal which was sent from the portable transmitter 41 which a qualified driver takes along), then, an instruction code is pulled out from the signal (step S14), and on the basis of the instruction code which was pulled out, judged is whether a lock of a door is instructed or not (step S15).

If it is judged that a lock of a door is instructed, then, on the basis of a signal which is obtained from the door courtesy switch 51, judged is whether all doors are closed or not (step S16), and if it is judged that all doors are closed, by controlling the door lock actuator 52, doors are locked (step S17), and by setting an arming mode setup flag $f_{arm}$ for watching out vehicle theft to 1, the arming mode is set up (step S18), and after that, the routine goes to a step S19. On one hand, if it is judged that even one of the doors is opened, the routine goes to the step S19 as it is.

In the step S19, judged is whether the arming mode setup flag $f_{arm}$ is 1 or not (i.e., whether the arming mode is set up or not), and if it is judged that the flag $f_{arm}$ is 1 (i.e., the arming mode is set up), then, on the basis of a signal which is obtained from the invader detection sensor 53, judged is whether there was unjust invasion into a vehicle or not (step S20).

If it is judged that there was unjust invasion into a vehicle, alarm is generated in such a manner that, by controlling the warning sound generation device 54, warning sound is generated, or by controlling the lamp lighting device 55, a hazard lamp is lit up (step S21). Then, a flag $f_{rob-1}$ showing that it is in a theft state is set to 1 (step S22), and a theft state detection signal for showing that it is in the theft state is sent to the remote start-up microcomputer 33 (step S23), and after that, the routine goes to another process. In passing, with regard to a process operation in case that the remote start-up microcomputer 33 received the theft state detection signal, it will be described later in detail, on the basis of a flow chart shown in FIG. 4.

Also, in the step S19, if it is judged that the arming mode is not set up (the arming mode setup flag $f_{arm}$ is 0), or if it is judged that there was no unjust invasion into a vehicle in the step S20, the routine goes to another process as it is.

In the meantime, in the step S15, if it is judged that a lock of a door is not instructed, then, judged is whether a unlock of a door is instructed or not (step S24), and if it is judged that the unlock of a door is instructed, a door is unlocked by controlling the door unlock actuator 52 (step S25), and the arming mode is released by setting the arming mode setup flag $f_{arm}$ to 0 (step S26), and after that, judged is whether the flag $f_{rob-1}$ showing that it is in the theft state is 1 or not (step S27).

If it is judged that the flag $f_{rob-1}$ is 1, firstly, the flag $f_{rob-1}$ is set to 0, since a process for returning the flag $f_{rob-1}$ to 0 and so on becomes necessary (step S28), and then, a theft state release signal for showing that the theft state is released is sent to the remote start-up microcomputer 33 (step S29), and after that, the routine goes to the step S19. In passing, with regard to a process operation in case that the remote start-up microcomputer 33 received the theft state release signal, it will be described later in detail, on the basis of the flow chart shown in FIG. 4.

On one hand, in the step S27, if it is judged that the flag $f_{rob-1}$ is not 1, since there is no necessity of carrying out the steps S28 and S29, the routine goes to the step S19 as it is.

Also, in the step S24, if it is judged that a unlock of a door is not instructed, then, judged is whether any one of a start-up and a stop of an engine is instructed or not (step S30), and if it is judged that any one of the start-up and the step of an engine is instructed, a code which corresponds to each instruction is sent to the remote start-up microcomputer 33 (step S31), and after that, the routine goes to the step S19. In passing, with regard to a process operation in case that the remote start-up microcomputer 33 received the code, it will be described later in detail, on the basis of a flow chart shown in FIG. 4.

On one hand, in the step S30, if it is judged that both of the start-up and the stop of an engine is not instructed, since there is no necessity of carrying out the step S31, the routine goes to the step S19 as it is.

Figure 4:
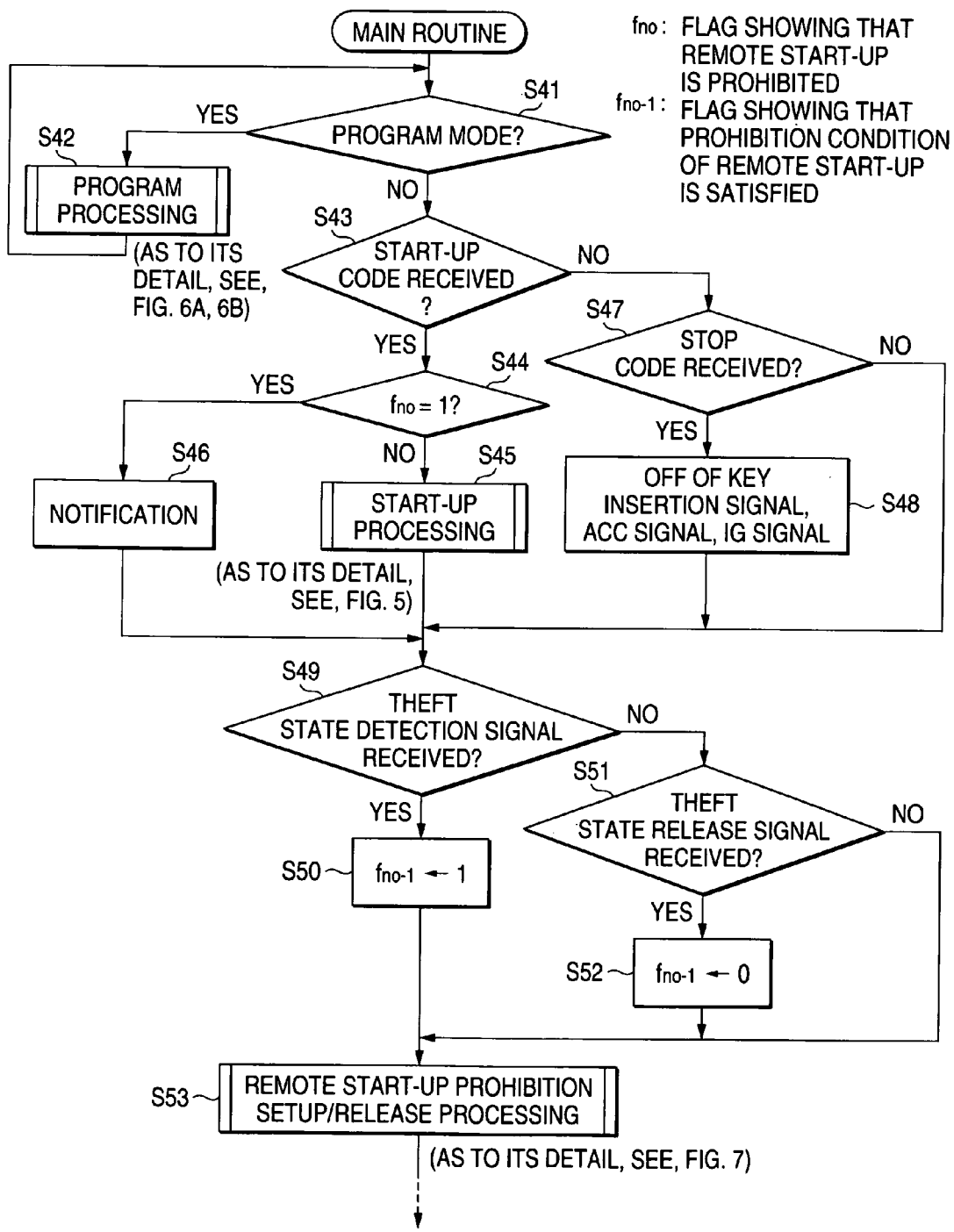
FIG. 4 is a flow chart which showed a process operation (main routine) which a remote start-up microcomputer in the remote start-up control apparatus which relates to the first embodiment carries out.

Next, a process operation [3] (main routine) which the start-up microcomputer 33 in the remote start-up control apparatus 31 which relates to the first embodiment carries out will be described on the basis of a flow chart shown in FIG. 4. Firstly, judged is whether the program mode (program mode for writing a key code in the EEPROM 37, and so on) is set up or not (step S41), and if it is judged that the program mode is set up, the routine goes to a step S42, and a program process is carried out (as to its detail, see, FIGS. 6A and 6B), and after that, the routine goes back to the step S41. As described in detail later, the program mode is designed to be setup by push-down of the program switch 38, and so on.

On one hand, if it is judged that the program mode is not set up, then, judged is whether an instruction code for instructing an engine start-up which is being sent from the security microcomputer 32 was received or not (step S43). If it is judged that the instruction code for instructing the engine start-up was received, then, judged is whether a flag $f_{no}$ showing that the engine start-up according to a remote operation is prohibited is 1 (as to its detail, see FIG. 7) or not (step S44).

If it is judged that the flag $f_{no}$ is not 1 (i.e., the engine start-up according to a remote operation is not prohibited), the routine goes to a step S45, and a process for starting the engine is carried out (as to its detail, see FIG. 5), and after that, the routine goes to a step S49.

On one hand, it is judged that the flag $f_{no}$ is 1 (i.e., the engine start-up according to a remote operation is prohibited), in order to notify a user that the engine start-up according to a remote operation is prohibited, a hazard lamp etc. is lit up for several seconds, by controlling the lamp lighting device 55 (step S46), and after that, the routine goes to the step S49. In passing, as to notification, it may be carried out by a horn, a sound, and so on.

Also, in the step S43, if it is judged that an instruction code for instructing the engine start-up is not received, then, judged is whether an instruction for instructing an engine stop (see, the step S31 of FIG. 3) was received or not (step S47). If it is judged that the instruction code for instructing the engine stop was received, a process of the engine stop in which all of the key insertion signal, ACC signal and IG signal are turned OFF is carried out to have the engine stopped (step S48), and after that, the routine goes to the step S49. In passing, if it is judged that each instruction code of the engine start-up and the engine stop is not received, the routine goes to the step S49 as it is.

In the step S49, judged is whether the theft state detection signal which is being sent from the security microcomputer 32 (see, the step S23 of FIG. 3) was received or not, and if it is judged that the theft state detection signal was received (i.e., a vehicle is in the theft state), then, a flag $f_{no-1}$ showing that a condition for prohibiting the engine start up according to a remote operation is satisfied is set to 1 (step S50), and the routine goes to a step S53, and a process for setting or releasing the prohibition of the engine start-up according to a remote operation is carried out (as to its detail, see FIG. 7), and after that, the routine goes to another process.

On one hand, in the step S49, if it is judged that the theft state detection signal is not received, then, judged is whether the theft state release signal which is being sent from the security microcomputer 32 (see, the step S29 of FIG. 3) was received or not, and if it is judged that the theft state release signal was received (i.e., the theft state of a vehicle is released), then, a flag $f_{no-1}$ is set to 0 (step S52), and the routine goes to a step S53,. On the other hand, if it is judged that the theft state release signal is not received, the routine goes to the step S53.

Figure 5:
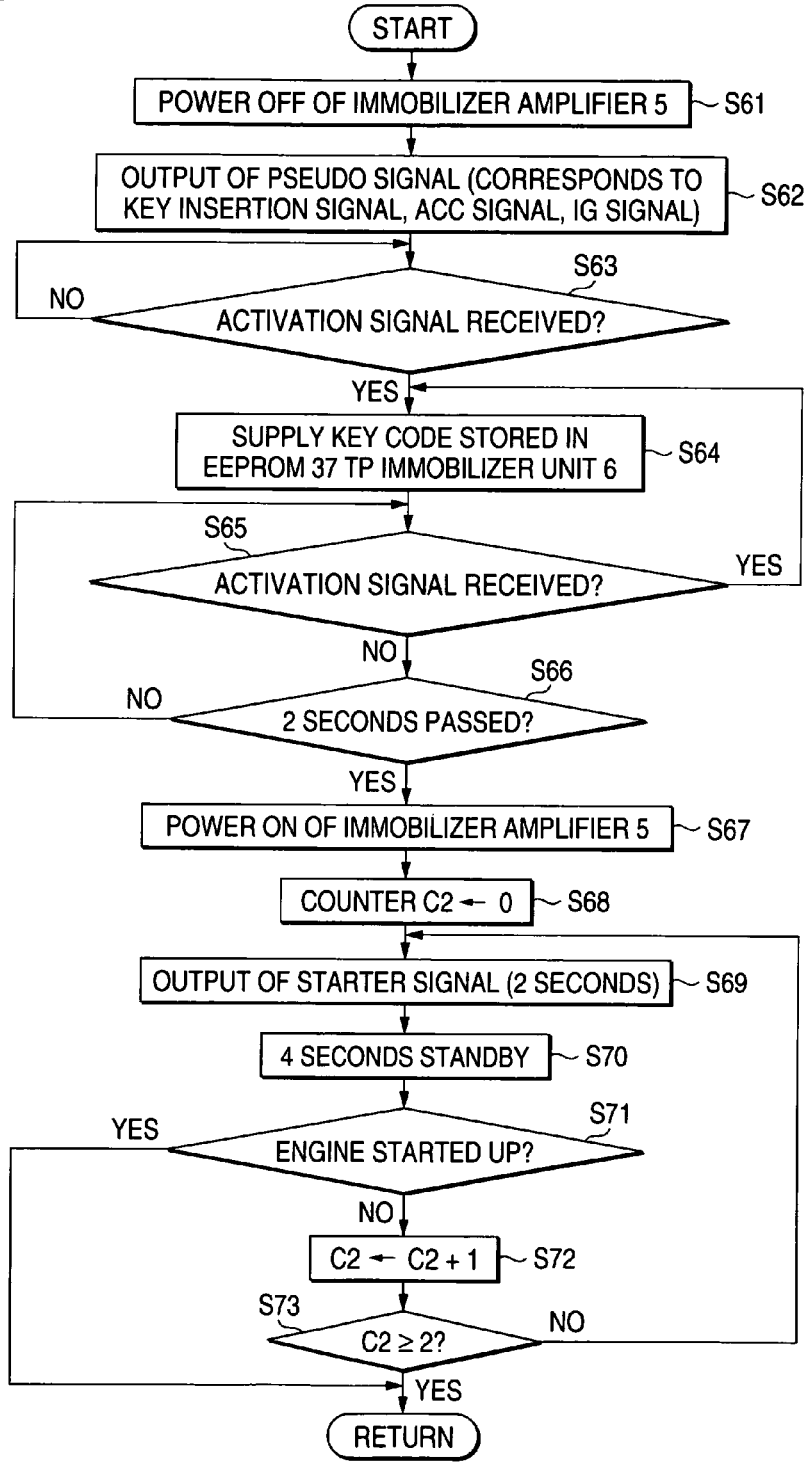
FIG. 5 is a flow chart which showed a process operation (engine start-up processing) which the remote start-up microcomputer in the remote start-up control apparatus which relates to the first embodiment carries out.

Next, a process operation [3-1] which the remote start-up microcomputer 33 in the remote start-up control apparatus 31 which relates to the first embodiment carries out (engine start-up process of the step S45 in FIG. 4) will be described on the basis of a flow chart shown in FIG. 5. In passing, the process operation [3-1] is an operation which is carried out in case that the engine start-up was instructed according to a remote operation from the portable transmitter 41.

Firstly, the switch 5a is turned OFF, and a power source of the immobilizer amplifier 5 is cut, and an operation of the immobilizer amplifier 5 is prohibited (step S61), and as a signal which relates to a start-up operation, pseudo signals, which correspond to the key insertion signal, ACC signal and IG signal which are outputted in case that a qualified ignition key 1 is turned to an IG signal output position, is supplied to the signal line L3 of the ignition switch, and these pseudo signals are sent to the immobilizer unit 6 (step S62). In passing, as shown in FIG. 2, the immobilizer 6, when it receives the key insertion signal (step S1), supplies the pulse shaped activation signal to the signal line L1 (step S3), and requests for an output of a key code.

Next, judged is whether the activation which is supplied from the immobilizer unit 6 was received or not (step S63), and if it is judged that it does not receive the activation signal, the routine goes back to the step S63, and such a state that the activation is sent is waited for. On one hand, if it is judged that the activation was received, then, the key code which has been stored in the EEPROM 37 is sent to the immobilizer unit 6 through the signal line L2, together with the clock signal (step S64), and after that, judged is whether the activation signal which is being sent from the immobilizer unit 6 was re-received or not for a predetermined period (e.g., 2 seconds) (steps S65 and S66). The activation signal is primarily one which is sent to the immobilizer amplifier 5, but since an operation of the immobilizer amplifier 5 is prohibited, there occurs no problem in particular.

As shown in FIG. 2, the immobilizer unit 6 is designed, when it receives the key code which is being sent from the signal line L2, to judge whether or not the received key code (here, the key code which has been stored in the EEPROM 37) is in conformity with the key code which has been registered in advance (verification of key codes, the step S5), and if it is judged that these key codes are in conformity with each other, to transmit the enabling signal for enabling the engine start-up (step S6), and after that, to carry out no re-transmission of the activation signal (not returned to the step S3). In passing, the re-transmission of the activation signal is repeatedly carried out until these key codes are in conformity with each other (100 times at most, with respect to approximately each 100 millisecond, the steps S7, S8 and S3).

Thus, such a case that, after the key code which has been stored in the EEPROM 37 was sent (after the process of the step S64), the routine goes to the step S67, without re-receiving the activation signal within 2 seconds (100 milliseconds+ α) is two ways a and b as follows.

a. such a case that the key code which has been stored in the EEPROM 37 is in conformity with the key code which has been stored in the immobilizer unit 6, and as a result of verification of the key codes in the immobilizer unit 6, conformity of the key codes is confirmed, and the enabling signal was sent from the immobilizer unit 6 to the engine control unit 7.

b. such a case that transmission of the activation from the immobilizer unit 6 is repeated 100 times, since the key code which has been stored in the EEPROM 37 is not in conformity with the key code which has been stored in the immobilizer unit 6.

Adversely, such a case that, after the key code which has been stored in the EEPROM 37 was sent (after the process of the step S64), the activation is received again within two seconds and the routine goes back to the step S64 is two ways c and d as follows.

c. such a case that the key code which has been stored in the EEPROM 37 is in conformity with the key code which has been stored in the immobilizer unit 6, but because of influence of noises etc., the key code was not correctly received by the immobilizer unit 6.

d. such a case that the key code which has been stored in the EEPROM 37 is not in conformity with the key code which has been stored in the immobilizer unit 6.

In the steps S65 and S66, if it is judged that the activation which is being sent from the immobilizer unit 6 within two seconds is not re-received (the above-described cases a and b), then, the switch 5a is turned ON, and the power cut of the immobilizer amplifier 5 is released (step S67), and after that, a counter C2 is set to 0 (step S68), and a pseudo signal which corresponds to the starter signal to be outputted in case that the ignition key 1 was turned to a starter output position is continued for a predetermined period (e.g., two seconds) and supplied to the signal line L3 of the ignition switch, and the pseudo signal is sent to the engine unit 7 (step S69).

After that, standby time of a predetermined period (e.g., four seconds) is disposed (step S70), and on the basis of a signal which is obtained from the alternator L terminal 39, judged is whether the engine is started up or not (step S71), and if it is judged that the engine is started up, the process operation [3-1] is terminated.

On one hand, if it is judged that the engine is not started up, then, 1 is added to the counter C2 (step S72), and judged is whether or not the counter C2 to which 1 was added shows a predetermined value (e.g., two times) and above (step S73). If it is judged that the counter C2 shows two and above, i.e., that the engine is not started up, regardless of such a fact that the pseudo signal which corresponds to the starter signal is sent two times, it is deemed to be the above-mentioned case b, and the process operation [3-1] is terminated as it is. On the other hand, if it is judged that the counter C2 does not show two and above, the routine goes back to the step S69, and the pseudo signal which corresponds to the starter signal is sent again.

Figure 6A:
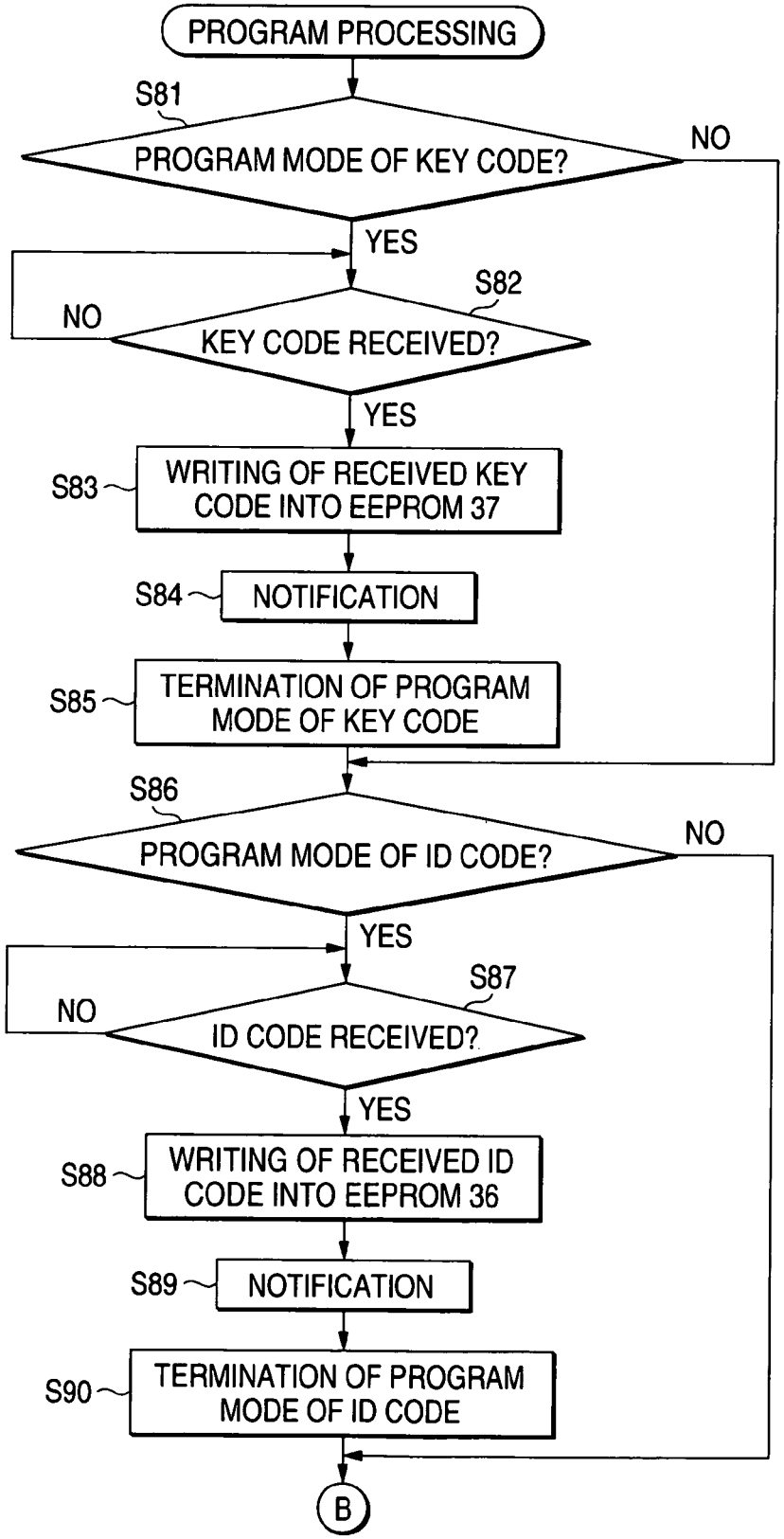
FIG. 6A is a flow chart which showed a process operation (program processing) which the remote start-up microcomputer in the remote start-up control apparatus which relates to the first embodiment carries out.

Next, a process operation [3-2] which the remote start-up microcomputer 22 in the remote star-up control apparatus 31 which relates to first embodiment (program processing of the step S42 in FIG. 4) will be described on the basis of flow charts shown in FIGS. 6A and 6B. In passing, the process operation [3-2] is an operation for writing the key code which has been registered in the transponder 3 of the ignition key 1 into the EEPROM 37, and for writing the remote ID code which has been registered in the portable transmitter 41 into the EEPROM 36, and for setting to such a state that the engine start-up according to a remote operation is prohibited by user's will.

Firstly, judged is whether the program mode (program mode for writing the key code which has been registered in the transponder 3 of the ignition key 1 into the EEPROM 37) which is set up by a predetermined operation (e.g., long push of the program switch 38) by use of the program switch 38, is set up or not (step S81), and if it is judged that the program mode is set up, then, the routine goes to a step 82, and a process for writing the key code into the EEPROM 37 is started. On one hand, if it is judged that the program mode is not set up, the routine goes to a step S86.

In the step S82, judged is whether a key code which is supplied from the immobilizer amplifier 5 to the signal line L2 (i.e., key code which was extracted from the transponder 3 of the ignition key 1) was received or not, and if it is judged that the key code was received, the received key code is written in the EEPROM 37, and in order to notify a user that the writing of a new key code in the EEPROM 37 has been completed, the warning whistle is blown by controlling the warning sound generation device 54 (step S84), and after that, the program mode is terminated (step S85), and the routine goes to the step S86.

As described above, when the ignition key 1 is inserted into the key cylinder 4, the activation signal is sent from the immobilizer unit 6 to the immobilizer amplifier 5, and when the activation signal is received at the immobilizer amplifier 5, the key code is extracted from the transponder 3 of the ignition key 1 by the immobilizer amplifier 5, and the extracted key code is supplied to the signal line L2. On that account, when the program mode of the key code is set up, a user can realize writing of the key code which is specific to the ignition key 1 in the EEPROM 37 by inserting the ignition key 1 into the key cylinder 4.

In the step S86, judged is whether the program mode of the remote ID code (program mode for writing the remote ID code which has been registered in the portable transmitter 41 in the EEPROM 36, in order to carry out an additional registration of the portable transmitter 41 which enables the engine start-up etc. according to a remote operation) which is set up by carrying out a predetermined operation (e.g., successive two pushes of the program switch 38) by use of the program switch 38 is set up or not, and if it is judged that the program mode is set up, then, the routine goes to a step S87, and a process for writing the remote ID code in the EEPROM 36 is started. On one hand, if it is judged that the program mode is not set up, the routine goes to a step S91 (FIG. 6B).

Figure 6B:
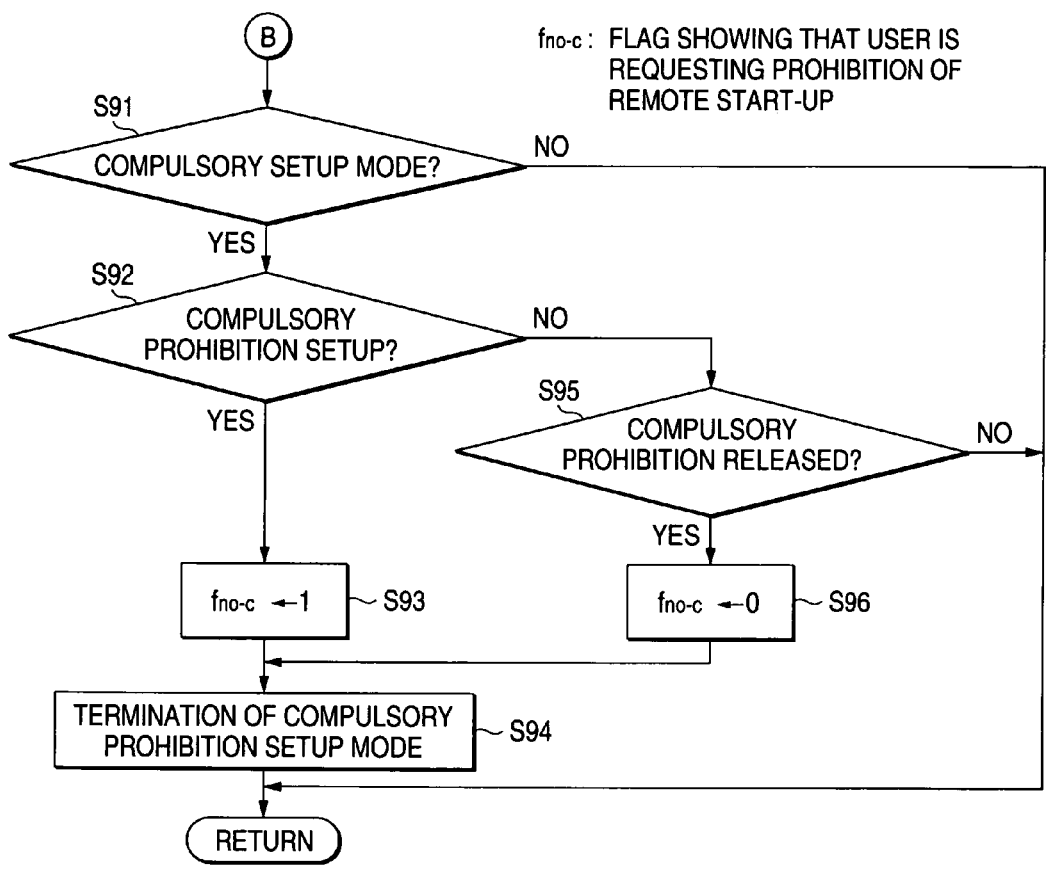
FIG. 6B is a flow chart which showed a process operation (program processing) which the remote start-up microcomputer in the remote start-up control apparatus which relates to the first embodiment carries out.

In the step S87, judged is whether the remote ID code (i.e., remote ID code which has been registered in the portable transmitter 41) which is being sent from the portable transmitter 41, through the antenna 34 and the receiving unit 35, was received or not, and if it is judged that the remote ID code was received, the received remote ID code is written in the EEPROM 36 (step S88), and in order to notify a user that writing of a new remote ID code in the EEPROM 36 was completed, the warning whistle is blown by the warning sound generation device 54 (step S89), and after that, the program mode is terminated (step S90), and the routine goes to the step S91(FIG. 6B).

In the step S91, judged is whether a compulsory prohibition setup mode for carrying out the setup or the release of the state for prohibiting the engine start-up according to a remote operation by user's will is set up or not, and if it is judged that the compulsory prohibition setup mode is set up, then, the routine goes to a step S92, and a process for the setup or the release of the state is started. On one hand, if it is judged that the compulsory prohibition setup mode is not set up, the process operation [3-2] is terminated as it is.

In the step S92, judged is whether a predetermined operation (e.g., one time-opening and closing of a door within a predetermined period) by use of a door was carried out or not (i.e., whether a user is requesting for prohibition of the engine start-up according to a remote operation or not), and if it is judged that the predetermined operation was carried out, a flag $f_{no-c}$ showing that a user is requesting for the engine start-up according to a remote operation is set to 1 (step S93), and after that, the compulsory prohibition setup mode is terminated (step S94), and the process operation [3-2] is terminated.

On one hand, if it is judged that the predetermined operation is not carried out, then, judged is whether another operation (e.g., two time-opening and closing of a door within a predetermined period) which is different from the predetermined operation by use of a door was carried out or not (i.e., whether a user is requesting for the release of the state for prohibiting the engine start-up according to a remote operation) (step S95), and if it is judged that the another predetermined operation was carried out, the flag $f_{no-c}$ is set to 0 (step S96), and after that, the compulsory prohibition setup mode is terminated (step S94), and the process operation [3-2] is terminated. Also, if it is judged that the another predetermined operation is not carried out, the process operation [3-2] is terminated as it is.

In passing, here, the program mode of the key code, the program mode of the remote ID code, and the compulsory prohibition setup mode are designed to be set up when the program switch 38 is pushed down, but a setup method of these modes is not limited to this, and for example, they may be set up by a particular operation by use of the button switches 43 to 46 of the portable transmitter 41, a particular operation by use of an input switch, not shown, which is connected to the remote start-up control apparatus 31, and so on.

Also, with regard to the setup and the release of the state for prohibiting the engine start-up according to a remote operation, they are not limited to the operation which used a door, and in the same manner as above, they may be designed to be set up by a particular operation which used the button switches 43 to 46 of the portable transmitter 41, a particular operation by use of the input switch which is connected to the remote start-up control apparatus 31.

Next, a process operation [3-3] which the remote start-up microcomputer 33 in the remote start-up control apparatus 31 which relates to the first embodiment carries out (process for setting or releasing the prohibition of the engine start up according to a remote operation of the step S53 in FIG. 4) will be described on the basis of a flow chart shown in FIG. 7.

Firstly, judged is whether the flag $f_{no-c}$ showing that a user is requesting for prohibition of the engine start-up according to a remote operation is set to 1 or not (step S101), and if it is judged that the flag $f_{no-c}$ is 1 (i.e., a user is requesting for the prohibition of the engine start-up according to a remote operation), then, in order to prohibit the engine start-up according to a remote operation, the $f_{no-c}$ showing that the engine start-up according to a remote operation is prohibited is set to 1 (step S102), and after that, the routine goes to a step S105.

On one hand, if it is judged that the flag $f_{no-c}$ is not 1 (i.e., a user is not requesting for the prohibition of the engine start-up according to a remote operation), then, judged is whether the flag $f_{no-1}$ showing that a condition for prohibiting the engine start-up according to a remote operation is satisfied is 1 or not (step S103). In passing, such a case that the flag $f_{no-1}$ becomes 1 is in case that a vehicle is in the theft state, as shown in FIG. 4.

If it is judged that the flag $f_{no-1}$ is 1 (i.e., a condition for prohibiting the engine start-up according to a remote operation is satisfied), the flag $f_{no}$ is set to 1 (step S102), and after that, the routine goes to a step S105. On the other hand, if it is judged that the flag $f_{no-1}$ is not 1, then, so as not to prohibit the engine start-up according to a remote operation, the flag $f_{no}$ is set to 0 (step S104), and after that, the routine goes to the step S105.

A process after the step S105 is a process for carrying out judgment of whether or not a vehicle is operated by a qualified user, and soon, and firstly, judged is whether the key insertion signal (Low→High) was received or not, and if it is judged that the key insertion signal was received, then, judged is whether the activation signal which is being sent from the immobilizer unit 6 was received or not (step S106). On one hand, if it is judged that the key insertion signal is not received, the process operation [3-3] is terminated.

When the key insertion signal is changed from the Low state to the High state, the activation signal is supplied from the immobilizer unit 6 to the signal line L1, and the activation signal is sent to the immobilizer amplifier 5 and the remote start-up control apparatus 31. Also, the key insertion signal is changed from the Low state to the High state, in case that the ignition key 1 is inserted into the key cylinder 4 (Case I) and in case that the button switch 45 of the portable transmitter 41 is pushed down, and thereby, the engine start-up instruction according to a remote control is carried out (Case II). In this regard, however, here, a pseudo signal which corresponds to the key insertion signal is not sent from the remote start-up control apparatus 31 to the immobilizer unit 6, and therefore, here, conceivable is only the case of Case I.

Thus, in the step S105, it is judged that the key insertion signal was received (i.e., the key insertion signal is changed from the Low state to the High state), only in case that the ignition key 1 was inserted into the key cylinder 4.

Also, as shown in FIG. 2, the immobilizer unit 6 is designed, when it receives the key insertion signal, to transmit the activation signal to the immobilizer amplifier 5, and after that, when it receives the key code which is being sent from the immobilizer amplifier 5, to judge whether or not the received key code (here, key code which has been stored in the transponder 3 of the ignition key 1) is in conformity with the key code which has been registered in advance (verification of key codes, step S5), and if it is judged that these key codes are in conformity with each other, to transmit the enabling signal for enabling the engine start-up, to the engine control unit 7 (step S6), and after that, to carry out no re-transmission of the activation signal (not returned to the step S3).

On the other hand, if it is judged that the received key code is not in conformity with the key code which has been registered, the re-transmission of the activation signal is carried out (step S3). In passing, the re-transmission of the activation signal is repeatedly carried out until these key codes are in conformity with each other (100 times at the most, steps S7, S8, and S3).

On that account, such a fact that, after reception of the activation signal was confirmed in the step S106, without re-receiving the activation signal, two seconds have passed (100 milliseconds+α) means that, as a result of verification of key codes in the immobilizer unit 6, it is confirmed that the ignition key 1 which has been inserted into the key cylinder 4 is an ignition key which a qualified user should have, and the enabling signal was sent from the immobilizer unit 6 to the engine control unit 7. That is, it means that a vehicle is being operated by a qualified user.

Thus, if it is judged that the activation was received in the step S106, and the counter C3 was set to 0 in the step S107, and after that, the activation signal, which is being sent from the immobilizer unit 6, is not re-received within two seconds in the steps S108 and S109 (i.e., a vehicle is being operated by a qualified user), then, the flag $f_{no-1}$ showing that a condition for prohibiting the engine start-up according to a remote operation is satisfied is set to 0 (step S110), and the process operation [3-3] is terminated.

On one hand, if it is judged that the activation signal, which is being sent from the immobilizer unit 6, is re-received within two seconds, in the steps S108 and S109, then, 1 is added to a counter C3 (step S111), and judged is whether or not the counter C3 to which 1 was added shows a predetermined value (e.g., 10 times) and above (step S112), and if it is judged that the counter C3 does not show 10 times and above, the routine goes back to the step S108 as it is, and such a state that the activation signal is being sent is waited for again. On the other hand, if it is judged that the counter C3 shows 10 times and more, it is deemed that a vehicle is not operated by a qualified user, and the process operation [3-3] is terminated as it is.

According to the remote start-up control apparatus which relates to the above-described first embodiment, it is designed such that, when it receives a start-up instruction of an engine according to a remote operation, a key code which has been stored in the EEPROM 37 is supplied to the immobilizer unit 6. On that account, if a key code, which is in conformity with a predetermined key code which has been stored in the immobilizer unit 6, has been stored in the EEPROM 37, even in case that there was the start-up instruction of an engine according to a remote operation, in the same manner as in the case that the qualified ignition key 1 was inserted into the key cylinder 4, the key code which is in conformity with the predetermined key code is supplied to the immobilizer unit 6, and permission of the start-up of an engine is given from the immobilizer unit 6. By this, even if there occurs no such a situation that the qualified ignition key 1 is inserted into the key cylinder 4 and turned, it is possible to start up the engine according to a remote operation.

Further, according to the remote start-up control apparatus which relates to the above-described first embodiment, in case that theft of a vehicle occurred, since the key code, which has been stored in the EEPROM 37, is ceased to be outputted to outside (immobilizer unit 6), it is possible to complicate analysis of the key code which has been stored in the EEPROM 37 (key code which becomes necessary for enabling the start-up of an engine).

Also, even if realized by any chance is such a state that an operation of the remote start-up control apparatus 31 becomes possible by a transmitter which a burglar has, in case that there occurred the vehicle theft, the key code is not supplied to the start-up control apparatus, and therefore, it is possible to prevent the engine from being started up by use of the transmitter.

Also, even if there occurred the vehicle theft, after that, in case that a qualified user is operating a vehicle, the engine start-up becomes possible again, and therefore, it is possible to make an apparatus which is very excellent in user-friendliness, as well as the anti-theft effect.

Also, in the remote start-up control apparatus which relates to the above-described first embodiment, in the step S44 (see, FIG. 4), judged is whether the flag $f_{no}$ showing that the engine start-up according to a remote operation is prohibited is 1 or not, and in case that the flag $f_{no}$ is not 1, the start-up process of an engine (see, FIG. 5) it self is not carried out, but in a remote start-up control apparatus which relates to another embodiment, it maybe designed such that, during a period of the start-up process (e.g., after the process of the steps S62 and S63), a process for judging whether the flag $f_{no}$ is 1 or not is provided, and in case that the flag $f_{no}$ is 1, the enabling is ceased to be outputted to the engine control unit 7.

Next, an engine start-up system in which the remote start-up control apparatus which relates to the second embodiment was adopted will be described. In this regard, however, with regard to the engine start-up system, since it is the same structure as in the engine start-up system shown in FIG. 1, except for the remote start-up control apparatus 31, and the security microcomputer 32, the remote start-up microcomputer 33, and the EEPROM 36 for storing the remote ID code which configure the remote start-up control apparatus 31, different reference numerals and signs are given to a remote-start-up control apparatus, a security microcomputer, a remote start-up microcomputer, and an EEPROM for storing a remote ID code, and other explanations will be omitted.

Figure 8:
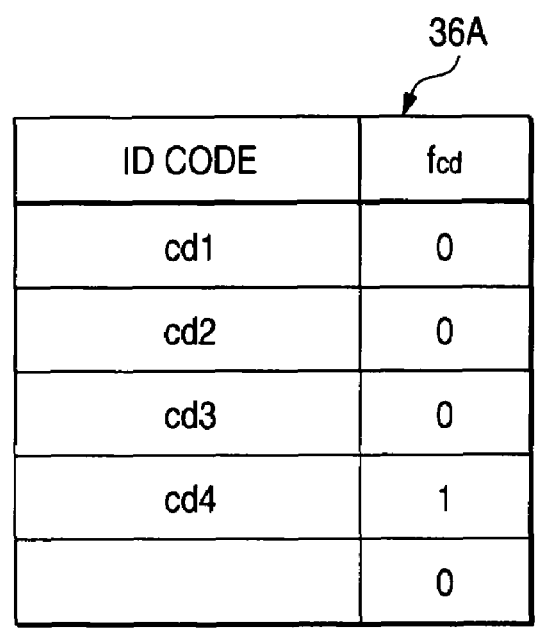

EEPROM 36A is configured, as shown in FIG. 8, to be able to store a plurality of remote ID codes, so as to enable an additional registration of the portable transmitter for instructing the start-up etc. of an engine according to a remote operation, and also, is configured to be able to store a value of a theft moment registration flag $f_{cd}$ (1 or 0) in compliance with each remote ID code. In case that the theft moment registration flag $f_{cd}$ is 0, it shows that the corresponding remote ID code is one which was registered before occurrence of theft, and adversely, in case that the theft moment registration flag $f_{cd}$ is 1, it shows that the corresponding remote ID code is one which was registered after occurrence of theft.

Figure 9:
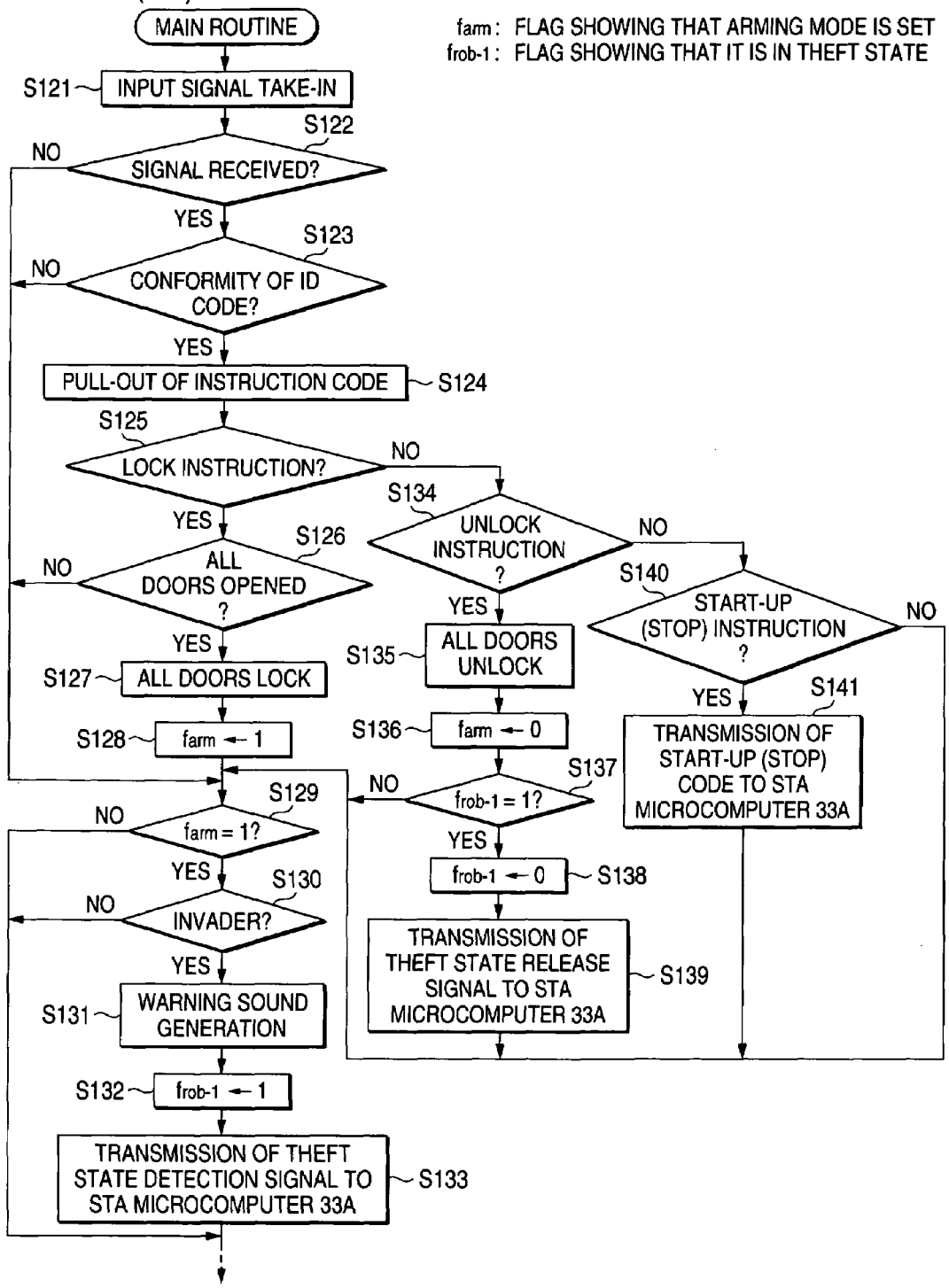
FIG. 9 is a flow chart which showed a process operation (main routine) which a security microcomputer in the remote start-up control which relates to the second embodiment carries out.

Next, a process operation [4] (main routine) which the security microcomputer 32A in the remote start-up control apparatus 31A which relates to the second embodiment carries out will be described on the basis of a flow chart shown in FIG. 9. In this regard, however, since the process operation [4] is substantially the same as the process operation [2] which the security microcomputer 32 shown in FIG. 3 carries out, here, only an operation which is particular to the process operation [4] will be described.

Figure 10:
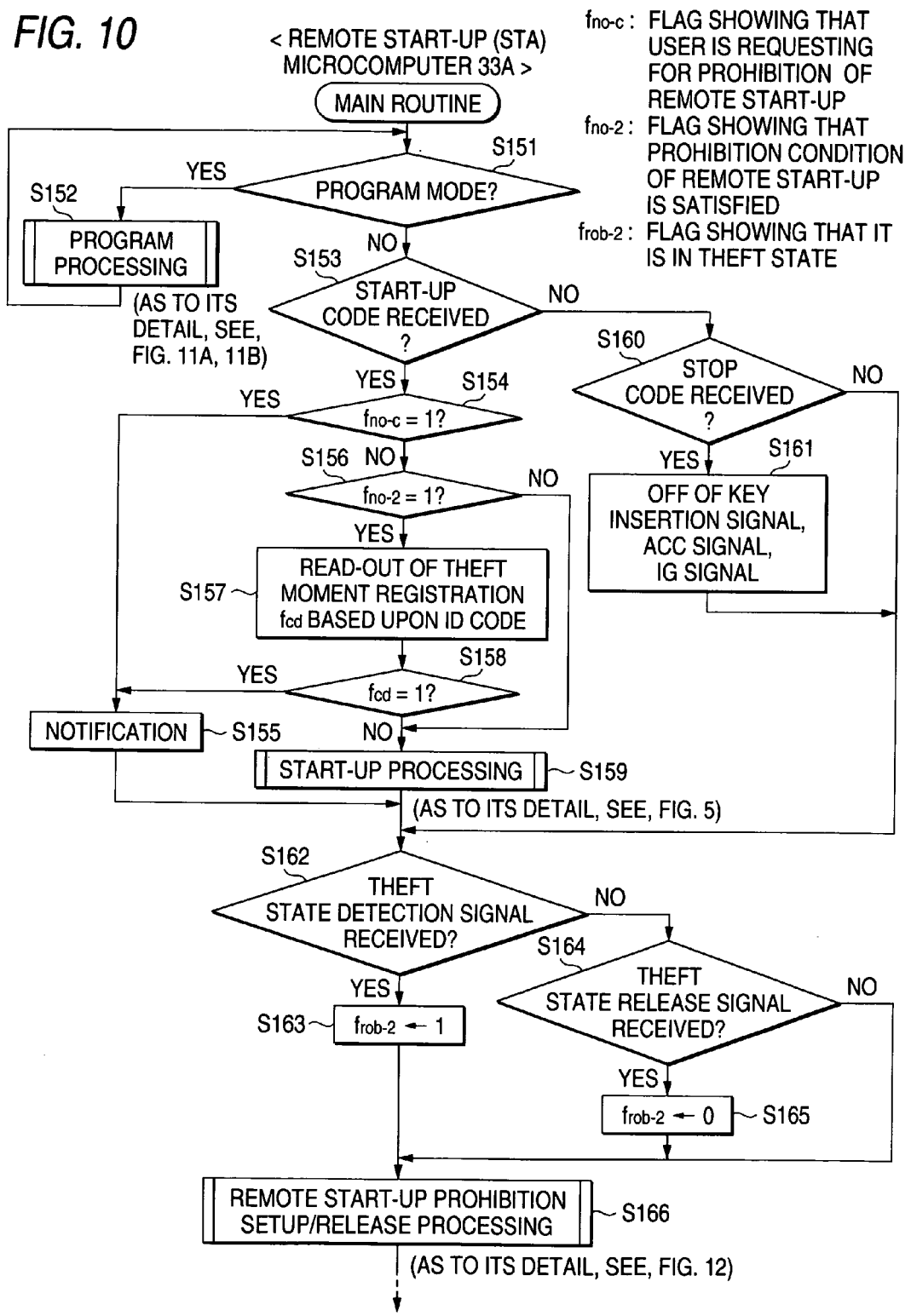
FIG. 10 is a flow chart which showed a process operation (main routine) which a remote start-up microcomputer in the remote start-up control apparatus which relates to the second embodiment carries out.

In a step S140 (which corresponds to the step S30 in the process operation [2]), on the basis of a signal which is being sent from the portable transmitter 41, judged is whether any one of a start-up and a stop of an engine is instructed or not, and if it is judged that any one of the start-up and the stop of an engine is instructed, a code which corresponds to each instruction, and a remote ID code which was received in a step S122 (which corresponds to the step S12) are sent to the remote start-up microcomputer 33A (step S141), and after that, the routine goes to a step S129 (which corresponds to the step S19) In passing, with regard to a process operation in case that the remote start-up microcomputer 33A received these codes, it will be described later in detail, on the basis of a flow chart shown in FIG. 10.

Next, a process operation [5] (main routine) which the remote start-up microprocessor 33A in the remote start-up control apparatus 31A which relates to the second embodiment carries out will be described on the basis of the flow chart shown in FIG. 10. Firstly, judged is whether the program mode (program mode for writing a key code in the EEPROM 37, and so on) is set up or not (step S151), and if it is judged that the program mode is set up, the routine goes to a step S152, so that the program processing is carried out (as to its detail, see, FIGS. 11A and 11B), and after that, the routine goes back to the step S151. Although it will be described later in detail, it is designed such that the program mode is set up by push-down of the program switch 38 and so on.

On one hand, it is judged that the program mode is not set up, then, judged is whether an instruction code for instructing the engine start-up (see, step S141 of FIG. 9) which is being sent from the security microcomputer 32A was received or not (step S153). If it is judged that the instruction code for instructing the engine start-up was received (in passing, to this instruction code, a remote ID code is added), then, judged is whether the flag $f_{no-c}$ showing that a user is requesting for prohibition of the engine start-up according to a remote operation is 1 or not (step S154).

If it is judged that the flag $f_{no-c}$ is 1 (i.e., a user is requesting for the prohibition of the engine start-up according to a remote operation), in order to notify a user that the engine start-up according to a remote operation is prohibited, a hazard lamp etc. is made to flash for several seconds by controlling the lamp lighting device 55 (step S155), and after that, the routine goes to a step S162.

On one hand, if it is judged that the flag $f_{no-c}$ is not 1 (i.e., a user is not requesting for the prohibition of the engine start-up according to a remote operation), then, judged is whether a flag $f_{no-2}$ showing that a condition for prohibiting the engine start-up according to a remote operation is satisfied is 1 or not (step S156) In passing, the flag $f_{no-2}$ becomes 1 in case that there exists 1 in even one of the theft moment registration flag $f_{cd}$ (see, FIG. 8) which is stored in the EEPROM 36A.

If it is judged that the flag $f_{no-2}$ is not 1 (i.e., the engine start-up according to a remote operation is not prohibited), the routine goes to a step S159, so that a process for having the engine started up is carried out, and after that, the routine goes to the S162. In passing, with regard to the process for having the engine started up, since it is the same as the process operation shown in FIG. 5 which the remote start-up microcomputer 33 carries out, here, its explanation will be omitted.

On one hand, if it is judged that the flag $f_{no-2}$ is 1 (i.e., a portable transmitter, in which the theft moment registration flag $f_{cd}$ has become 1, has been registered), then, the theft moment registration flag $f_{cd}$, which corresponds to the remote ID code which was received in the step S153, is read out from the EEPROM 36A (step S157), and judged is whether the theft moment registration flag $f_{cd}$, which was read out, is 1 or not (step S158).

If it is judged that the theft moment registration flag $f_{cd}$, which was read out, is not 1 (i.e., the portable transmitter 41, which has been instructing a start-up of an engine according to a remote operation, is one which was registered before occurrence of theft), the routine goes to the step S159, so that a process for having the engine started up is carried out, and after that, the routine goes to the step S162.

On one hand, if it is judged that the theft moment registration flag $f_{cd}$, which was readout, is 1 (i.e., the portable transmitter 41, which has been instructing a start-up of an engine according to a remote operation, is one which was registered after occurrence of theft), in order to notify a user that the engine start-up according to a remote operation is prohibited, a hazard lamp etc. is made to flash for several seconds by controlling the lamp lighting device 55 (step S155), and after that the routine goes to the step S162.

Also, in the step S153, if it is judged that the instruction code for instructing the engine start-up is not received, then, judged is whether the instruction code for instructing the engine stop (see, step S141 of FIG.) was received or not (step S160). If it is judged that the instruction code for instructing the engine stop was received, the engine is stopped by carrying out a process of the engine stop for turning all of the key insertion signal, ACC signal and IG signal OFF (step S161), and after that, the routine goes to the step S162. In passing, if it is judged that any one of the instruction codes of the engine start-up and the engine stop is not received, the routine goes to the step S162 as it is.

In the step S162, judged is whether the theft state detection signal (see, step S144 of FIG. 9), which is being sent from the security microcomputer 32A, was received or not, and if it is judged that the theft state detection signal was received (i.e., a vehicle is in the theft state), then, a flag $f_{rob-2}$ showing that it is in the theft state is set to 1 (step S163), and the routine goes to a step S166, and a process for setting or releasing the prohibition of the engine start-up according to a remote operation is carried out (as its detail, see, FIG. 12), and after that, the routine goes to another process.

On one hand, in the step S162, if it is judged that the theft state detection signal is not received, then, judged is whether the theft state release signal (see, step S139 of FIG.), which is being sent from the security microcomputer 32A, was received or not (step S164), and if it is judged that the theft state release signal was received (i.e., the theft state of a vehicle was released), then, the flag $f_{rob-2}$ is set to 0 (step S165), and the routine goes to the step S166, so that the process for setting or releasing the prohibition of the engine start-up according to a remote operation is carried out (as to its detail, see, FIG. 12), and after that, the routine goes to another process.

Next, a process operation [5-2] which the remote start-up microcomputer 33A in the remote start-up control apparatus 31A which relates to the second embodiment (program processing of the step S152 in FIG. 10) will be described on the basis of flow charts shown in FIGS. 11A and 11B. In passing, the process operation [5-2] is an operation for writing the key code which has been registered in the transponder of the ignition key 1 in the EEPROM 37, for writing the remote ID code which has been registered in the portable transmitter 1 in the EEPROM 36A, and for setting a state for prohibiting the engine start-up according to a remote operation by user's will.

In this regard, however, out of the process operation [512], since the process for writing the key code in the EEPROM 37 (steps S171 to S175), and the process for setting up the state that the engine start-up is prohibited according to a remote operation (steps S185 to S190) are the same as the steps S81 to S85 (see, FIG. 6B) out of the process operation [3-2] which the remote start-up microcomputer 33, respectively, explanations thereof will be omitted, and here, only an operation which is particular to the process operation [5-2] will be described.

In a step S176, judged is whether the program mode of the remote ID code (program mode for writing the remote ID code which has been registered in the portable transmitter 41 in the EEPROM 36, so as to carry out an additional registration of the portable transmitter 41 which enables the engine start-up etc. according to a remote operation), which is set up by carrying out a predetermined operation (e.g., successive two pushes of the program switch 38) by use of the program switch 38, is set up or not, and if it is judged that the program mode is set up, then, the routine goes to a step S177, so that a process for writing the remote ID code in the EEPROM 36 is started. On one hand, if it is judged that the program mode is not set up, the routine goes to a step S185 (FIG. 11B).

In the step S177, judged is whether the remote ID code, which is being sent from the portable transmitter 41 through the antenna 34 and the receiving unit 35 (i.e., remote ID code which has been registered in the portable transmitter 41), was received or not, and if it is judged that the remote ID code was received, the received remote ID code is written in the EEPROM 36A (step S178), and in order to notify a user that writing a new remote ID code in the EEPROM 36A was completed, the warning whistle is blown by carrying out the warning sound generation device 54 (step S179).

Next, judged is whether the flag $f_{rob-2}$ showing that it is in the theft state is 1 or not (step S180), and if it is judged that the flag $f_{rob-2}$ is 1 (i.e., in the theft state), subsequently, judged is whether the IG signal is in an ON state or not (step S181).

The IG signal is turned in the ON state, in case that the ignition key 1 was inserted into the key cylinder 4, and the ignition key 1 was turned to an IG position. Thus, such a situation that the IG signal is in the ON state can be judged to be such a situation that a vehicle is operated by a qualified user.

Figure 11B:
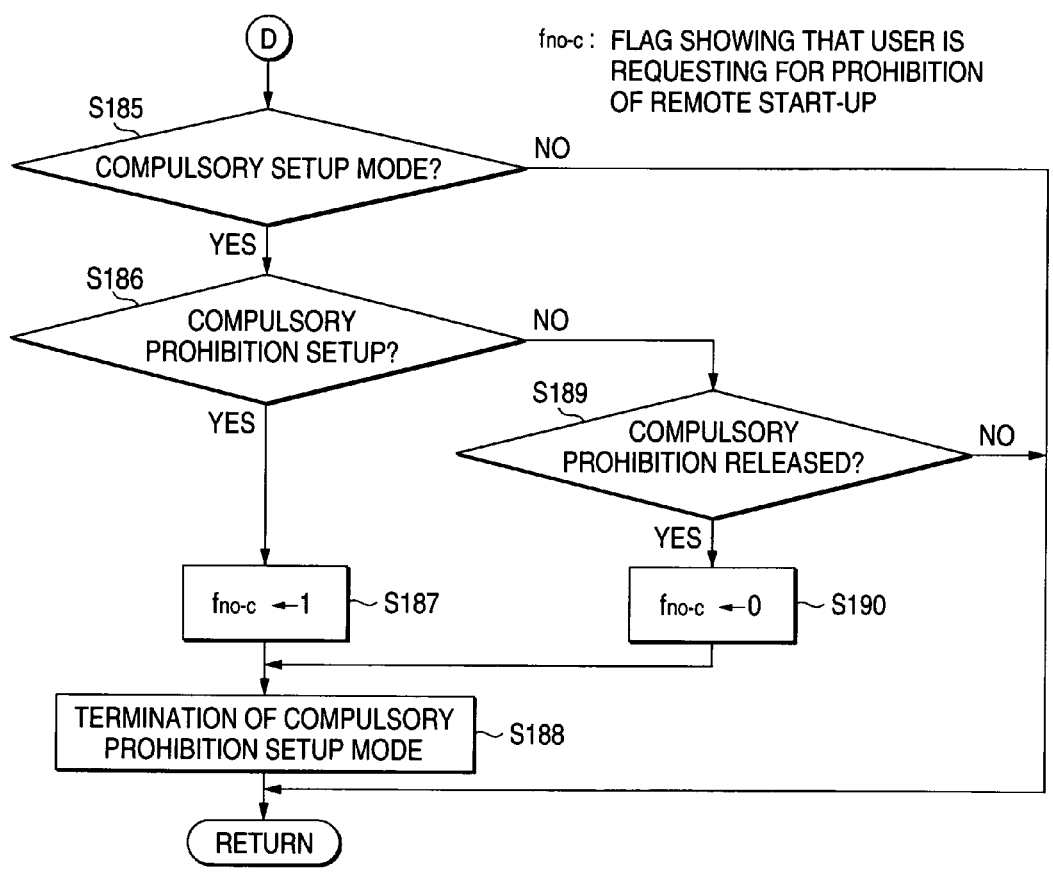
FIG. 11B is a flow chart which showed a process operation (program processing) which the remote start-up microcomputer in the remote start-up control apparatus which relates to the second embodiment carries out.

Thus, in a step S181, if it is judged that the IG signal is not in the ON state (i.e., it is in the theft state, and also, a vehicle is not operated by a qualified user), it is judged that a holder of, or a person who is holding a transmitter, which becomes a transmission source of the remote ID code which was received in the step S177, is a burglar, and the theft moment registration flag $f_{cd}$, which corresponds to the remote ID code registered in the EEPROM 36A in the step S178, is set to 1 (step S182), and the flag $f_{no\text{-}2}$ showing that a condition for prohibiting the engine start-up according to a remote operation is satisfied, is set to 1 (step S183), and after that, the program mode is terminated (step S184), and the routine goes to a step S185 (FIG. 11B). In passing, the flag $f_{no\text{-}2}$ becomes 1, as described above, in case that even one of the theft moment registration flag $f_{cd}$, which is stored in the EEPROM 36A, has become 1.

Also, in case that it is judged that the flag $f_{rob\text{-}2}$ is not 1 (i.e., not in the theft state) in the step S180, or, in case that it is judged that the IG signal is in the ON state (i.e., it is in the theft state but a vehicle is operated by a qualified user) in the step S181, it is judged that a holder of a transmitter which becomes a transmission source of the remote ID code received in the step S177 is a qualified user (thus, there is no necessity of setting the theft moment registration flag $f_{cd}$ to 1), and the program mode is terminated as it is (step S184), and the routine goes to a step S185 (FIG. 11B).

In passing, here, judgment of whether a qualified user is operating a vehicle or not is carried out on the basis of judgment of whether the IG signal is in the ON state or not, but the judgment is not limited to this, and in another embodiment, the judgment may be carried out on the basis of judgment of whether the qualified ignition key 1 is inserted into the key cylinder 4 or not. In the EEPROM 37, a key code, which is in conformity with the key code which has been stored in the qualified ignition key 1, has been registered, and therefore, it is possible to correctly judge whether the qualified ignition key 1 is inserted into the key cylinder 4 or not by carrying out the verification of the key codes.

Figure 12:
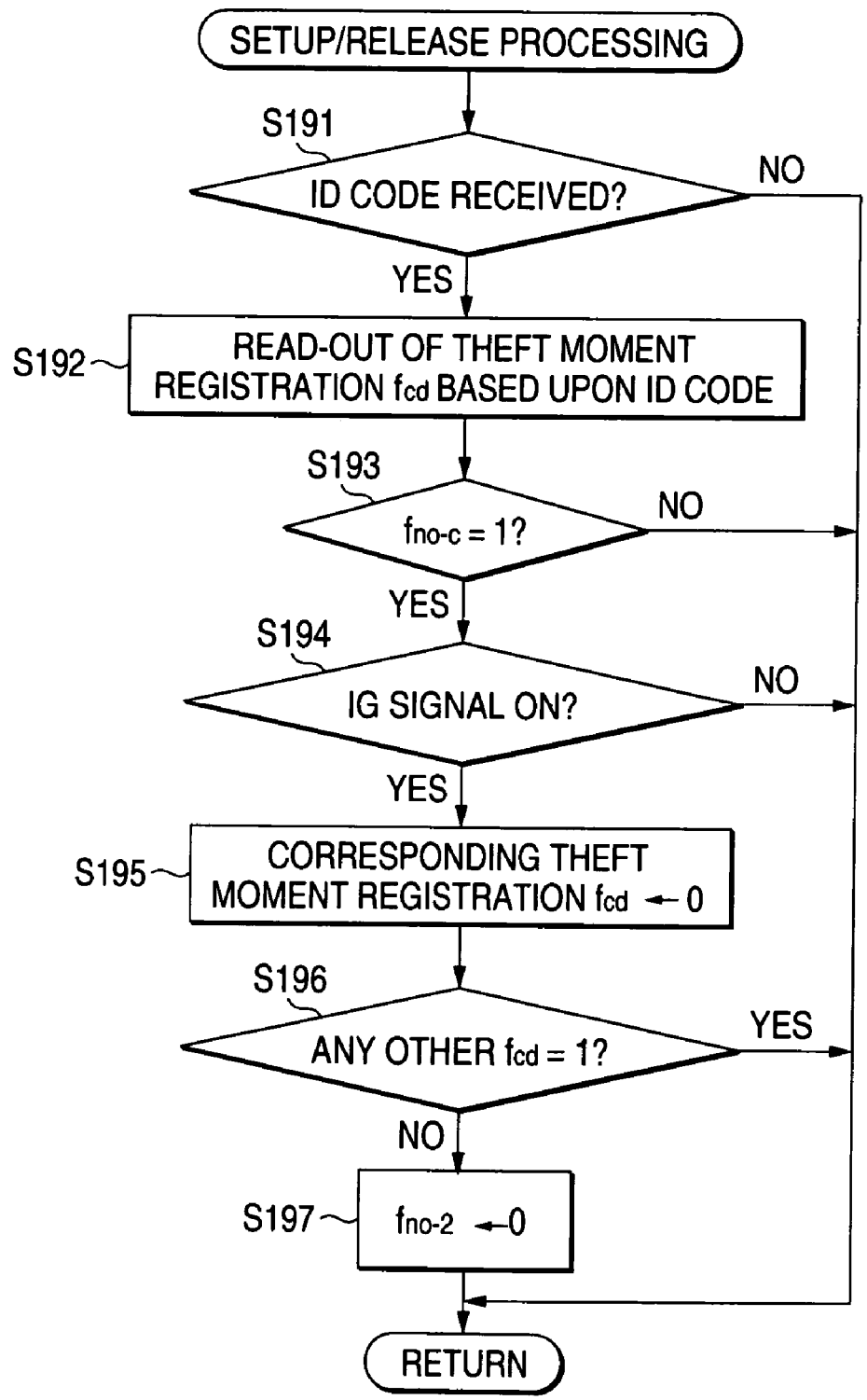
FIG. 12 is a flow chart which showed a process operation (setup/release processing) which the remote start-up microcomputer in the remote start-up control apparatus which relates to the second embodiment carries out.

Next, a process operation [5-3] which the remote start-up microcomputer 33A in the remote start-up control apparatus 31A which relates to the second embodiment carries out (process for setting and releasing the prohibition of the engine start-up according to a remote operation in the step S166 in FIG. 10) will be described on the basis of a flow chart shown in FIG. 12.

Firstly, judged is whether the remote ID code, which is being sent from the portable transmitter 41 through the antenna 34 and the receiving unit 35, was received or not (step S191), and if it is judged that the remote ID code was received, the theft moment registration flag $f_{cd}$, which corresponds to the received remote ID code, is read out from the EEPROM 36A (step S192), and judged is whether the theft moment registration flag $f_{cd}$, which was read out, is 1 or not (step S193).

If it is judged that the theft moment registration flag $f_{cd}$, which was read out, is 1 (i.e., the portable transmitter 41 which has sent the remote ID code is one which was registered after occurrence of theft), then, judged is whether the IG signal is in the ON state or not (step S194).

As described above, the IG signal is turned in the ON state, in case that the ignition key 1 was inserted into the key cylinder 4, and the ignition key 1 was turned to the IG position. Thus, such a situation that the IG signal is in the ON state can be judged to be such a situation that a vehicle is operated by a qualified user.

Also, if the portable transmitter 41 is used when a vehicle is operated by a qualified user, it can be said there is high possibility that the portable transmitter 41 is also used by the qualified user. Thus, if it is judged that the IG signal is in the ON state (i.e., a vehicle is operated by a qualified user) in a step Sl94, it is deemed that an operation of the portable transmitter 41 was carried out by a qualified user, and the theft moment registration flag $f_{cd}$, which corresponds to the remote ID code received in the step S191, is set to 0 (step S195).

In passing, here, judgment of whether a qualified user is operating a vehicle or not is carried out on the basis of judgment of whether the IG signal is in the ON state or not, but the judgment is not limited to this, and in another embodiment, the judgment may be carried out on the basis of judgment of whether the qualified ignition key 1 is inserted into the key cylinder 4 or not. In the EEPROM 37, a key code, which is in conformity with the key code which has been stored in the qualified ignition key 1, has been registered, and therefore, it is possible to correctly judge whether the qualified ignition key 1 is inserted into the key cylinder 4 or not by carrying out the verification of the key codes.

Next, judged is whether one which has become 1 exists or not in the theft moment registration flag $f_{cd}$ which has been stored in the EEPROM 36A (step S196), and if it is judged that one which has become 1 does not exist in the theft moment registration flag $f_{cd}$, the flag $f_{no\text{-}2}$ showing that a condition for prohibiting the engine start-up according to a remote control is satisfied is set to 0 (step S197), and after that, the process operation [5-3] is terminated. On one hand, if it is judged that one which has become 1 exists in the theft moment registration flag $f_{cd}$, since there is no necessity of returning the flag $f_{no\text{-}2}$ to 0, the process operation [5-3] is terminated as it is.

Also, in case that it is judged that the remote ID code is not received in the step S191, and in case that it is judged that the theft moment registration flag $f_{cd}$ which corresponds to the remote ID code, is not 1 in the step S193, or it is judged that the IG signal is not in the ON state in the step S194, the process operation [5-3] is terminated as it is.

According to the remote start-up control apparatus which relates to the above-described second embodiment, it is a matter of course that, even if there occurs no such a situation that the ignition key 1 is inserted into the key cylinder 4 and turned, it is possible to have an engine started up according to a remote operation, and further, in case of a start-up operation from the portable transmitter 41 which was newly, additionally registered, the key code which has been stored in the EEPROM 37 is ceased to be supplied to the immobilizer unit 6, and therefore, by any chance, even if a transmitter which a burglar has was additionally registered as a transmitter for instructing the start-up of an engine according to a remote operation, which resulted in such a situation that an operation of the remote start-up control apparatus 31 becomes possible, the key code is not supplied to the immobilizer unit 6 by the start-up instruction from the transmitter which was newly, additionally registered, and therefore, it is possible to prevent the engine from being started up by use of the transmitter.

Also, in case that it was confirmed that the transmitter, which was newly, additionally registered, is being used by a qualified user, it is possible to realize the engine start-up even if a start-up instruction is the start-up instruction from the transmitter which was newly, additionally registered, and therefore, it is possible to make an apparatus which is very excellent in user-friendliness, as well as the anti-theft effect.

Also, in the remote start-up control apparatus which relates to the above-described second embodiment, if the remote ID code is received when the program mode of the remote ID code has been setup (steps S176 to S184 of FIG. 11A), it is tentatively written in the EEPROM 36A, and after that, if it is judged that the IG signal is not in the ON state (i.e., a vehicle is not operated by a qualified user) in the step S181, the corresponding theft moment registration flag $f_{cd}$ is designed to be set to 1, but, in a remote start-up control apparatus which relates to another embodiment, in case that it is impossible to obtain a confirmation of such a fact that a vehicle is operated by a qualified user, the write-in itself of the remote ID code into the EEPROM may be canceled.

In passing, in order to realize this, for example, a judgment process of whether the IG signal is in the ON state or not may be carried out after "Y" was selected in the step S176, or a turning-on operation of the IG signal may be added to the setup operation of the program mode of the remote ID code. By this, it is possible to cancel the flag $f_{no-2}$ showing that a condition for prohibiting the engine start-up according to a remote operation is satisfied, as well as the theft moment registration flag $f_{cd}$.

Figure 13:
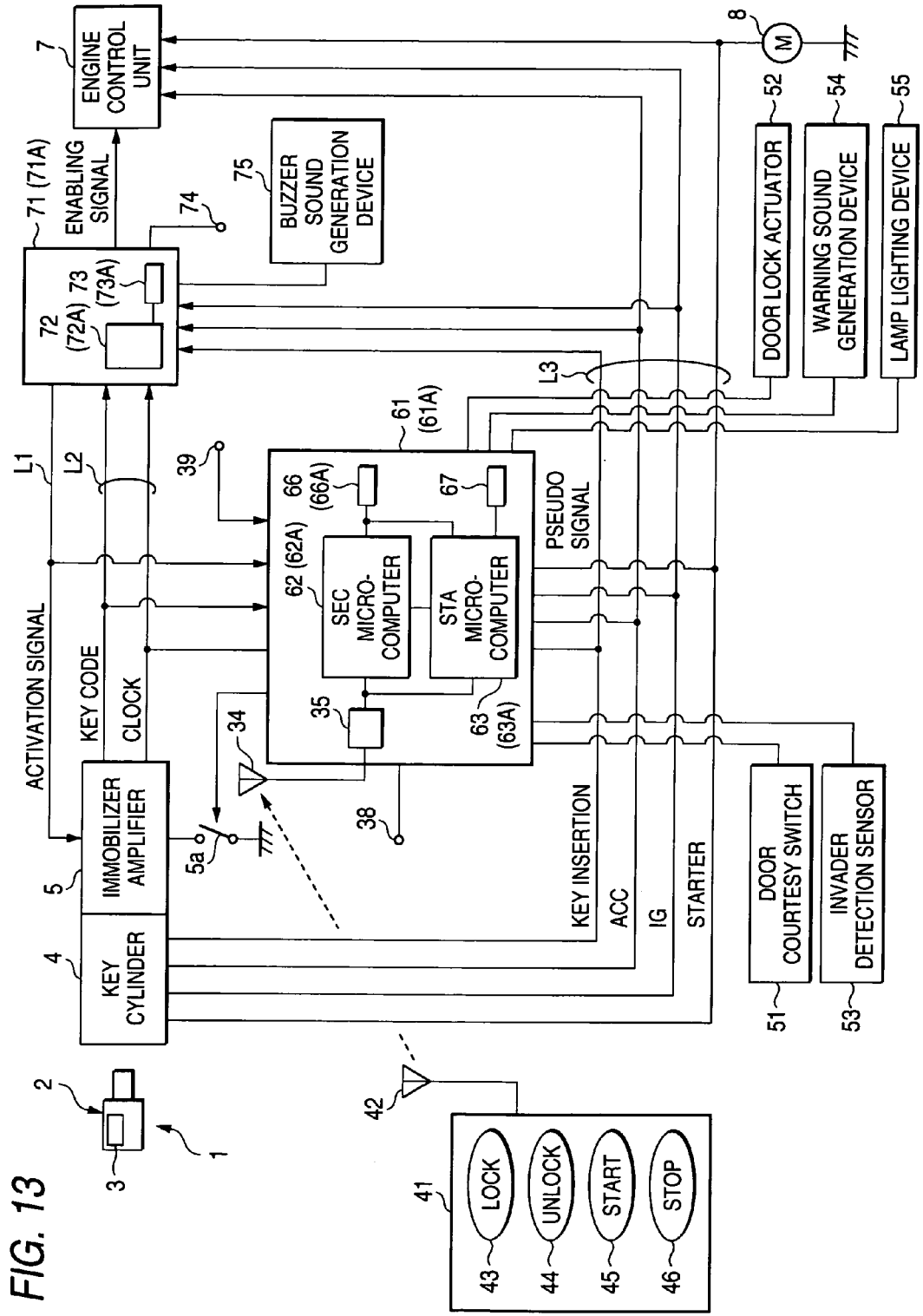
FIG. 13 is a block diagram which schematically showed a relevant part of an engine start-up system in which a remote start-up control apparatus, and a start-up control apparatus which relates to a third embodiment was adopted.

FIG. 13 is a block diagram which schematically showed a remote start-up control apparatus which relates to a third embodiment, and relevant parts of an engine start-up system in which a start-up control apparatus was adopted. In this regard, however, with regard to the engine start-up system, since it is the same structure as in the engine start-up system shown in FIG. 1, except for the remote start-up control apparatus (see, FIG. 1), and the security microcomputer 32, the remote start-up microcomputer 33, and the EEPROMs 36, 37, and the immobilizer unit 6, different reference numerals and signs are given to a remote-start-up control apparatus, a security microcomputer, a remote start-up microcomputer, EEPROM, and an immobilizer unit, and other explanations will be omitted here.

The remote start-up control apparatus 61 has a function for controlling the start-up of an engine, on the basis of an instruction from the portable transmitter 41, and has a function for blowing a warning whistle when it detects that it is in the theft state, and is configured by including a security (SEC) microcomputer 62, a remote start-up (STA) microcomputer 63, the antenna 34, and the receiving unit 35, an EEPROM 66 for storing a code which is in conformity with the remote ID code which has been stored in the portable transmitter 41, an EEPROM 67 in which the key code which is specific to the remote start-up control apparatus 61 was stored, and the program switch 38 which is utilized for the setup of the program mode (program mode for writing the remote ID code into the EEPROM 66).

The immobilizer unit 71 is configured by including a microcomputer 72, an EEPROM 72 for storing a key code which is in conformity with the key code (which is specific to the ignition key 1) which has been stored in the transponder 3 of the ignition key 1, a key code which is in conformity with the key code (which is specific to the remote start-up control apparatus 61) which has been stored in the EEPROM 67 of the remote start-up control apparatus 61, and so on, and a program switch 74 which is utilized for the setup of the program mode (program mode for writing the key code in the EEPROM 73, and so on).

Figure 14:
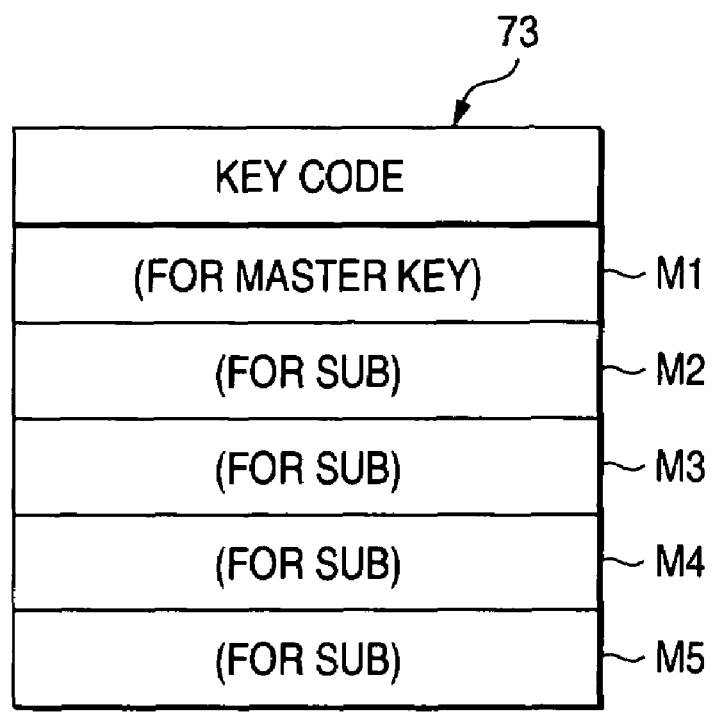
FIG. 14 is a view which showed one example of a storage format of an EEPROM for storing a key code in the remote start-up control apparatus which relates to the third embodiment.

The EEPROM 73 is configured to be able to store a plurality of key codes, as shown in FIG. 14, and it is designed such that a key code of a master key is stored in a storage region M1, and a key code of a spare key and a key code which is specific to the remote start-up control apparatus 61 are stored in storage regions M2 to M5. Also, to the immobilizer unit 71, a buzzer sound generation device 75 is connected, and it is designed that a buzzer sound can be generated by controlling the buzzer sound generation device 75.

Figure 3:
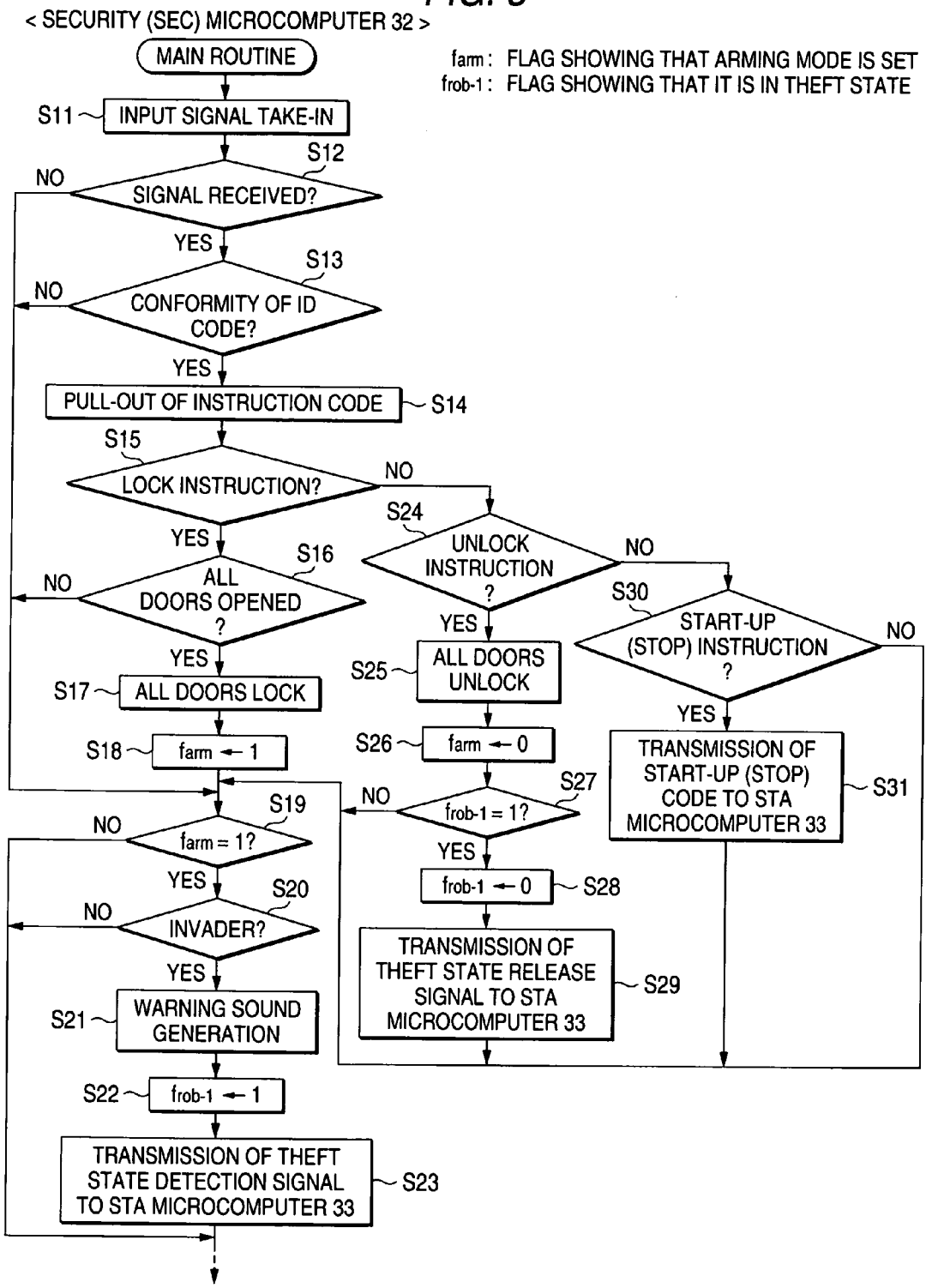
FIG. 3 is a flow chart which showed a process operation (main routine) which a security microcomputer in the remote start-up control apparatus which relates to the first embodiment carries out.
Figure 15:
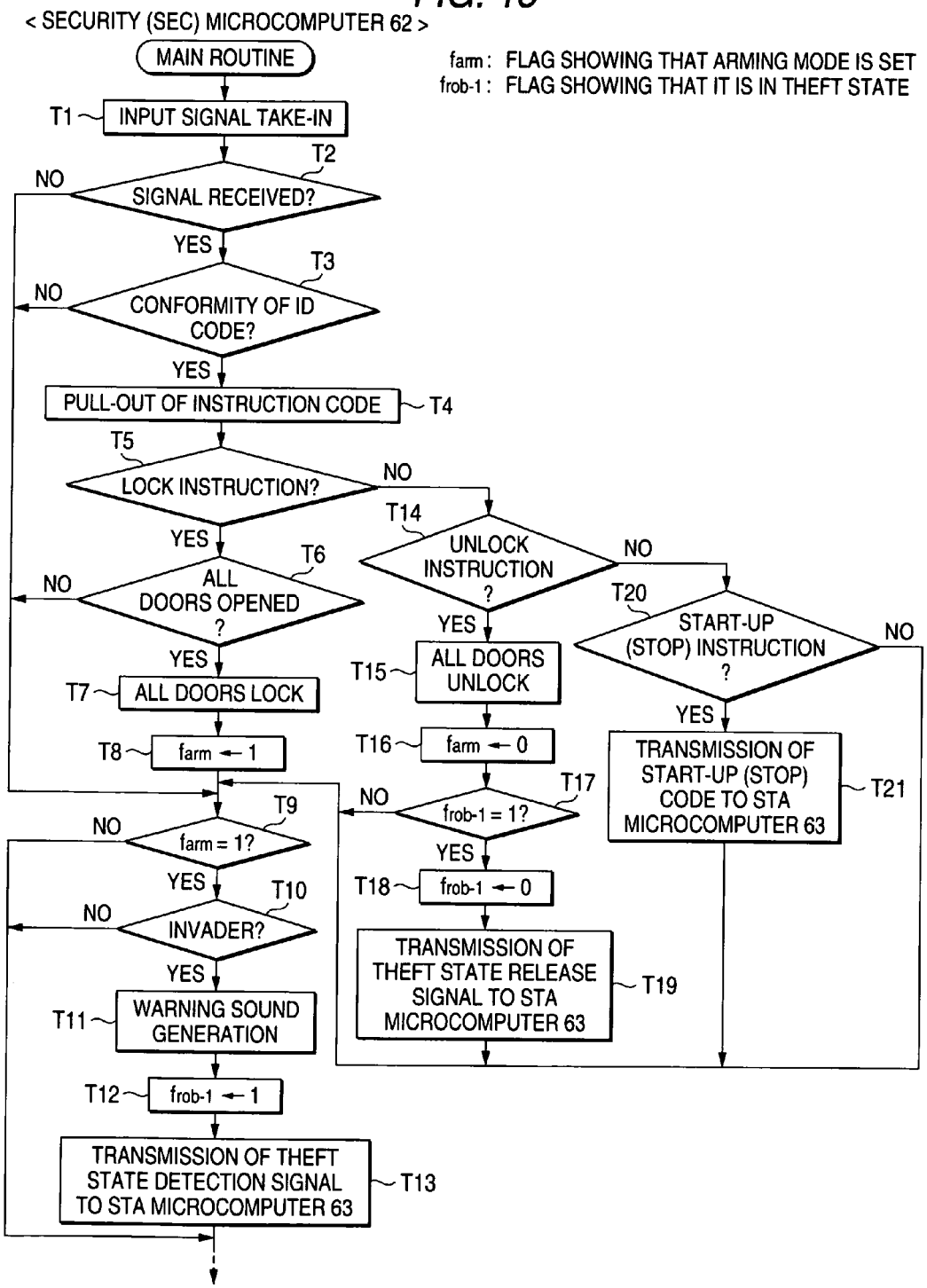
FIG. 15 is a flow chart which showed a process operation (main routine) which a security microcomputer in the remote start-up control apparatus which relates to the third embodiment carries out.

FIG. 15 is a flow chart which showed a process operation [6] (main routine) which the security microcomputer 62 in the remote start-up control apparatus 61 which relates to the third embodiment, but since the process operation [6] is the same as the process operation [2] which the security microcomputer 32 shown in FIG. 3 carries out, here, explanation thereof will be omitted.

Figure 16:
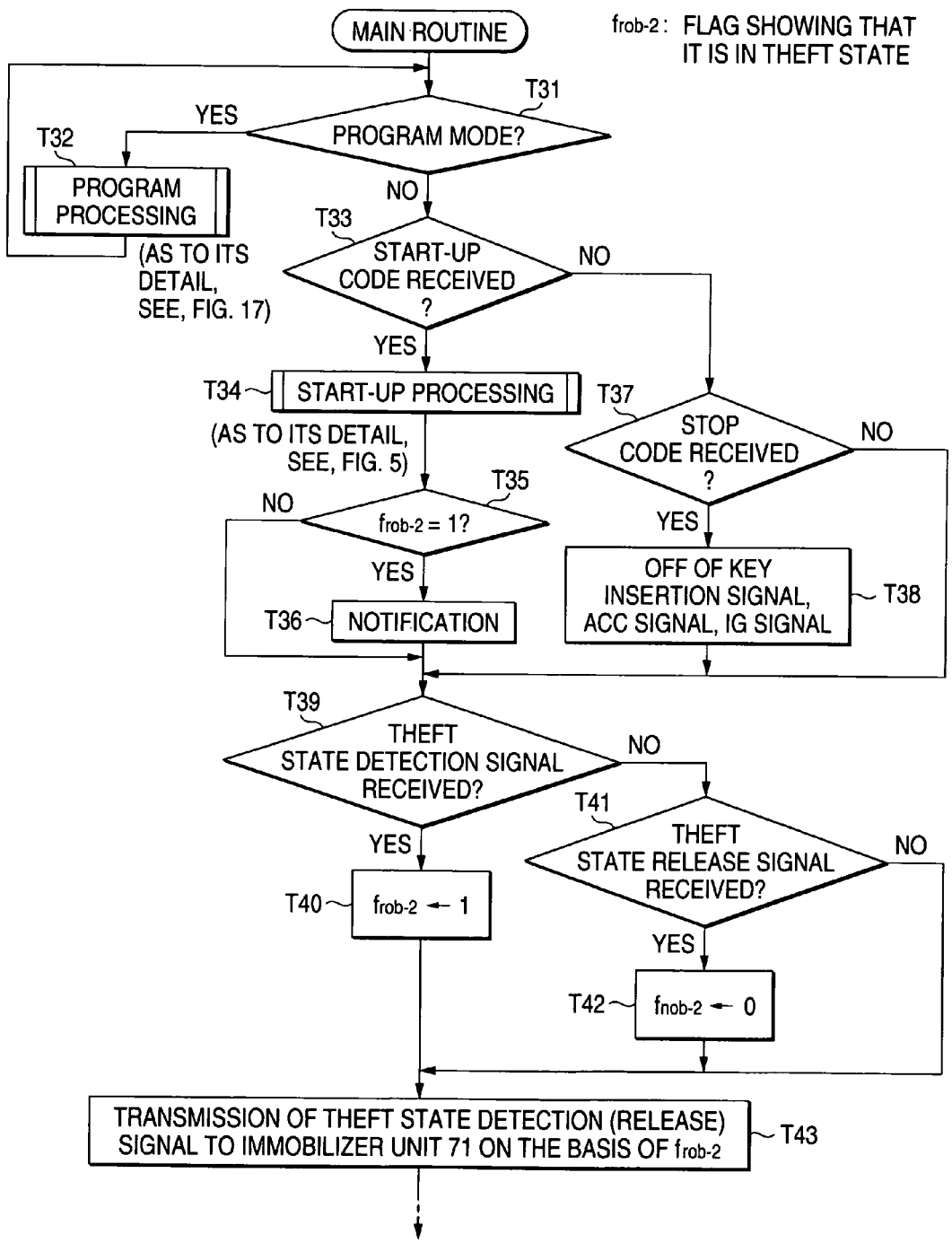
FIG. 16 is a flow chart which showed a process operation (main routine) which a remote start-up microcomputer in the remote start-up control apparatus which relates to the third embodiment carries out.

Next, a process operation [7] (main routine),which the remote start-up microcomputer 63 in the remote start-up control apparatus 61 which relates to the third embodiment carries out, will be described on the basis of a flow chart shown in FIG. 16. Firstly, judged is whether the program mode (program mode for writing the remote ID code in the EEPROM 66) is set up or not (step T31), and if it is judged that the program mode is set up, the routine goes to a step T32, and program processing is carried out (as to its detail, see, FIG. 17), and after that, the routine goes back to the step T31. The program mode is designed to be set up by push-down of the program switch 38, and so on, which will be described later in detail.

On one hand, if it is judged that the program mode is not set up, then, judged is whether the instruction code for instructing the engine start-up (see, step T21 of FIG. 15), which is being sent from the security microcomputer 62, was received or not (step T33). If it is judged that the instruction code for instructing the engine start-up was received, then, a process for having an engine started up is carried out (step T34), and after that, judged is whether the flag $f_{rob-2}$ showing that a vehicle is in the theft state is 1 or not (step T35). In passing, with regard to the process for having an engine started up, since it is the same as the process operation which the remote start-up microcomputer 33 shown in FIG. 5 carries out, here, explanation thereof will be omitted.

If it is judged that the flag $f_{rob-2}$ is 1 (i.e., in the theft state), in order to notify a user that the engine start-up is prohibited, a hazard lamp etc. is made to flash for several seconds by controlling the lamp lighting device 55 (step T36), and after that, the routine goes to a step T39.

Also, the reason that such a fact that the engine start-up is prohibited is notified to a user in the step T36 is that the enabling signal is designed not to be sent to the engine control unit 7 from the immobilizer unit 71 when it is in the theft state. In passing, this will be described later in detail on the basis of flow charts shown in FIGS. 18A and 18B.

On one hand, if it is judged that the flag $f_{rob-2}$ is not 1 (i.e., not in the theft state) in the step T35, since there is no necessity of notifying a user that the engine start-up is not prohibited, the routine goes to the step T39, skipping the step T36.

Also, in the step T33, if it is judged that the instruction code for instructing the engine start-up is not received, then, judged is whether the instruction code for instructing the engine stop (see, step T21 of FIG. 15) was received or not (step T37). If it is judged that the instruction code for instructing the engine stop was received, the engine is stopped by carrying out a process of the engine stop for turning all of the key insertion signal, ACC signal and IG signal OFF (step T38), and after that, the routine goes to the step T39. In passing, if it is judged that any one of the instruction codes of the engine start-up and the engine stop is not received, the routine goes to the step T39 as it is.

In the step T39, judged is whether the theft state detection signal (see, step T13 of FIG. 15), which is being sent from the security microcomputer 62, was received or not, and if it is judged that the theft state detection signal was received (i.e., a vehicle is in the theft state), then, the flag $f_{rob-2}$ showing that a vehicle is in the theft state is set to 1 (step T40), and after that, the routine goes to a step T43.

On one hand, in the step T39, if it is judged that the theft state detection signal is not received, then, judged is whether the theft state release signal (see, step T19 of FIG. 15), which is being sent from the security microcomputer 62, was received or not (step T41), and if it is judged that the theft state release signal was received (i.e., the theft state of the vehicle was released), then, the flag $f_{rob-2}$ is set to 0 (step T42), and after that, the routine goes to the step T43. On one hand, if it is judged that the theft state release signal is not received, the routine goes to the step T43 as it is.

In the step T43, on the basis of the flag $f_{rob-2}$, the theft state detection signal, or the theft state release signal is sent to the immobilizer unit 7, and after that, the routine goes to another process. In case that the flag $f_{rob-2}$ is 1, the theft state detection signal is sent, and on the other hand, in case that the flag $f_{rob-2}$ is 0, the theft state release signal is sent.

Figure 17:
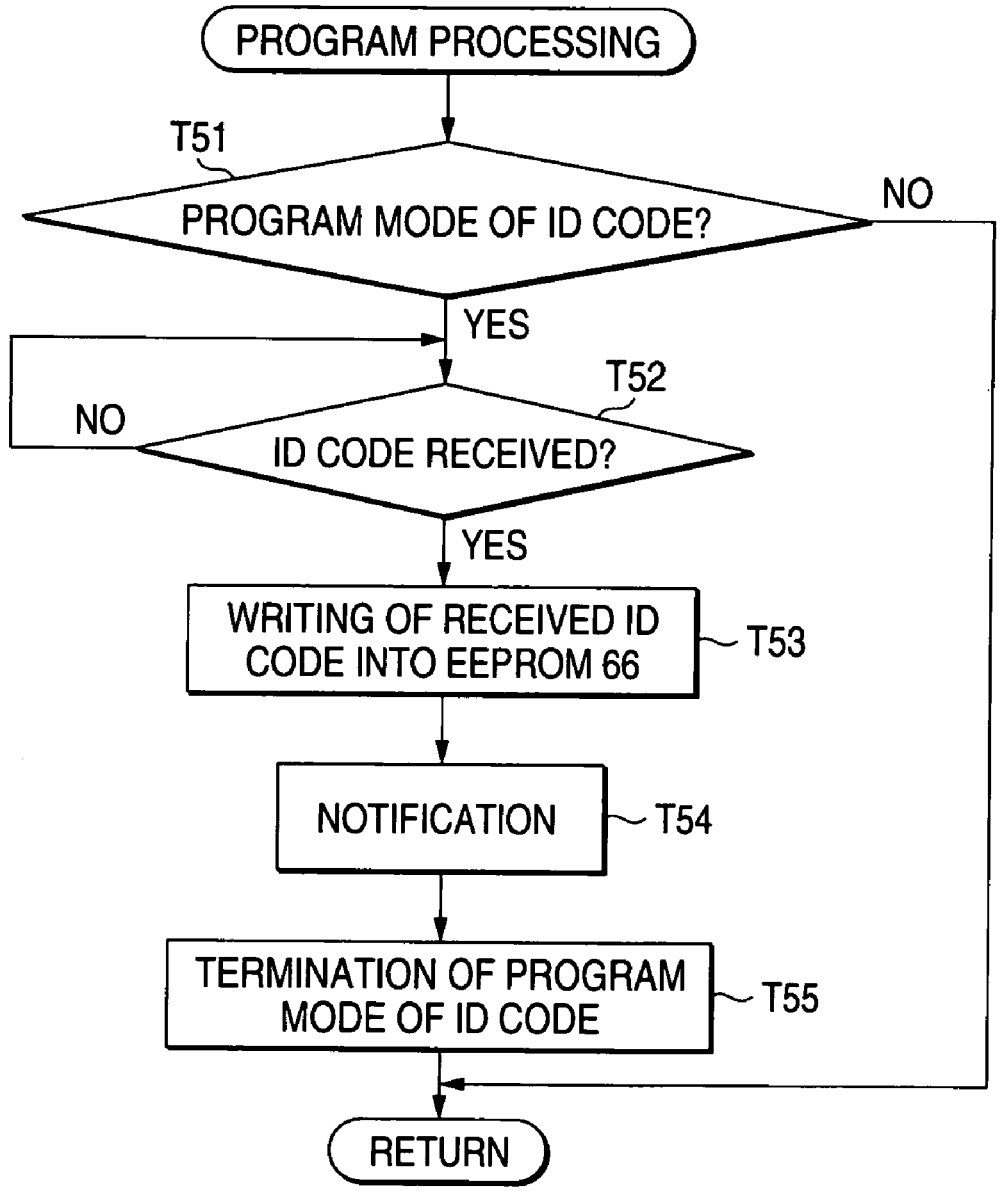
FIG. 17 is a flow chart which showed a process operation (program processing) which the remote start-up microcomputer in the remote start-up control apparatus which relates to the third embodiment carries out.

FIG. 17 is a flow chart which showed a process operation [7-2] (program process of the step T32 in FIG. 16) which the remote start-up microcomputer 63 in the remote start-up control apparatus 61 which relates to the third embodiment. In passing, the process operation [7-2] is an operation for writing the remote ID code, which has been registered in the portable transmitter 41, in the EEPROM 66.

In this regard, however, since the process operation [7-2] is the same as the steps S86 to S90 (see, FIG. 6A) out of the process operation [3-2] which the remote start-up microcomputer 33 carries out, here, explanation thereof will be omitted.

Figure 18A:
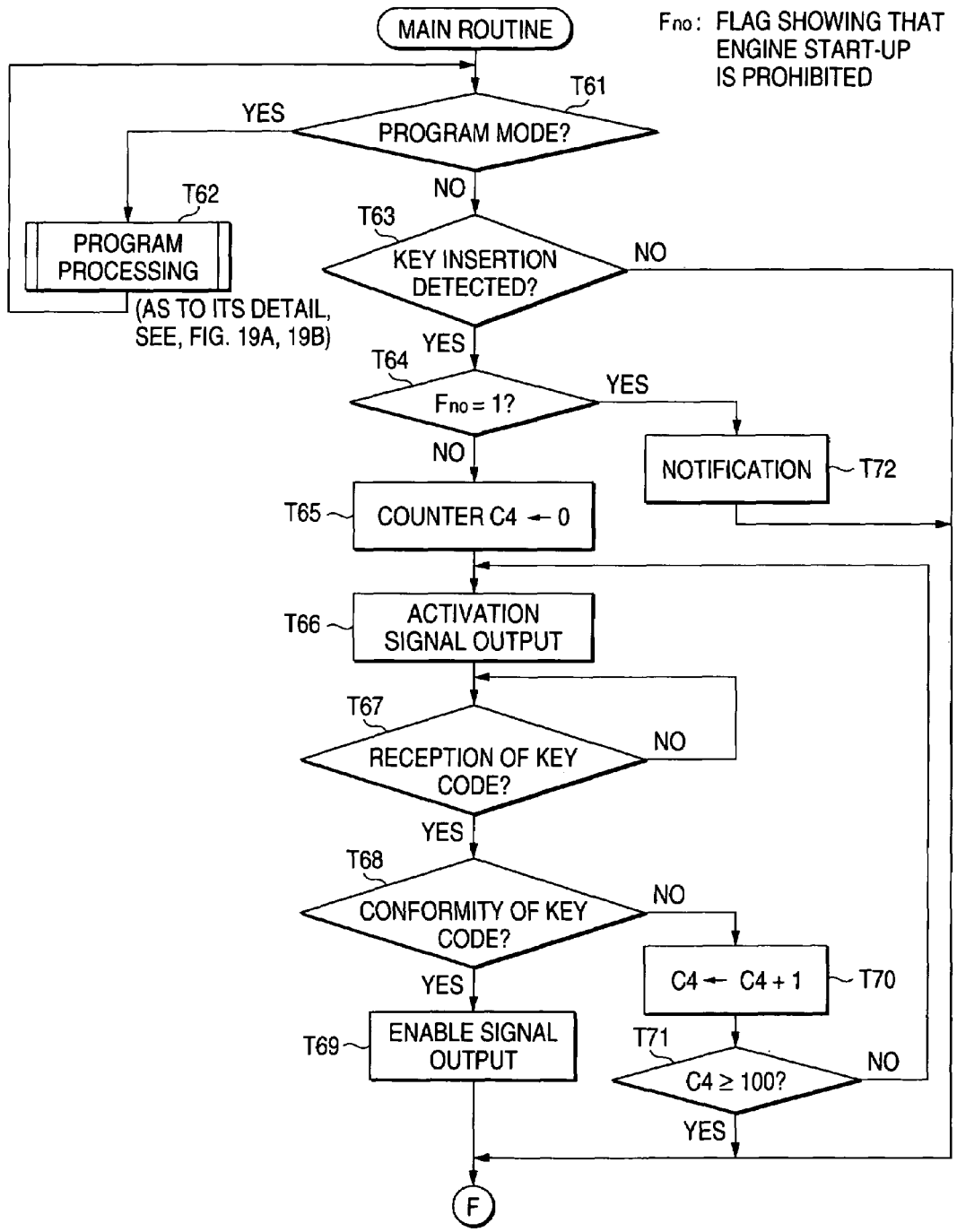
FIG. 18A is a flow chart which showed a process operation (main routine) which a microcomputer in a start-up control apparatus which relates to the third embodiment carries out.

Next, a process operation [8] (main routine), which the microcomputer 72 in the start-up control apparatus (immobilizer unit 71) which relates to the third embodiment will be described on the basis of flow charts shown in FIGS. 18A and 18B. Firstly, judged is whether a program mode (program mode for writing a key code in the EEPROM 73, and so on), is set up or not (step T61), and if it is judged that the program mode is set up, the routine goes to a step T62, and program processing is carried out (as to its detail, see, FIGS. 19A and 19B), and after that, the routine goes back to the step T61. The program mode is designed to be set up by push-down of the program switch 74, and son on, which will be described later in detail.

On one hand, if it is judged that the program mode is not set up, then, judged is whether the key insertion signal (Low→High) was received or not (step T63). The key insertion signal is changed from a Low state to a High state, in case that the ignition key 1 was inserted into the key cylinder 4 (Case I), or in case that the button switch 45 of the portable transmitter 41 was pushed down so as to carry out the engine start-up instruction according to a remote operation (Case II).

In the step T63, if it is judged that the key insertion signal was received, then, judged is whether the flag $F_{no}$ showing that the engine start-up is prohibited is 1 or not (step T64), and if it is judged that the flag $F_{no}$ is 1 (i.e., the engine start-up is not prohibited), the routine goes to a step T65, so that a process for enabling the start-up of an engine is started.

Firstly, a counter C4 is set to 0 (step T65), and then, the pulse shaped activation signal is supplied to the signal line L1, and the activation signal is sent to the immobilizer amplifier 5 and the remote start-up control apparatus 61 (step T66), and after that, such a situation that the key code is being sent is waited for (step T67). On one hand, if it is judged that the key insertion signal is not received, the routine goes to a step T73 (FIG. 18B).

In the meantime, the immobilizer amplifier 5 is designed, when it received the activation signal, to extract the key code (which is specific to the ignition key 1) which has been stored in the transponder 3, by activating the transponder 3 of the ignition key 1 inserted into the key cylinder 4, and to output the extracted key code to the immobilizer unit 71 through the signal line L2, together with the clock signal (in case of Case I).

Also, the remote start-up control apparatus 61 is designed, when it receives the activation signal, to output the key code, which has been stored in the EEPROM 67 and is specific to the remote start-up control apparatus 61, to the immobilizer unit 71 through the signal line L2, together with the clock signal (in case of Case II).

In a step T67, if it is judged that the key code was received, then, judged is whether the received key code is in conformity with any one of key codes which have been stored in the EEPROM 73 (step T68), and if it is judged that the received key code is in conformity with any one of key codes which have been stored in the EEPROM 73, then, to the engine control unit 7, the enabling signal for enabling the engine start-up is sent (step T69).

On one hand, in the step T68, in case that it was judged that the received key code is not in conformity with any one of key codes which have been stored in the EEPROM 73, 1 is added to the counter C4 (step T70), and judged is whether the counter C4 to which 1 was added shows a predetermined value (e.g., 100 times) and above or not (step T71), and if it is judged that the counter C4 does not show 100 times and above, the routine goes back to the step T66, and the activation signal is sent, and such a situation that the key code is being sent is waited for. On the other hand, if it is judged that the counter C4 shows 100 times and above, the routine goes to the step T73 (FIG. 18B).

Figure 18B:
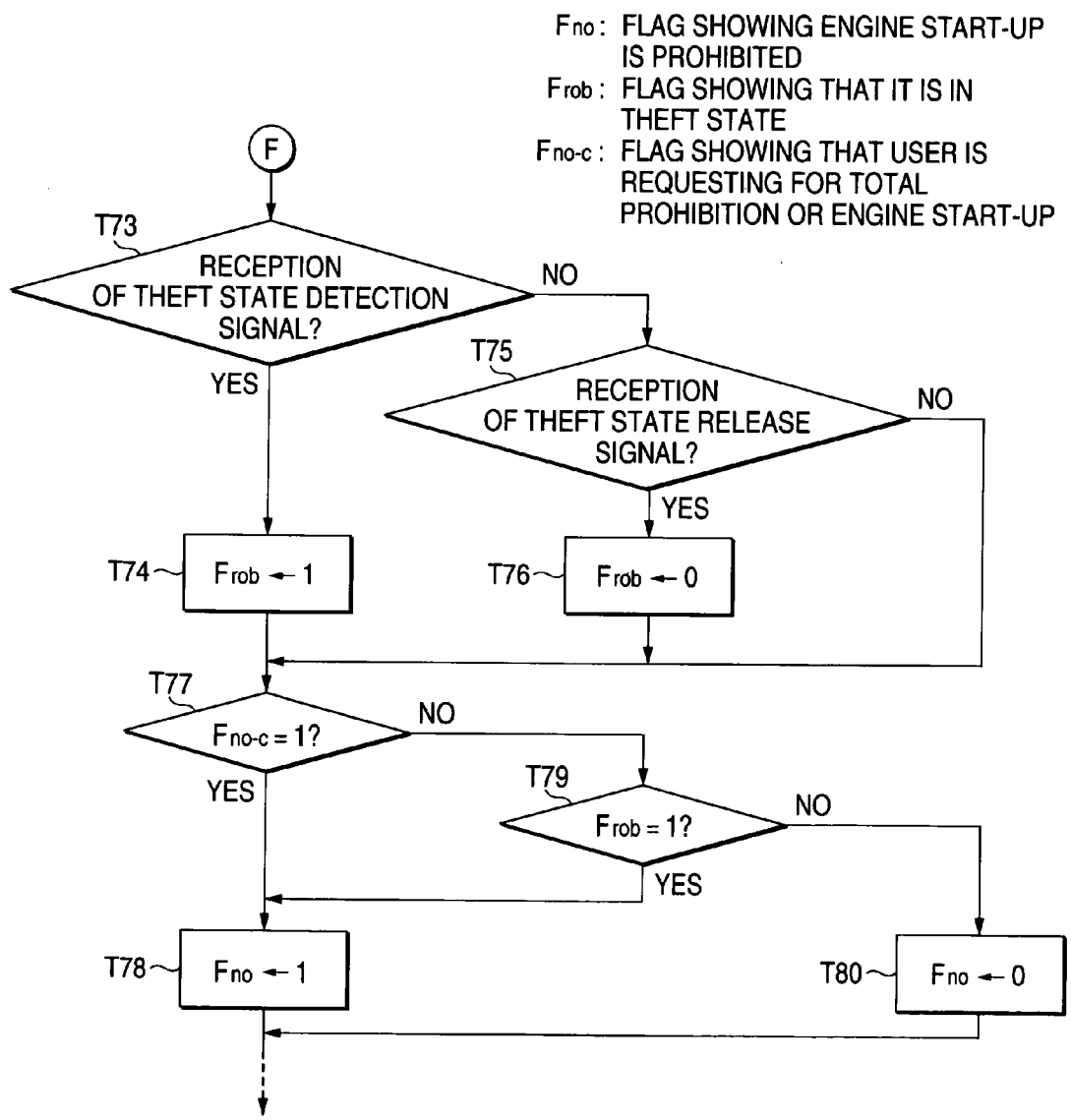
FIG. 18B is a flow chart which showed a process operation (main routine) which the microcomputer in the start-up control apparatus which relates to the third embodiment carries out.

Also, in the step T64, if it is judged that the flag $F_{no}$ is not 1 (i.e., the engine start-up is prohibited), in order to notify a user that the engine start-up is prohibited, a buzzer sound is generated, by controlling the buzzer sound generation device 75 (step T72), and after that, the routine goes to a step T73 (FIG. 18B).

In the step T73, judged is whether the theft state detection signal (see, step T43 of FIG. 16), which is being sent from the remote start-up control apparatus 61, was received or not, and if it is judged that the theft state detection signal was received (i.e., a vehicle is in the theft state), then, a flag $F_{rob}$ showing that a vehicle is in the theft state is set to 1 (step T74), and the routine goes to a step T77.

On the other hand, in the step T73, if it is judged that the theft state detection signal is not received, then, judged is whether the theft state release signal (see, step T43 of FIG. 16), which is being sent from the remote start-up control apparatus 61, was received or not (step T75), and if it is judged that the theft state release signal was received (i.e., the theft state of a vehicle was released), then, the flag $F_{rob}$ is set to 0 (step T76), and the routine goes to a step T77. On the other hand, if it is judged that the theft state release signal is not received, the routine goes to the step T77 as it is.

In the step T77, judged is whether a user a flag $F_{no-c}$ showing that a user is requesting total prohibition of the engine start-up (including not only a remote operation but also a normal operation by the ignition key 1) is 1 (as to its detail, see, FIG. 19B) or not, and if it is judged that the flag $F_{no-c}$ is 1 (i.e., a user is requesting the total prohibition of the engine start-up according to a remote operation), then, a flag $F_{no}$ showing that the engine start-up is prohibited is set to 1 so as to prohibit the engine start-up (step T78), and after that, the routine goes to another process.

On one hand, if it is judged that the flag $F_{no-c}$ is not 1 (i.e., a user is not requesting the total prohibition of the engine start-up according to a remote operation), then, judged is whether the flag $F_{rob}$ showing that a vehicle is in the theft state is 1 or not (step T79), and if it is judged that the flag $F_{rob}$ is 1 (i.e., in the theft state), the flag $F_{no}$ is set to 1 (step T78), and after that, the routine goes to another process. On the other hand, if it is judged that the flag $F_{rob}$ is not 1 (i.e., not in the theft state), the flag $F_{no}$ is set to 0 (step T80), and after that, the routine goes to another process.

Figure 19A:
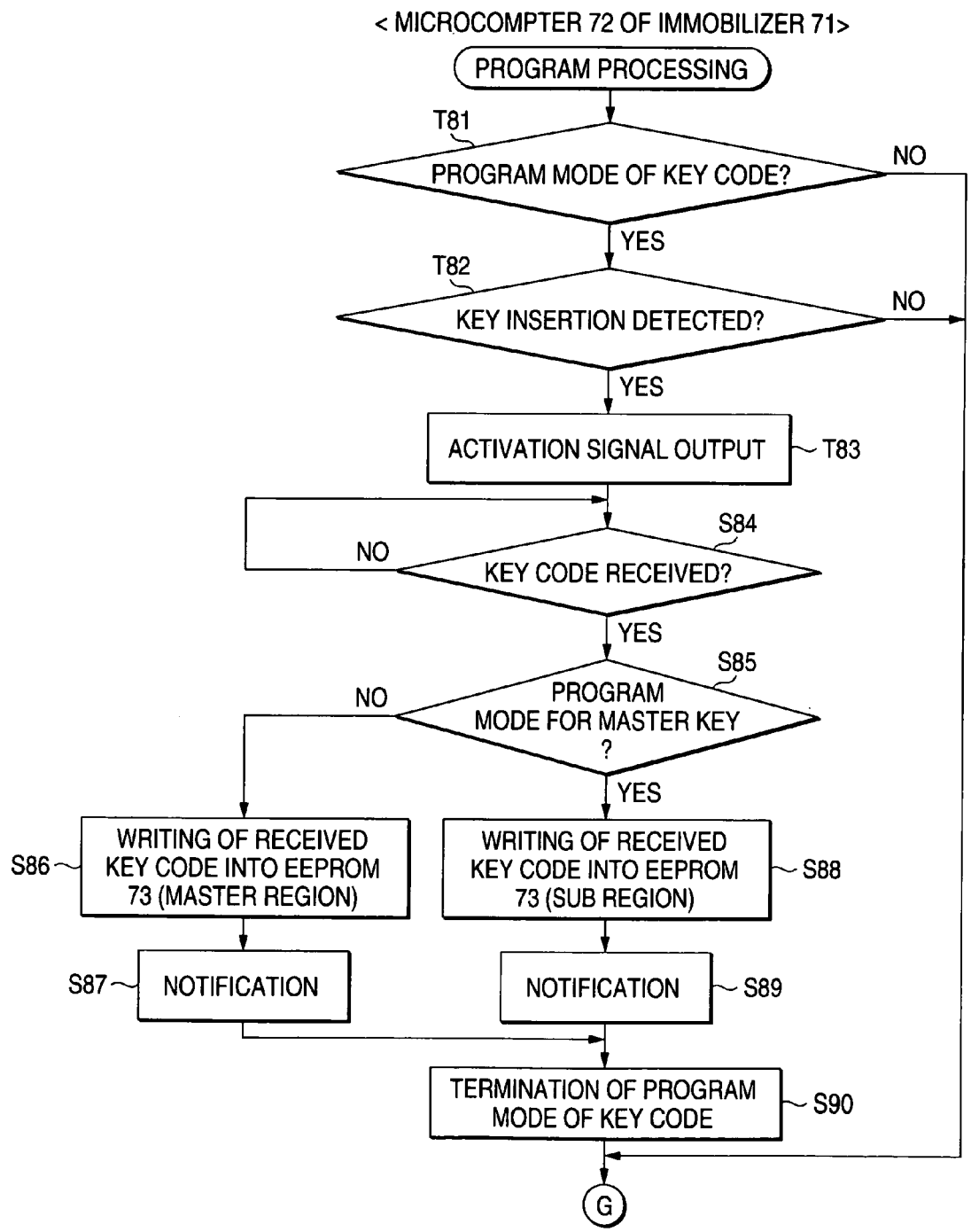
FIG. 19A is a flow chart which showed a process operation (program processing) which the microcomputer in the start-up control apparatus which relates to the third embodiment carries out.

Next, a process operation [8-1] which the microcomputer 72 in the start-up control apparatus (immobilizer unit 71) which relates to the third embodiment (program processing of the step T62 in FIG. 18A) will be described on the basis of flow charts shown in FIGS. 19A and 19B. In passing, the process operation [9-1] is an operation for writing the key code (which is specific to the ignition key 1) which has been registered in the transponder 3 of the ignition key 1, and the key code (which is specific to the remote start-up control apparatus 61) which has been stored in the EEPROM 67 of the remote start-up control apparatus 61, into the EEPROM 73, and for setting to such a state that the engine start-up is prohibited by user's will.

Firstly, judged is whether a program mode (program mode for writing the key code etc. which has been registered in the transponder 3 of the ignition key 1, into the EEPROM 73), which is set up by such a fact that a predetermined operation (e.g., normal one push, but not long push of the program switch 74) by use of the program switch 74 is carried out, is set up or not (step T81), and if it is judged that the program mode is set up, then, the routine goes to a step T82, and a process for writing the key code into the EEPROM 73 is started. On one hand, if it is judged that the program mode is not set up, the routine goes to a step T91 (FIG. 19B).

In the step T82, judged is whether the key insertion signal (Low→High) was received or not. In passing, the key insertion signal is changed from the Low state to the High state, in case that the ignition key was inserted into the key cylinder 4 (Case I), and in case that the engine start-up instruction according to a remote operation was carried out, by pushing down the button switch 45 of the portable transmitter 41 (Case II).

In the step S82, if it is judged that the key insertion signal was received, then, the pulse shaped activation signal is supplied to the signal line L1, and the activation signal is sent to the immobilizer amplifier 5 and the remote start-up control apparatus 61 (step T83), and after that, such a state that the key code is being sent is waited for (step S84). On one hand, if it is judged that the key insertion signal is not received, the routine goes to another process as it is.

In the meantime, the immobilizer amplifier 5 is designed to, when it receives the activation signal, extract the key code (which is specific to the ignition key 1) which has been stored in the transponder 3, by activating the transponder 3 of the ignition key 1 which has been inserted into the key cylinder 4, and to output the extracted key code, together with the clock signal, to the immobilizer unit 6 through the signal line L2 (in case of Case I).

Also, the remote start-up control apparatus 61 is designed to, when it receives the activation signal, to output the key code which has been stored in the EEPROM 67 and which is specific to the remote start-up control apparatus 61, together with the clock signal, to the immobilizer unit 6 through the signal line L2 (in case of Case II).

In the step S84, if it is judged that the key code was received, then, judged is whether the program mode for the master key, which is set up by such a fact that a predetermined operation by use of the program switch 74 (e.g., successive two pushes of the program switch 74, after the program mode of the key code was set up) is carried out, is set up or not (step T85).

Figure 19B:
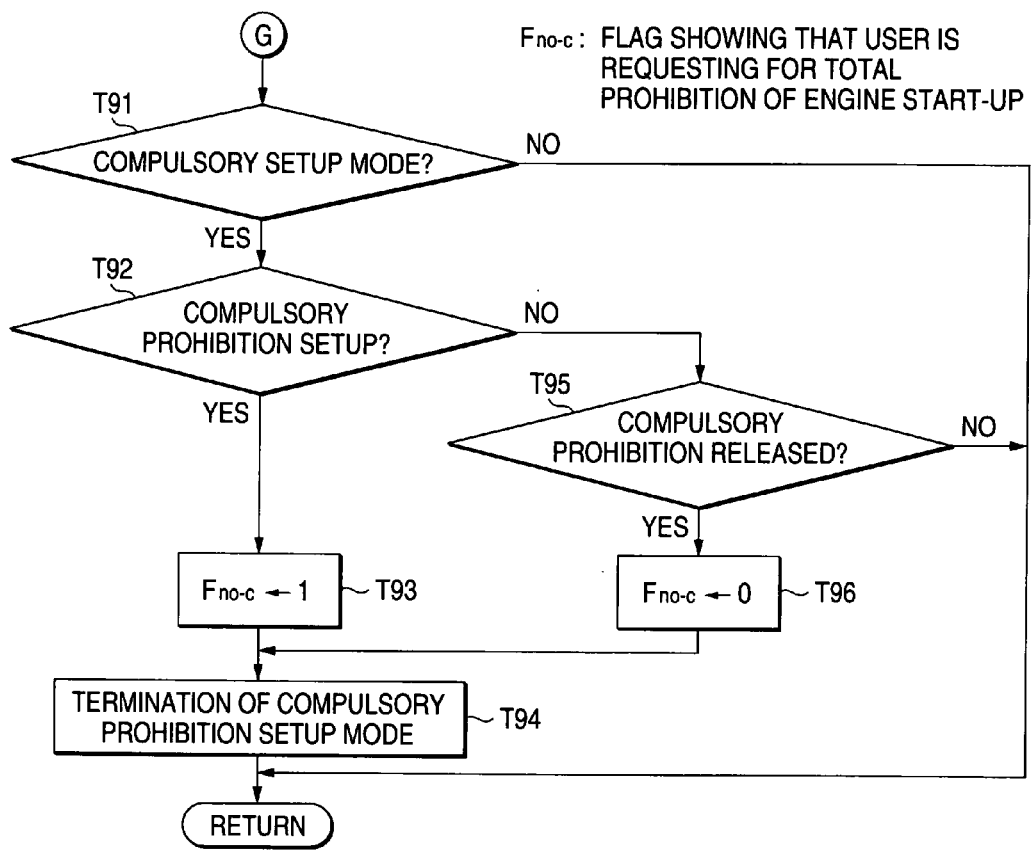
FIG. 19B is a flow chart which showed a process operation (program processing) which the microcomputer in the start-up control apparatus which relates to the third embodiment carries out.

If it is judged that the program mode for the master key is set up, the received key code is written into the storage region M1 (see, FIG. 14) of the EEPROM 73 (step T86), and in order to notify a user that the writing of the key code for the master key into the EEPROM 73 was completed, a buzzer sound is generated by controlling the buzzer sound generation device 75 (step T87), and after that, the program mode is terminated (step T90), and the routine goes to the step T91 (FIG. 19B).

On one hand, if it is judged that the program mode for the master key is not set up, the received key code is written into any one of the storage regions M2 to M5 (see, FIG. 14) of the EEPROM 73 (step T88), and in order to notify a user that the writing of the key code into the EEPROM 73 was completed, a buzzer sound is generated by controlling the buzzer sound generation device 75 (step T89), and after that, the program mode is terminated (step T90), and the routine goes to the step T91 (FIG. 19B). In passing, it is desirable that the number of generation of the buzzer sound in the step T89 is made to be different from the number of generation in the step T87.

In the step S91, judged is whether a compulsory prohibition setup mode for carrying out the setup or the release of the state for prohibiting the engine start-up by user's will, which is set up by such a fact that a predetermined operation by use of the program switch 74 (e.g., long push of the program switch), is set up or not, and if it is judged that the compulsory prohibition setup mode is set up, then, the routine goes to a step S92, and a process for the setup or the release of the state is started. On one hand, if it is judged that the compulsory prohibition setup mode is not setup, the process operation [8-1] is terminated as it is.

In the step S92, judged is whether a predetermined operation by use of the program switch 74 (e.g., one push of the program switch 74, after the compulsory prohibition setup mode was set up) was carried out or not (i.e., whether a user is requesting for prohibition of the engine start-up or not), and if it is judged that the predetermined operation was carried out, a flag $F_{no-c}$ showing that a user is requesting for the engine start-up is set to 1 (step S93), and after that, the compulsory prohibition setup mode is terminated (step S94), and the process operation [8-1] is terminated.

On one hand, if it is judged that the predetermined operation is not carried out, then, judged is whether another operation (e.g., successive two pushes of the program switch, after the compulsory prohibition setup mode was set up), which is different from the above-described predetermined operation by use of the program switch, was carried out or not (i.e., whether or not a user is requesting for the release of the state for prohibiting the engine start-up) (step S95), and if it is judged that the another predetermined operation was carried out, the flag $F_{no-c}$ is set to 0 (step S96), and after that, the compulsory prohibition setup mode is terminated (step S94), and the process operation [8-1] is terminated. Also, if it is judged that the another predetermined operation is not carried out, the process operation [8-1] is terminated as it is.

In passing, here, the program mode of the key code, and the compulsory prohibition setup mode are designed to be set up when the program switch 38 is pushed down, but a setup method of these modes is not limited to this, and for example, they may be set up by a particular operation by use of the button switches 43 to 46 of the portable transmitter 41, a particular operation by use of an input switch, not shown, which is connected to the immobilizer unit 71.

According to the remote start-up control apparatus which relates to the above-described third embodiment, even if there occurs no such a case that the qualified ignition key 1 is inserted into the key cylinder 4 and turned, it is possible to have an engine started up according to a remote operation, and also, in case that theft of a vehicle occurred, the theft state detection signal is supplied to the immobilizer unit 71, and on the other hand, when the theft state is released, the theft state release signal is supplied to the immobilizer unit 71.

Also, according to the start-up control apparatus (immobilizer unit 71) which relates to the above-described third embodiment, when the theft state detection signal, which is being sent from the remote start-up control apparatus 61, is received, it is judged that a vehicle is in the theft state, and the enabling signal is not sent to the engine control unit 7. Thus, in case that there occurred the vehicle theft, it is possible to realize such a state that the engine start-up is not enabled, or permitted.

By this, even if realized by any chance is such a state that an operation of the remote start-up control apparatus 61 becomes possible by a transmitter which a burglar has, in case that there occurred the vehicle theft, the start-up of an engine is not enabled, and therefore, it is possible to prevent the engine from being started up by use of the transmitter.

Also, in the start-up control apparatus (immobilizer unit 71) which relates to the above-described third embodiment, it is designed such that, if it judges that a vehicle is in the theft state, the engine start-up is prohibited by not only a remote operation but also a normal operation (operation by use of the ignition key 1), but in a start-up control apparatus which relates to another embodiment, it maybe designed such that such that the start-up control apparatus is configured so as to be able to distinguish the supply source of the key code (the ignition key 1, or the remote start-up control apparatus 61), and in case that a vehicle is in the theft state, only the engine start-up according to a remote operation is prohibited.

Also, in a start-up control apparatus which relates to still another embodiment, even in case of such a state that the engine start-up according to a remote operation was prohibited, the state may be released in case that the engine start-up was realized according to a normal operation.

Next, an engine start-up system in which the remote start-up control apparatus, and the start-up control apparatus which relate to a fourth embodiment was adopted will be described. In this regard, however, with regard to the engine start-up system, since it is the same structure as in the engine start-up system shown in FIG. 13, except for the remote start-up control apparatus 31, and the security microcomputer 32, the remote start-up microcomputer 33, and the EEPROM 66 for storing the remote ID code, the immobilizer unit 71, and the microcomputer which constitutes the immobilizer unit 71, and the EEPROM 73 for storing the key code, all of which configure the remote start-up control apparatus 31, different reference numerals and signs are given to a remote-start-up control apparatus, a security microcomputer, a remote start-up microcomputer, an EEPROM for storing a remote ID code, an immobilizer unit, a microcomputer, and an EEPROM, and other explanations will be omitted here.

EEPROM 66A is configured, as shown in FIG. 20, to be able to store a plurality of remote ID codes, so as to enable an additional registration of the portable transmitter for instructing the start-up etc. of an engine according to a remote operation, and also, is configured to be able to store a value of a theft moment registration flag $f_{cd}$ (1 or 0) in compliance with each remote ID code. In case that the theft moment registration flag $f_{cd}$ is 0, it shows that the corresponding remote ID code is one which was registered before occurrence of theft, and adversely, in case that the theft moment registration flag $f_{cd}$ is 1, it shows that the corresponding remote ID code is one which was registered after occurrence of theft.

Also, the EEPROM is configured, as shown in FIG. 21, to be able to store a plurality of key codes, and it is designed such that a key code of a master key is stored in a storage region Ma1, and key codes of spare keys are stored in storage regions Ma2 to Ma4, and a key code which is specific to a remote start-up control apparatus 61A is stored in a storage region Ma5.

Figure 22:
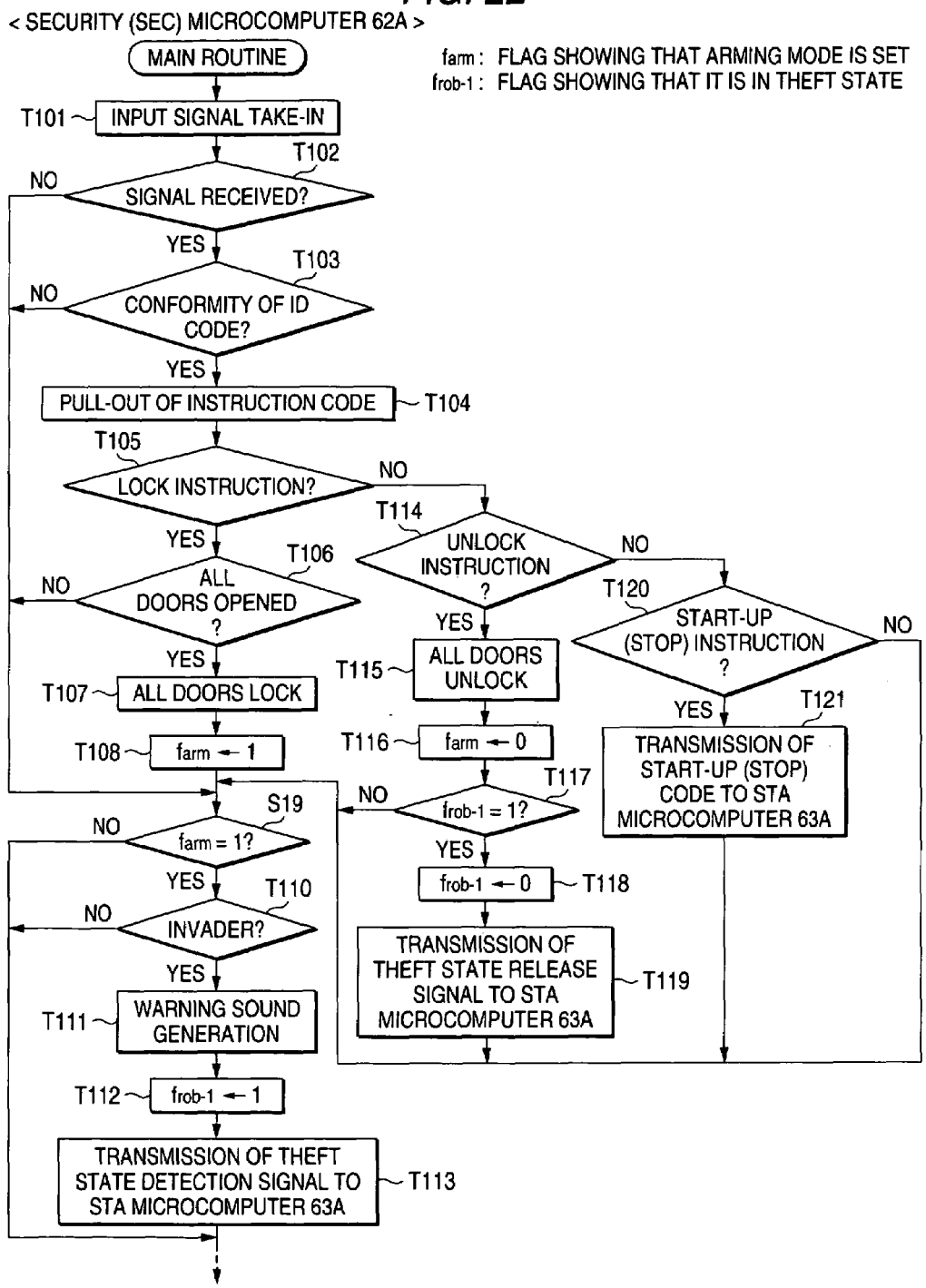
FIG. 22 is a flow chart which showed a process operation (main routine) which a security microcomputer in a remote start-up control apparatus which relates to the fourth embodiment carries out.

FIG. 22 is a flow chart which showed a process operation [9] (main routine) which a security microcomputer 62A in the remote start-up control apparatus 61A which relates to the fourth embodiment, but since the process operation [9] is the same as the process operation [2] which the security microcomputer 32 shown in FIG. 3 carries out, here, explanation thereof will be omitted.

Figure 23:
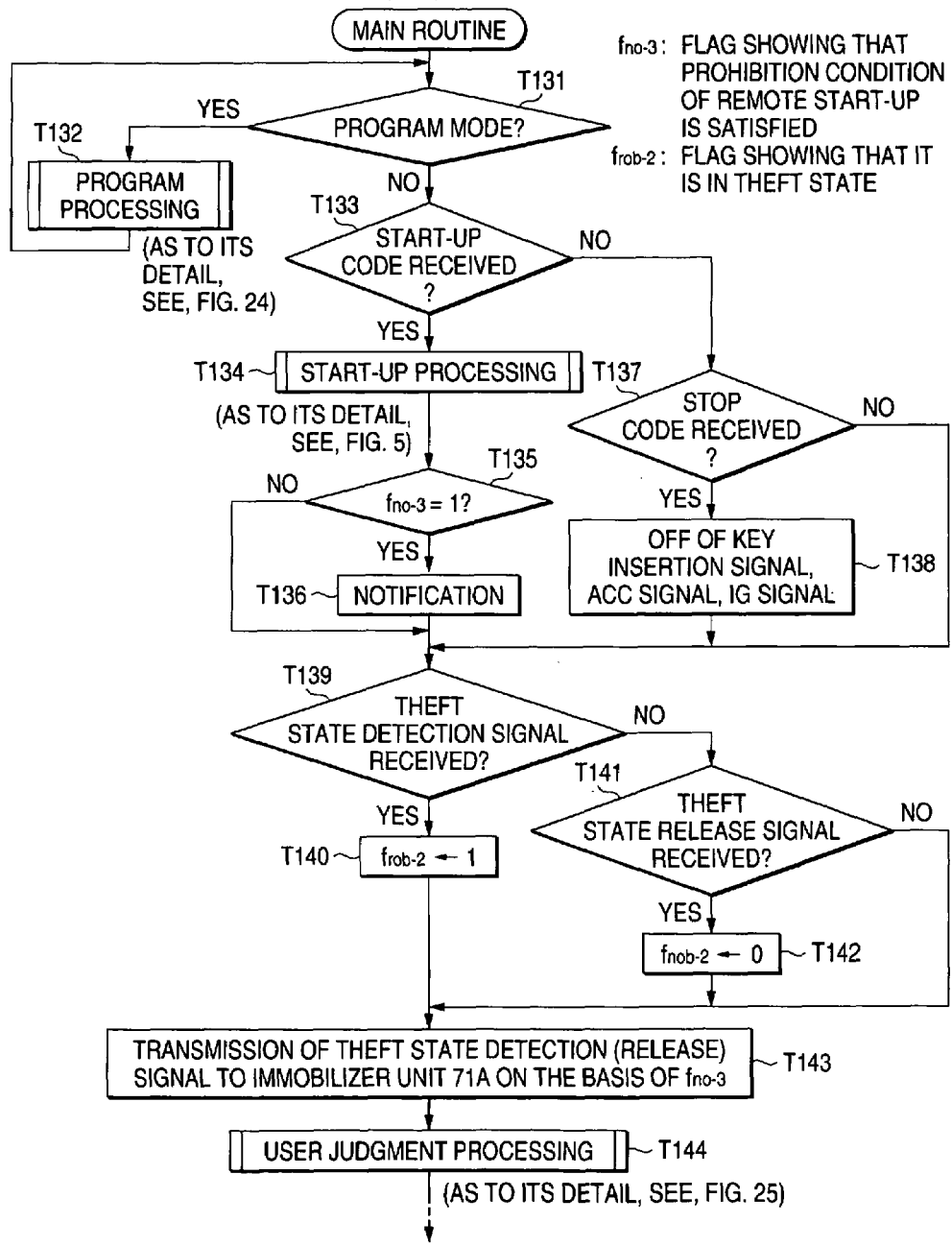
FIG. 23 is a flow chart which showed a process operation (main routine) which a remote start-up microcomputer in the remote start-up control apparatus which relates to the fourth embodiment carries out.

Next, a process operation [10] (main routine), which a remote control microcomputer 63A in the remote start-up control apparatus 61A which relates to the fourth embodiment carries out, will be described on the basis of a flow chart shown in FIG. 23. Firstly, judged is whether a program mode (program mode for writing the remote ID code into an EEPROM 66A) is set up or not (step T131), and if it is judged that the program mode is set up, the routine goes to a step T132, and program processing is carried out (as to its detail, see, FIG. 24), and after that, the routine goes back to the step T131. The program mode is designed to be set up by pushdown of the program switch 38, and so on, which will be described later in detail.

On one hand, if it is judged that the program mode is not set up, then, judged is whether the instruction code for instructing the engine start-up (see, step T121 of FIG. 22), which is being sent from the security microcomputer 62A, was received or not (step T133). If it is judged that the instruction code for instructing the engine start-up was received, then, a process for having an engine started up is carried out (step T134), and after that, judged is whether the flag $f_{no-3}$ showing that a condition for prohibiting the engine start-up according to a remote operation is satisfied is 1 or not (step T135). In passing, the flag $f_{no-3}$ becomes 1 in case that there exists 1 in even one of the theft moment registration flag $f_{cd}$ (see, FIG. 20) which is stored in the EEPROM 66A, which will be described later in detail on the basis of a flow chart shown in FIG. 24. Also, with regard to the process for having an engine started up, since it is the same as the process operation which the remote start-up microcomputer shown in FIG. 5 carries out, explanation thereof will be omitted here.

If it is judged that the flag $f_{no-3}$ is 1 (i.e., the condition for prohibiting the engine start-up according to a remote operation is satisfied), in order to notify a user that the engine start-up according to a remote operation is prohibited, a hazard lamp etc. is made to flash for several seconds by controlling the lamp lighting device 55 (step T136), and after that, the routine goes to a step T139.

Also, the reason that such a fact that the engine start-up is prohibited is notified to a user in the step T136 is that the enabling signal is designed not to be sent to the engine control unit 7 from a immobilizer unit 71A when the above-described condition is satisfied. In passing, this will be described later in detail on the basis of flow charts shown in FIGS. 26A and 26B.

On one hand, if it is judged that the flag $f_{no-3}$ is not 1 (i.e., the condition for prohibiting the engine start-up according to a remote operation is not satisfied) in the step T135, since there is no necessity of notifying a user that the engine start-up is not prohibited, the routine goes to the step T139, skipping the step T136.

Also, in the step T133, if it is judged that an instruction code for instructing the engine start-up is not received, then, judged is whether an instruction for instructing an engine stop (see, step T121 of FIG. 22) was received or not (step T137). If it is judged that the instruction code for instructing the engine stop was received, a process of the engine stop in which all of the key insertion signal, ACC signal and IG signal are turned OFF is carried out to have the engine stopped (step T138), and after that, the routine goes to the step T139. In passing, if it is judged that each instruction code of the engine start-up and the engine stop is not received, the routine goes to the step T139 as it is.

In the step T139, judged is whether the theft state detection signal which is being sent from the security microcomputer 62A (see, step T133 of FIG. 22) was received or not, and if it is judged that the theft state detection signal was received (i.e., a vehicle is in the theft state), then, a flag $f_{rob-2}$ showing that a vehicle is in the theft state is set to 1 (step T140), and after that, the routine goes to a step T143.

On one hand, in the step T139, if it is judged that the theft state detection signal is not received, then, judged is whether the theft state release signal which is being sent from the security microcomputer 62A (see, step T119 of FIG. 22) was received or not (step T141), and if it is judged that the theft state release signal was received (i.e., the theft state of a vehicle is released), then, a flag $f_{rob-2}$ is set to 0 (step T142), and after that, the routine goes to a step T143,. On the other hand, if it is judged that the theft state release signal is not received, the routine goes to the step T143 as it is.

In the step T143, on the basis of a flag $f_{no-3}$ showing that the condition for prohibiting the engine start-up according to a remote operation is satisfied, a prohibition request signal for requesting for the prohibition of the engine start-up according to a remote operation or a release request signal for requesting for release of the prohibition are sent to the immobilizer unit 71, and then, the routine goes to a step T144, and a user judgment process for carrying out judgment of whether or not a user of the portable transmitter 41 is a qualified user (as to its detail, see, FIG. 25) is carried out, and after that, the routine goes to another process. In case that the flag $f_{no-3}$ is 1, the prohibition request signal is sent, and on the other hand, in case that the flag $f_{no-3}$ is 0, the release request signal is sent.

Figure 24:
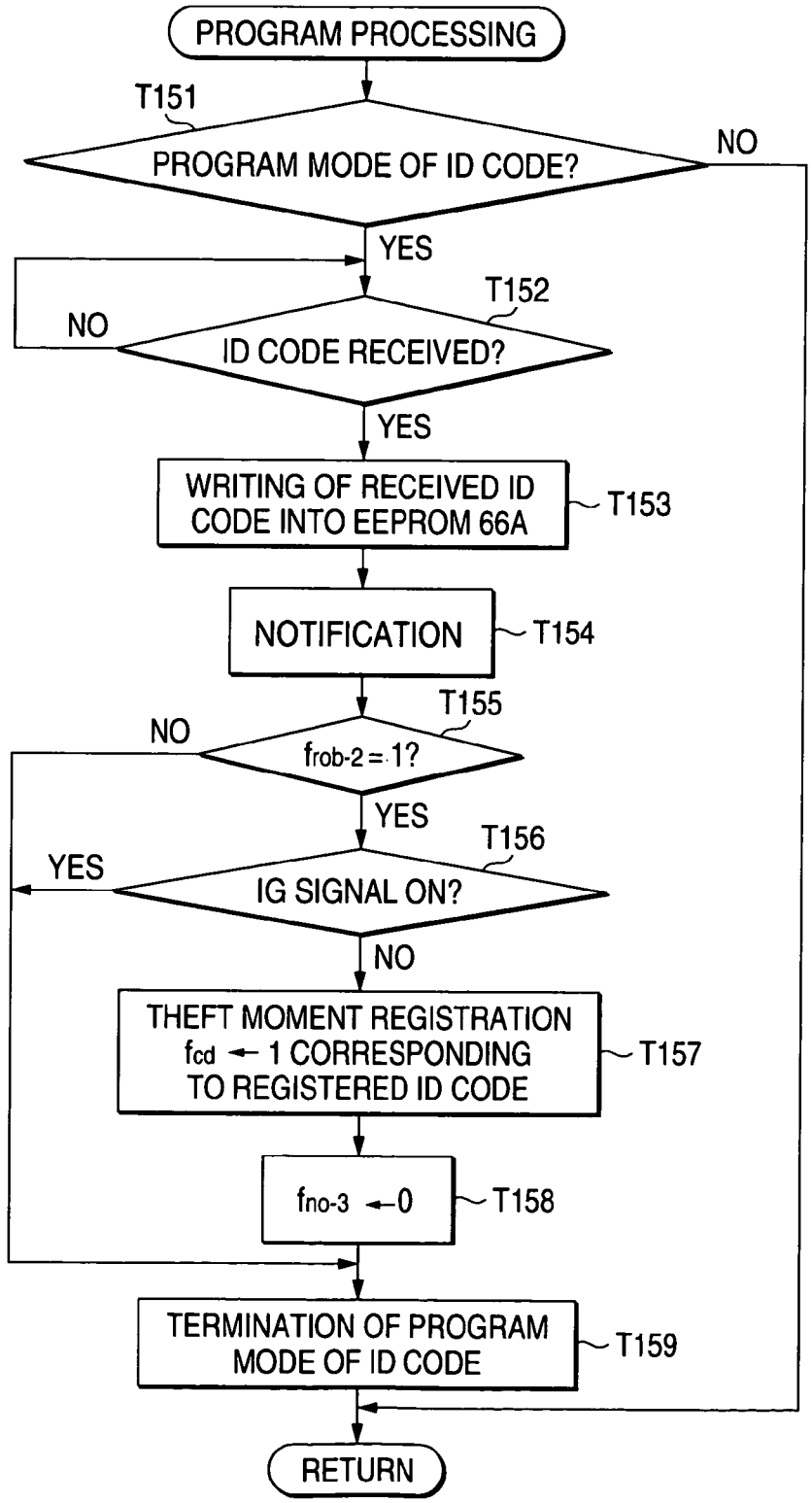
FIG. 24 is a flow chart which showed a process operation (program processing) which the remote start-up microcomputer in the remote start-up control apparatus which relates to the fourth embodiment carries out.

Next, a process operation [10-2] which the remote start-up microcomputer 63A in the remote start-up control apparatus 61A which relates to the third embodiment (program processing of the step T132 in FIG. 23) will be described on the basis of a flow chart shown in FIG. 24. In passing, the process operation [10-2] is an operation for writing a remote ID code which has been registered in the portable transmitter 41 into the EEPROM 66A.

Firstly, judged is whether the program mode of the remote ID code (program mode for writing the remote ID code which has been registered in the portable transmitter 41 into the EEPROM 66A, in order to carry out an additional registration of the portable transmitter 41 which enables the engine start-up etc. according to a remote operation), which is set up by carrying out a predetermined operation (e.g., successive two pushes of the program switch 38) by use of the program switch 38, is set up or not (step T151), and if it is judged that the program mode is set up, then, the routine goes to a step T152, and a process for writing the remote ID code into the EEPROM 66A is started. On one hand, if it is judged that the program mode is not set up, the process operation [10-2] is terminated as it is.

In the step T152, judged is whether the remote ID code (i.e., remote ID code which has been registered in the portable transmitter 41) which is being sent from the portable transmitter 41, through the antenna 34 and the receiving unit 35, was received or not, and if it is judged that the remote ID code was received, the received remote ID code is written into the EEPROM 66A (step T153), and in order to notify a user that writing of a new remote ID code into the EEPROM 66A was completed, the warning whistle is blown by controlling the warning sound generation device 54 (step T154).

Next, judged is whether the flag $f_{rob-2}$ showing that it is in the theft state is 1 or not (step T155), and if it is judged that the flag $f_{rob-2}$ is 1 (i.e., in the theft state), subsequently, judged is whether the IG signal is in the ON state or not (step T156).

The IG signal is turned in the ON state, in case that the ignition key 1 was inserted into the key cylinder 4, and the ignition key 1 was turned to the IG position. Thus, such a situation that the IG signal is in the ON state can be judged to be such a situation that a vehicle is operated by a qualified user.

Thus, in a step T156, if it is judged that the IG signal is not in the ON state (i.e., it is in the theft state, and also, a vehicle is not operated by a qualified user), it is judged that a holder of, or a person who is holding a transmitter, which becomes a transmission source of the remote ID code which was received in the step T152, is a burglar, and the theft moment registration flag $f_{cd}$, which corresponds to the remote ID code registered in the EEPROM 66A in the step T153, is set to 1 (step T158), and the flag $f_{no-3}$ showing that a condition for prohibiting the engine start-up according to a remote operation is satisfied, is set to 1 (step T159), and after that, the program mode is terminated (step T159), and the process operation [10-2] is terminated. In passing, the flag $f_{no-2}$ becomes 1, as described above, in case that even one of the theft moment registration flag F, which is stored in the EEPROM 66A, has become 1.

Also, in case that it is judged that the flag $f_{rob-2}$ is not 1 (i.e., not in the theft state) in the step T155, or, in case that it is judged that the IG signal is in the ON state (i.e., it is in the theft state but a vehicle is operated by a qualified user) in the step T156, it is judged that a holder of a transmitter which becomes a transmission source of the remote ID code received in the step T152 is a qualified user (thus, there is no necessity of setting the theft moment registration flag $f_{cd}$ to 1), and the program mode is terminated as it is (step T159), and the process operation [10-2] is terminated.

Figure 25:
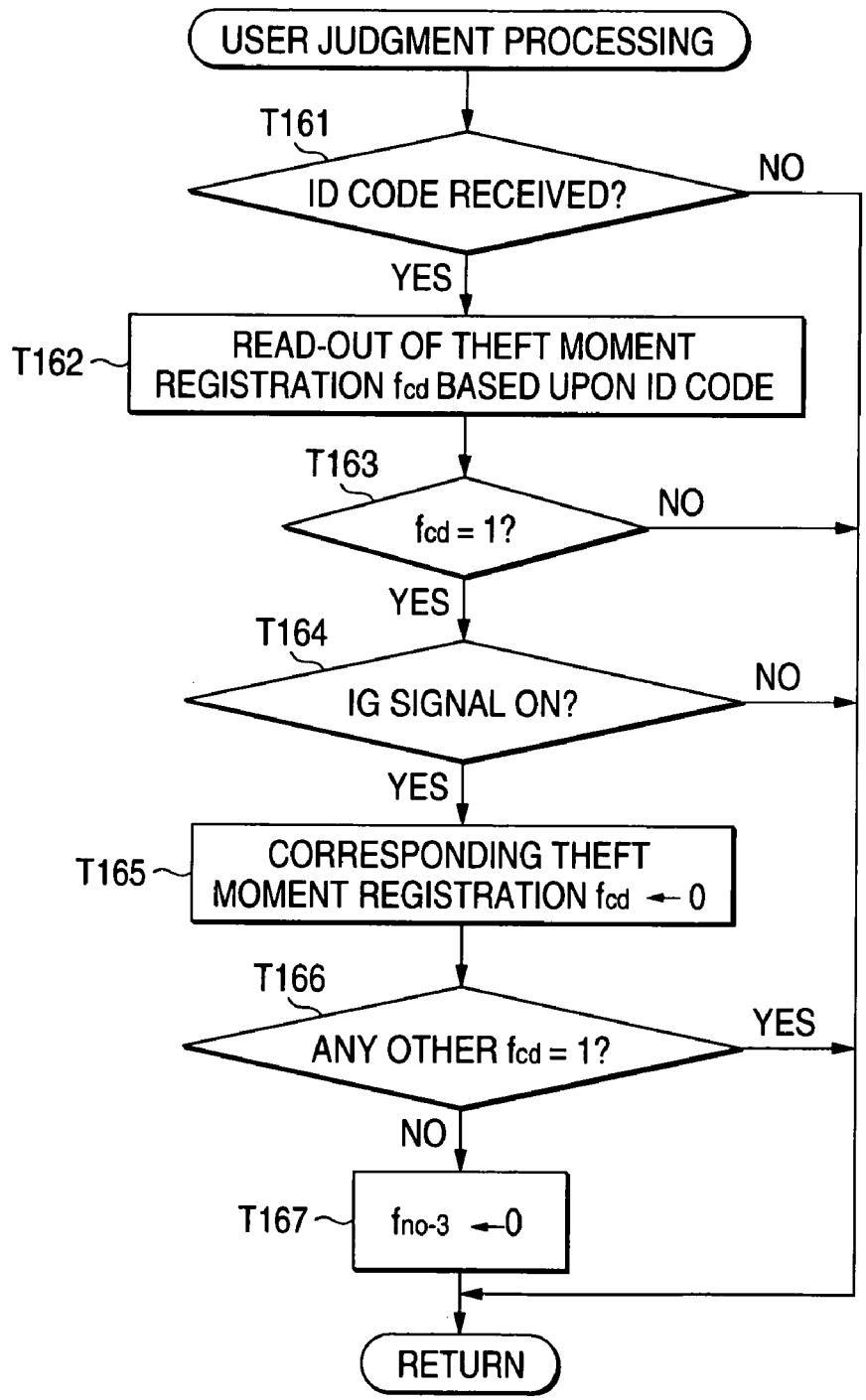
FIG. 25 is a flow chart which showed a process operation (user judgment processing) which a microcomputer in the remote start-up control apparatus which relates to the fourth embodiment carries out.

Next, a process operation [10-3] which the remote start-up microcomputer 63 in the remote start-up control apparatus 61A which relates to the fourth embodiment (process for carrying out judgment of whether a user of the portable transmitter 41 is a qualified user or not in the step T144 in FIG. 23) will be described on the basis of a flow chart shown in FIG. 25.

Firstly, judged is whether the remote ID code, which is being sent from the portable transmitter 41 through the antenna 34 and the receiving unit 35, was received or not (step T161), and if it is judged that the remote ID code was received, the theft moment registration flag $f_{cd}$, which corresponds to the received remote ID code, is read out from the EEPROM 66A (step T162), and judged is whether the theft moment registration flag $f_{cd}$, which was read out, is 1 or not (step T163).

If it is judged that the theft moment registration flag $f_{cd}$, which was read out, is 1 (i.e., the portable transmitter 41 which has sent the remote ID code is one which was registered after occurrence of theft), then, judged is whether the IG signal is in the ON state or not (step T164).

As described above, the IG signal is turned in the ON state, in case that the ignition key 1 was inserted into the key cylinder 4, and the ignition key 1 was turned to the IG position. Thus, such a situation that the IG signal is in the ON state can be judged to be such a situation that a vehicle is operated by a qualified user.

Also, if the portable transmitter 41 is used when a vehicle is operated by a qualified user, it can be said there is high possibility that the portable transmitter 41 is also used by the qualified user. Thus, if it is judged that the IG signal is in the ON state (i.e., a vehicle is operated by a qualified user) in a step T164, it is deemed that an operation of the portable transmitter 41 was carried out by a qualified user, and the theft moment registration flag $f_{cd}$, which corresponds to the remote ID code received in the step T161, is set to 0 (step T165).

Next, judged is whether one which has become 1 exists or not in the theft moment registration flag $f_{cd}$ which has been stored in the EEPROM 66A (step T166), and if it is judged that one which has become 1 does not exist in the theft moment registration flag $f_{cd}$, the flag $f_{no-3}$ showing that a condition for prohibiting the engine start-up according to a remote control is satisfied, is set to 0 (step T167), and after that, the process operation [10-3] is terminated. On one hand, if it is judged that one which has become 1 exists in the theft moment registration flag $f_{cd}$, since there is no necessity of returning the flag $f_{no-3}$ to 0, the process operation [10-3] is terminated as it is.

Also, in case that it is judged that the remote ID code is not received in the step T161, and in case that it is judged that the theft moment registration flag $f_{cd}$ which corresponds to the remote ID code, is not 1 in the step T163, or it is judged that the IG signal is not in the ON state in the step T164, the process operation [10-3] is terminated as it is.

Figure 26A:
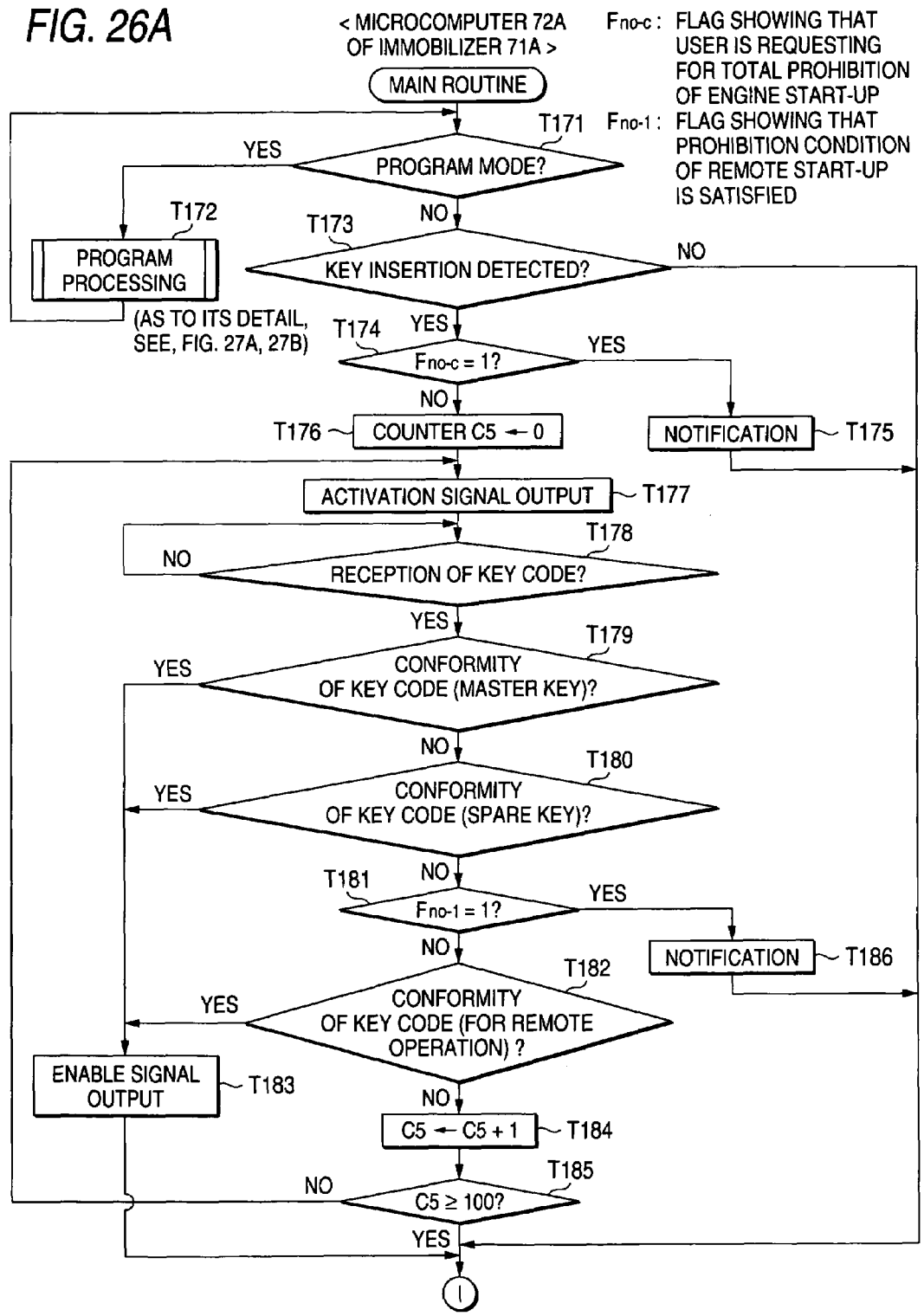
FIG. 26A is a flow chart which showed a process operation (main routine) which a microcomputer in a start-up control apparatus which relates to the fourth embodiment carries out.

Next, a process operation [11] (main routine) which the microcomputer 72 in the start-up control apparatus (immobilizer unit 71A) which relates to the fourth embodiment will be described on the basis of flow charts shown in FIGS. 26A and 26B. Firstly, judged is whether a program mode (program mode for writing a key code into a EEPROM 73A, and so on), is set up or not (step T171), and if it is judged that the program mode is set up, the routine goes to a step T172, and program processing is carried out (as to its detail, see, FIG. 27), and after that, the routine goes back to the step T171. The program mode is designed to be set up by push-down of the program switch 74, and son on which will be described later in detail.

On one hand, if it is judged that the program mode is not set up, then, judged is whether the key insertion signal (Low→High) was received or not (step T173). The key insertion signal is changed from a Low state to a High state, in case that the ignition key 1 was inserted into the key cylinder 4 (Case I), or in case that the button switch 45 of the portable transmitter 41 was pushed down so as to carry out the engine start-up instruction according to a remote operation (Case II).

Figure 26B:
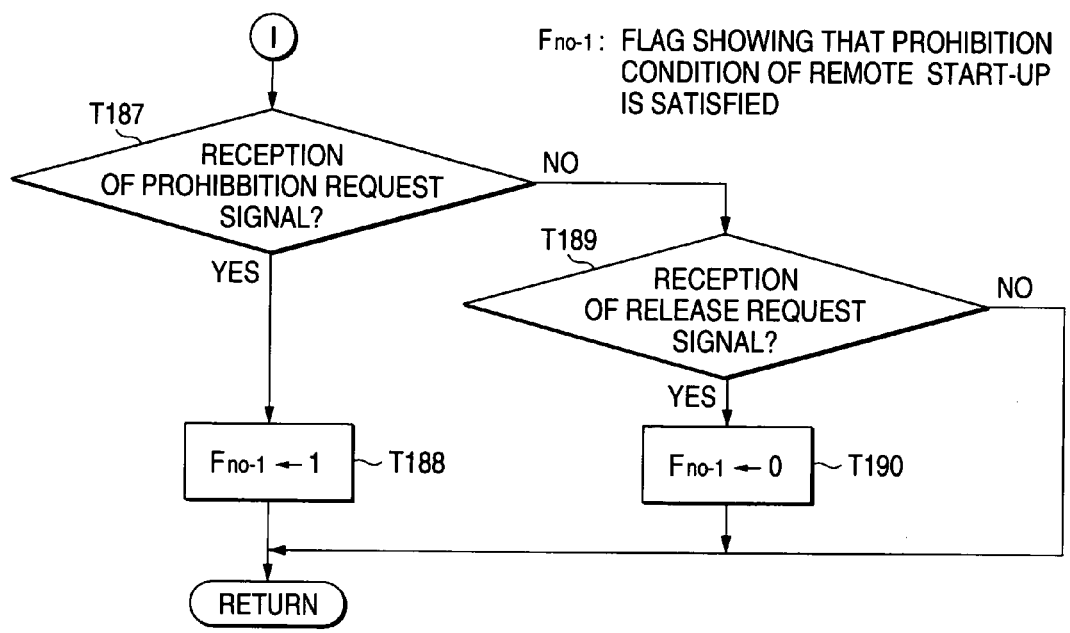
FIG. 26B is a flow chart which showed a process operation (main routine) which the microcomputer in the start-up control apparatus which relates to the fourth embodiment carries out.

In the step T173, if it is judged that the key insertion signal was received, then, judged is whether the flag $F_{no-c}$ showing that a user is requesting for the engine start-up is 1 or not (step T174), and if it is judged that the flag $F_{no-c}$ is 1 (i.e., a user is requesting for total prohibition of the engine start-up), in order to notify a user that the engine start-up is prohibited, a buzzer sound is generated by controlling the buzzer sound generation device 75 (step T175), and after that, the routine goes to a step T187 (FIG. 26B).

On one hand, if it is judged that the flag $F_{no-c}$ is not 1 (i.e., a user is not requesting for the total prohibition of the engine start-up), the routine goes to the step T176, and a process for enabling the start-up of an engine is started.

Firstly, a counter C5 is set to 0 (step T176), and then, the pulse shaped activation signal is supplied to the signal line L1, and the activation signal is sent to the immobilizer amplifier 5 and the remote start-up control apparatus 61A (step T177), and after that, such a situation that the key code is being sent is waited for (step T178). On one hand, if it is judged that the key insertion signal is not received, the routine goes to a step T187 (FIG. 26B).

In the meantime, the immobilizer amplifier 5 is designed, when it received the activation signal, to extract the key code (which is specific to the ignition key 1) which has been stored in the transponder 3, by activating the transponder 3 of the ignition key 1 inserted into the key cylinder 4, and to output the extracted key code to the immobilizer unit 71A through the signal line L2, together with the clock signal (in case of Case I).

Also, the remote start-up control apparatus 61A is designed, when it receives the activation signal, to output the key code, which has been stored in the EEPROM 67 and is specific to the remote start-up control apparatus 61A, to the immobilizer unit 71A through the signal line L2, together with the clock signal (in case of Case II).

In a step T178, if it is judged that the key code was received, then, judged is whether the received key code is in conformity with the key code (key code for master key) which has been stored in the storage region Ma1 of the EEPROM 73A (step T179), and if it is judged that the received key code is in conformity with the key code for the master key, then, the routine goes to the step T183, and to the engine control unit 7, the enabling signal for enabling the engine start-up is sent, and after that, the routine goes to a step T187 (FIG. 26B).

On one hand, if it is judged the received key code is not in conformity with the key code for the master key, then, judged is whether the received key code is in conformity with a key code (key code for spare key) which has been stored in any one of the storage regions Ma2 to Ma4 of the EEPROM 73A or not (step T180).

If it is judged that the received key code is in conformity with the key code for the spare key, the routine goes to the step T183, and the enabling signal for enabling the engine start-up is sent to the engine control unit 7, and after that, the routine goes to the step T187 (FIG. 26B).

On one hand, if it is judged that the received key code is not in conformity with the key code for the spare key, then, judged is whether $F_{no-1}$ showing that a condition for prohibiting the engine start-up according to a remote operation is satisfied is 1 or not (step T181), and if it is judged that the flag $F_{no-1}$ is not 1 (i.e., the condition for prohibiting the engine start-up according to a remote operation is not satisfied), then, judged is whether or not the received key code is in conformity with the key code which has been stored in the storage region Ma5 of the EEPROM 73A (key code for remote operation, i.e., key code which is specific to the remote start-up control apparatus 61A) (step T182).

If it is judged that the received key code is in conformity with the key code for remote operation, the routine goes to the step T183, and the enabling signal for enabling the engine start-up is sent to the engine control unit 7, and after that, the routine goes to the step T187 (FIG. 26B).

On one hand, if it is judged that the received code is not in conformity with the key code for remote operation (i.e., the received key code is not in conformity with any key code which has been stored in the EEPROM 73A), 1 is added to the counter C5 (step T184), and judged is whether the counter to which 1 was added shows a predetermined value (e.g., 100 times) and above or not (step T185), and if it is judged that the counter C5 shows 100 times and above, the routine goes back to the step T177, so that the activation is sent, and such a situation that the key code is being sent is waited for again. On the other hand, if it is judged that the counter C5 does not show 100 times and above, the routine goes to the step T187 (FIG. 26B).

Also, in the step T181, if it is judged that the flag $F_{no-1}$ is 1 (i.e., the condition for prohibiting the engine start-up according to a remote operation is satisfied), in order to notify a user that the engine start-up according to a remote operation is prohibited, a buzzer sound is generated by controlling the buzzer sound generation device 75 (step T186), and after that, the routine goes to the step T187 (FIG. 26B).

In the step T187, judged is whether a prohibition request signal for requesting for prohibition of the engine start-up according to a remote operation (see, step T143 of FIG. 23) was received or not, and if it is judged that the prohibition request signal was received, then, the flag $F_{no-1}$ showing that the condition for prohibiting the engine start-up according to a remote operation is satisfied is set to 1 (step 188), and after that, the process operation [11] is terminated.

On one hand, in the step T187, if it is judged that the prohibition request signal is not received, then, judged is whether the release request signal for requesting for the release of the prohibition (see, step T143 of FIG. 23), which is being sent from the remote start-up control apparatus 61, was received or not (step T189), and if it is judged that the release request signal was received, then, the flag $F_{no-1}$ is set to 0 (step T190), and the process operation [11] is terminated. On the other hand, if it is judged that the release request signal is not received, the process operation [11] is terminated as it is.

Next, a process operation [11-1] which the microcomputer 72A in the start-up control apparatus (immobilizer unit 71A) which relates to the fourth embodiment (program processing of the step T172 in FIG. 26A) will be described on the basis of flow charts shown in FIGS. 27A and 27B. In passing, the process operation [11-1] is an operation for writing the key code which has been registered in the transponder 3 of the ignition key, and the key code (which is specific to the remote start-up control apparatus 61A) which has been stored in the EEPROM 67 of the remote start-up control apparatus 61A, into the EEPROM 73A, and for setting to such a state that the engine start-up is prohibited by user's will.

In this regard, however, since a process for setting to such a state that the engine start-up is prohibited, out of the process operation [11-1], is the same as the steps T91 to T96 out of the process operation [8-1] which the microcomputer 72 in the immobilizer unit 71 carries out (see, FIG. 19B), explanation there of will be omitted, and only an operation which is particular to the process operation [11-1] will be described.

Firstly, judged is whether a program mode of a key code (program mode for writing the key code etc. which has been registered in the transponder 3 of the ignition key 1, into the EEPROM 73A), which is set up by such a fact that a predetermined operation by use of the program switch 74 (e.g., normal one push, but not long push of the program switch 74) is carried out, is set up or not (step T181), and if it is judged that the program mode is set up, then, the routine goes to a step T192, and a process for writing the key code into the EEPROM 73A is started. On one hand, if it is judged that the program mode is not set up, the routine goes to a step T204 (FIG. 27B).

In the step T192, judged is whether the key insertion signal (Low→High) was received or not. In passing, the key insertion signal is changed from the Low state to the High state, in case that the ignition key was inserted into the key cylinder 4 (Case I), and in case that the engine start-up instruction according to a remote operation was carried out, by pushing down the button switch 45 of the portable transmitter 41 (Case II).

In the step T192, if it is judged that the key insertion signal was received, then, the pulse shaped activation signal is supplied to the signal line L1, and the activation signal is sent to the immobilizer amplifier 5 and the remote start-up control apparatus 61A (step T193), and after that, such a state that the key code is being sent is waited for (step T194). On one hand, if it is judged that the key insertion signal is not received, the routine goes to a step T204 (FIG. 27B).

In the meantime, the immobilizer amplifier 5 is designed to, when it receives the activation signal, extract the key code (which is specific to the ignition key 1) which has been stored in the transponder 3, by activating the transponder 3 of the ignition key 1 which has been inserted into the key cylinder 4, and to output the extracted key code, together with the clock signal, to the immobilizer unit 71A through the signal line L2 (in case of Case I).

Also, the remote start-up control apparatus 61A is designed to, when it receives the activation signal, to output the key code which has been stored in the EEPROM 67 and which is specific to the remote start-up control apparatus 61A, together with the clock signal, to the immobilizer unit 71A through the signal line L2 (in case of Case II).

In the step T194, if it is judged that the key code was received, then, judged is whether the program mode for the master key, which is set up by such a fact that a predetermined operation by use of the program switch 74 (e.g., successive two pushes of the program switch 74, after the program mode of the key code was set up) is carried out, is set up or not (step T196).

Figure 27B:
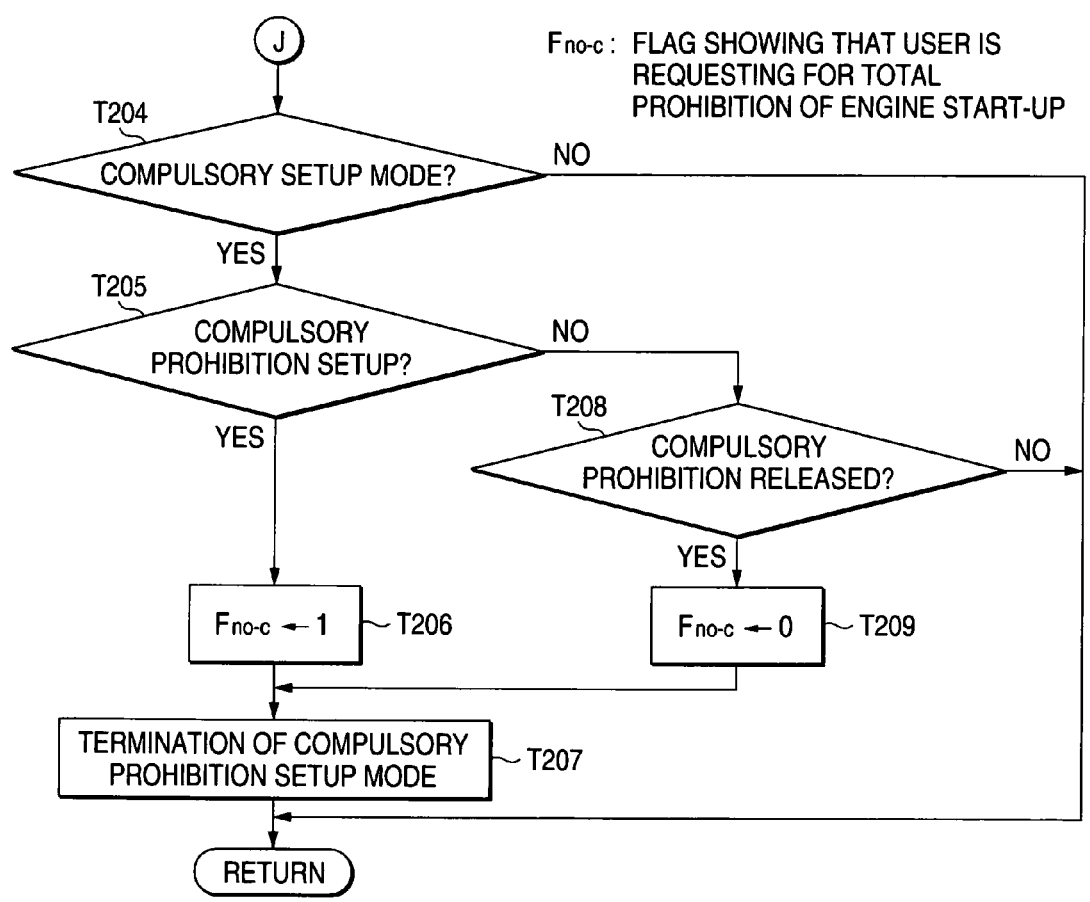
FIG. 27B is a flow chart which showed a process operation (program processing) which the microcomputer in the start-up control apparatus which relates to the fourth embodiment carries out.

If it is judged that the program mode for the master key is set up, the received key code is written into the storage region Ma1 (see, FIG. 21) of the EEPROM 73A (step T196), and in order to notify a user that the writing of the key code for the master key into the EEPROM 73A was completed, a buzzer sound is generated by controlling the buzzer sound generation device 75 (step T197), and after that, the program mode is terminated (step T203), and the routine goes to the step T204 (FIG. 27B).

On one hand, if it is judged that the program mode for the master key is not set up, then, judged is whether the program for the spare key, which is set up by such a fact that a predetermined operation by use of the program switch 74 (i.e., successive three pushes of the program switch 74, after the program mode of the key code was set up), is set up or not (step T198).

If it is judged that the program mode for the spare key has been set up, the received key code is written into any one of the storage regions Ma2 to Ma4 (see, FIG. 21) of the EEPROM 73A (step T199), and in order to notify a user that the writing of the key code for the spare key into the EEPROM 73A was completed, a buzzer sound is generated is generated by controlling the buzzer sound generation device 75 (step T200), and after that, the program mode is terminated (step T203), and the routine goes to the step T204 (FIG. 27B).

On one hand, if it is judged that any program mode for the spare key is not set up, the received key code is written into the storage region Ma5 (see, FIG. 21) of the EEPROM 73A as one for use in a remote operation (step T201), and in order to notify a user that the writing of the key code into the EEPROM 73A was completed, a buzzer sound is generated by controlling the buzzer sound generation device 75 (step T202), and the routine goes to the step T204 (FIG. 27B). In passing, it is desirable that the number of generation of the buzzer sound in the steps T197, T200, and T202 is made to differ, respectively.

According to the remote start-up control apparatus which relates to the above-described fourth embodiment, even if there occurs no such a situation that the ignition key 1 is inserted into the key cylinder 4 and turned, it is possible to have an engine started up according to a remote operation, and also, in case that there exists the portable transmitter 41 which was newly, additionally registered, the prohibition request signal is designed to be supplied to the immobilizer unit 71A.

Also, according to the start-up control apparatus (immobilizer unit 71A) which relates to the above-described fourth embodiment, when it receives the prohibition request signal which is being sent from the remote start-up control apparatus 61, it is judged that there exists the transmitter which was newly, additionally registered, and the enabling signal is not sent to the engine control unit 7.

Thus, in case that there exists the transistor which was newly, additionally registered (i.e., there is a possibility that a transmitter which a burglar has is registered as a transmitter for instructing a start-up of an engine), it is possible to realize such a situation that the start-up of the engine is not permitted, or is not enabled.

By this, even if realized by any chance is such a state that an operation of the remote start-up control apparatus 61A becomes possible by a transmitter which a burglar has, in case that there occurred the vehicle theft, the start-up of the engine is not enabled, and therefore, it is possible to prevent the engine from being started up by use of the transmitter.

Also, in case that it was confirmed that all of the transmitters, which were newly, additionally registered, are being used by qualified users, it is possible to realize the engine start-up even if a start-up instruction is the start-up instruction from the transmitter which was newly, additionally registered, and therefore, it is possible to make an apparatus which is very excellent in user-friendliness, as well as the anti-theft effect.

Also, in the start-up control apparatus (immobilizer unit 71A) which relates to the above-described fourth embodiment, on the basis of the prohibition request signal and the release request signal which are being sent from the remote start-up control apparatus 61A (see, step T143 of FIG. 23), the flag $F_{no-1}$ showing that the condition for prohibiting the engine start-up according to a remote operation is satisfied is set up (steps T187 to T190 of FIG. 26B), but in a start-up control apparatus which relates to another embodiment, it may be designed such that the flag $F_{no-1}$ is set up by judgment of the start-up control apparatus itself, and the engine start-up according to a remote operation is controlled. For example, in case that conformity of key codes according to the masker key was realized, the flag $F_{no-1}$ is set to 0. In passing, in order to realize this, after "Y" of the step T179 of FIG. 26A, a process operation for setting the flag $F_{no-1}$ to 0 may be disposed.

In the remote start-up control apparatuses which relate to the above-described embodiments (1) to (4), the security microcomputers 32, 32A, 62, and 62A and the remote start-up microcomputers 33, 33A, 63, and 63A are configured integrally, but in another embodiment, they may be configured separately. Also, in still another embodiment, one microcomputer may carry out the processes which the security microcomputer and the remote start-up microcomputer carry out.

Also, the start-up control apparatuses (immobilizers 71 and 71A) which relate to the above-described embodiments (3) and (4) are separated from the engine control unit 7, but in another embodiment, they may be configured integrally.

What is claimed is:

1. A remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, and enabling an additional registration of a transmitter to instruct the start-up of the engine by an remote operation, the remote start-up control apparatus comprising:

a first storage unit for storing a key code;

a first supply unit for supplying the key code which is stored in the first storage unit to the start-up control apparatus, when it receives a start-up instruction of the engine according to the remote operation;

an instruction source judgment unit for judging whether the start-up instruction of the engine is one which is based upon the remote operation from the transmitter which was additionally registered after a predetermined time point, and a second execution prohibition control unit for carrying out prohibition control for prohibiting execution of all or a part of a series of processes which become necessary for enabling the start-up control apparatus to start up the engine, in case that it is judged that the start-up instruction of the engine is one which is based upon the remote operation from the transmitter which was additionally registered after the predetermined time point, by the instruction source judgment unit.

2. The remote start-up control apparatus according to claim 1, wherein the second execution prohibition control unit is one which prohibits supply of the key code to the start-up control apparatus by the second supply unit.

3. The remote start-up control apparatus according to claim 1, wherein the predetermined time point is such a time point that theft of the vehicle occurred, and the instruction source judgment unit is one which judges whether the start-up instruction of the engine is based upon the remote operation from the transmitter which was additionally registered after the time point when theft of the vehicle occurred, on the basis of a signal which is obtained from a theft detection unit for detecting theft of the vehicle, or another signal which corresponds to the signal.

4. The remote start-up control apparatus according to claim 1, further comprising a user qualification judgment unit for judging whether the transmitter which was additionally registered after the predetermined time point was used by a qualified user or not, wherein if it is judged that the transmitter which was additionally registered was used by a qualified user, by the user qualification judgment unit, the second execution prohibition control unit does not carry out the prohibition control.

5. The remote start-up control apparatus according to claim 1, further comprising
an additional registration qualification judgment unit for judging whether an additional registration of a transmitter which was carried out after the predetermined time point was carried out by a qualified registrant or not,
wherein if it is judged that the additional registration was carried out by a qualified registrant, by the additional registration qualification judgment unit, the second execution prohibition control unit does not carry out the prohibition control.

6. A remote start-up control apparatus, adapted to be mounted on a vehicle that includes:
a start-up control apparatus, operable to enable the vehicle to start when one of a first key code and a second key code that is different from the first key code is supplied to the start-up control apparatus, wherein each of the first key code and the second key code is independently capable of enabling the start-up control apparatus to enable the vehicle to start; and
a theft detection unit, operable to detect whether a theft of the vehicle occurs, the remote start-up control apparatus comprising:
a transmitter, operable to remotely transmit a signal;
a storage unit, storing the first key code;
a supply unit, operable to supply the stored first key code to the start-up control apparatus in response to the transmitted signal; and
a control unit,
wherein in a case where the theft detection unit detects the theft of the vehicle occurs, the control unit prohibits the start-up control apparatus to enable the vehicle to start when the first key code is supplied to the start-up control apparatus, and enables the start-up control apparatus to enable the vehicle to start when the second key code is supplied to the start-up control apparatus.

7. The remote start-up control apparatus according to claim 6, further comprising:
an operator detection unit, operable to detect whether an operation to the vehicle is executed by a qualified operator or not after the theft detection unit detects that the theft of the vehicle occurs,
wherein the control unit enables the supply unit to supply the stored key code to the start-up control apparatus when the operator detection unit detects that the operation to the vehicle is executed by the qualified operator; and
wherein the control unit prohibits the supply unit to supply the stored key code to the start-up control apparatus in response to the transmitted signal when the operator detection unit detects that the operation to the vehicle is not executed by the qualified operator.

8. A remote start-up control apparatus being installed in a vehicle incorporating a start-up control apparatus for sending a key code output request to a key code output device that can output a key code based on a first predetermined operation, inputting a key code output in response to the request, determining whether or not the input key code matches a predetermined key code, and if the key codes match, enabling an engine to be started, the remote start-up control apparatus for performing start-up control of the engine by remote operation, and enabling an additional registration of a transmitter to instruct the start-up of the engine by an remote operation, the remote start-up control apparatus comprising:
a first storage unit for storing a key code;
a first supply unit for supplying the key code which is stored in the first storage unit to the start-up control apparatus, when it receives a start-up instruction of the engine according to the remote operation;
an additional registration existence judgment unit for judging whether there exists a transmitter which was additionally registered after a predetermined time point; and
a third supply unit for supplying a second request signal for requesting for prohibition or restriction of the start-up of the engine, in case that it was judged that there exists the transmitter which was additionally registered after the predetermined time point, by the additional registration existence judgment unit.

9. The remote start-up control apparatus according to claim 8, wherein the predetermined time point is such a time point that theft of the vehicle occurred, and
the additional registration existence judgment unit is one which judges whether there exists the transmitter which was additionally registered after the time point when the theft of the vehicle occurred, on the basis of a signal which is obtained from a theft detection unit for detecting theft of the vehicle, or another signal which corresponds to the signal.

10. The remote start-up control apparatus according to claim 8, further comprising
a user qualification judgment unit for judging whether the transmitter which was additionally registered after the predetermined time point was used by a qualified user or not,
wherein if it is judged that the transmitter which was additionally registered was used by a qualified user, by the user qualification judgment unit, the third supply unit does not supply the second request signal to the start-up control apparatus.

11. The remote start-up control apparatus according to claim 8, further comprising
an additional registration qualification judgment unit for judging whether the additional registration of the transmitter which was additionally registered after the predetermined time point was carried out by a qualified registrant or not,
wherein if it is judged that the additional registration was carried out by a qualified registrant, by the additional registration qualification judgment unit, the third supply unit does not supply the request signal to the start-up control apparatus.

12. A remote start-up control apparatus, adapted to be mounted on a vehicle that includes:
an engine control unit that is operable to start an engine in response to an enabling signal:
an immobilizer that stores a plurality of key codes, the immobilizer supplying the enabling signal to the engine control unit when a key code which matches at least one of the stored key codes is supplied thereto from outside; and
an immobilizer amplifier that extracts a first key code from a transponder of an ignition key and supplies the first key code to the immobilizer when the ignition key is inserted into a key cylinder, wherein when the first key code which is supplied to the immobilizer matches one of the stored key codes, the immobilizer supplies the enabling signal to the engine control unit,
the remote start-up control apparatus comprising:
a portable transmitter that is operable to remotely transmit a start-up signal with an ID code from a position at a distance from the vehicle;

a storage unit that stores an ID code and a second key code which is different from the first key code and matches another one of the stored key codes;

a control unit that determines whether the transmitted ID code matches the stored ID code when receiving the start-up signal and supplies the stored second key code to the immobilizer when the transmitted ID code matches the stored ID code; and a setup unit that operable to set a prohibiting state on the basis of a predetermined operation, wherein in a case where the setup unit sets the prohibiting state, the control unit does not supply the stored second key code to the immobilizer even when the transmitted ID code matches the stored ID code and the immobilizer supplies the enabling signal to the engine control unit when the first key code which matches the one of the stored key codes is supplied to the immobilizer.

13. The remote start-up control apparatus as set forth in claim 12, wherein the storage unit has a first electronically erasable and programmable read only memory for storing the stored ID code and a second electronically erasable and programmable read only memory for storing the second key code.

14. The remote start-up control apparatus as set forth in claim 12, wherein the predetermined operation includes at least one of an operation using the portable transmitter and an operation using a door of the vehicle.

* * * * *